US006951962B2

(12) United States Patent
Bottorff

(10) Patent No.: US 6,951,962 B2
(45) Date of Patent: Oct. 4, 2005

(54) OIL/GREASE- AND WATER-SIZING AGENT FOR TREATMENT OF CELLULOSICS

(75) Inventor: Kyle J. Bottorff, New Castle County, DE (US)

(73) Assignee: Hercules Incorporated, Wilmington, DE (US)

( * ) Notice: Subject to any disclaimer, the term of this patent is extended or adjusted under 35 U.S.C. 154(b) by 335 days.

(21) Appl. No.: 10/121,880

(22) Filed: Apr. 12, 2002

(65) Prior Publication Data

US 2003/0217824 A1 Nov. 27, 2003

(51) Int. Cl.⁷ .................... C07C 229/00; C07C 211/00; A62D 1/04
(52) U.S. Cl. ...................... 564/509; 564/510; 564/511; 162/177
(58) Field of Search .................. 162/177; 564/509–511, 564/503

(56) References Cited

U.S. PATENT DOCUMENTS

| | | | |
|---|---|---|---|
| 2,595,935 A | 5/1952 | Daniel | 92/3 |
| 3,518,218 A | 6/1970 | Connick | 260/29.2 |
| 3,671,493 A | 6/1972 | Lo Monaco et al. | 260/75 NH |
| 3,952,060 A | 4/1976 | Huber-Emden et al. | 260/584 R |
| 4,284,746 A | 8/1981 | Ohmori | 525/510 |
| 5,750,043 A | 5/1998 | Clark | 252/2 |
| 6,156,222 A | 12/2000 | Jennings et al. | 252/8.05 |

FOREIGN PATENT DOCUMENTS

| | | | |
|---|---|---|---|
| GB | 1214528 | 12/1970 | C07C/103/34 |
| WO | 90/02110 | 3/1990 | C07C/43/13 |
| WO | 90/03966 | 4/1990 | C07C/237/10 |
| WO | 00/43438 | 7/2000 | C08G/73/02 |

OTHER PUBLICATIONS

Database CAPLUS on STN, Acc. No. 1975:462279, Iijima et al., JP 49030610 (Mar. 19, 1974) (abstract).*
Waterproofing and Water/Oil Repellency: Kirk–Othmer Encyclopedia of Chemical Technology, John Wiley & Sons, New York, 1984 vol. 24, p. 442.
Sizing with Fluorochemicals, R. D. Howells, 1997 Sizing Short Course, Nashville, TN, Apr. 14–16, TAPPI Press, Atlanta.

* cited by examiner

*Primary Examiner*—Brian J. Davis
(74) *Attorney, Agent, or Firm*—Gary A. Samuels

(57) ABSTRACT

A water-dispersible oil/grease-sizing and water-sizing agent that provides oil/grease and water-sizing for paper and other cellulosic materials. The agent works effectively for both oil/grease and water sizing at high temperatures. The polymeric agent's key features include a polyamine component which is a repeating monomer unit with cellulose-reactive and fluorinated groups substituted on the polyamine.

36 Claims, No Drawings

OIL/GREASE- AND WATER-SIZING AGENT FOR TREATMENT OF CELLULOSICS

FIELD OF INVENTION

This invention relates to an improvement in oil/grease and water sizing of cellulosic materials, especially paper products. In particular, the invention relates to a selected polyamine which is substituted with cellulose reactive and fluorocarbons groups.

BACKGROUND OF THE INVENTION

There is a long felt need for an efficient chemical or polymeric compound that can impart both oil/grease- and water-sizing properties to paper. Many grades of paper require both oil/grease resistance and water resistance. Commercially available chemicals that are said to provide both oil/grease- and water-sizing properties are not in fact efficient water-sizing agents. A separate water-sizing agent must be added along with the oil-sizing agent when high levels of both oil/grease and water resistance is desired. Oil/grease- and water sizing agents often have a negative impact on each other's performance, so when both oil/grease- and water sizing properties are desired, higher levels of each are required relative to when only one of the properties is needed.

A general discussion of oil and water sizing of materials appears in the article, Waterproofing and Water/Oil Repellency," Kirk-Othmer Encyclopedia of Chemical Technology, John Wiley & Sons, New York, 1984, Volume 24, page 442. In particular, there is a discussion of the use of contact angle measurements for judging the degree of wetting or repellency for a liquid on a plane-solid surface. On pages 448 and 458 there is discussion of uses of fluorocarbon chemicals to improve repellency.

Materials containing perfluorocarbon segments have long been utilized to impart oil and grease repellant properties to a wide variety of substrates, including cellulosic materials such as textiles and paper (e.g. Sizing with fluorochemicals, R. D. Howells, 1997 Sizing Short Course, Nashville, Tenn., April 14–16, TAPPI Press, Atlanta). Perfluoroalkyl-substituted chemicals possess extremely low free surface energies, making them particularly effective at repelling low surface energy materials such as oil and grease, thus preventing staining of the substrate surface or spreading of the oil or grease over the substrate surface. For these materials to function effectively and without detriment to the paper and textile manufacturing process, they must generate minimum foam, not deposit on the manufacturing equipment, and be effectively retained and evenly distributed on the substrate. For practical commercial applications they must also form stable dispersions. Some examples of end-use applications include pet-food bags and boxes, fast food packaging, pizza boxes, candy wrappers, carbonless paper, packaging for fatty foods in general, molded board for paper plates, etc., carpet, upholstery and other textiles applications and leather goods.

Commercial papermaking conditions require that any chemical additive, such as a sizing agent, must be either readily water dispersible in its neat form, or easily convertible into a water dispersible emulsion or stable aqueous dispersion. There are two physical forms of sizing agents in aqueous delivery systems: dissolved or dispersed ionic salts and dispersions or emulsions of particulates or oils. Sizing agents in particulate form must be low melting solids, very small size particles (submicron), or liquids so the material will spread throughout the paper when heated in the dryer section of a paper machine.

When the sizing agent is added to the pulp slurry (internal addition) it must adhere to the pulp or it will not be retained in the paper. This may be accomplished by means of opposite charge attractions between the pulp and the size and by physical trapping of particles of size during web formation.

Although there are compounds described that claim to provide oil/grease- and water sizing most are less effective against hot oil and ineffective when exposed to hot water. The performance of existing technologies is limited by the temperature of the oil/grease that the paper comes into contact with. The repellency of the paper falls off considerably as the oil/grease temperature increases which limits the applications that substrates treated with oil/grease-sizing agents can be utilized economically.

In order to thoroughly evaluate oil/grease- and water-sizing agents, extensive testing procedures must be utilized. The most prevalent screening test is the TAPPI T559 pm-96 or the so-called Kit Test. An extended range Kit Test was used to develop/understand this invention. Even though the test only measures the nonpolar component of surface energy it can be useful as a quick test to monitor treatment levels after the selection of type of fluorochemical sizing agent and method of application has been determined.

Correlation to real end-use performance is required. In general, it is important to match the test liquid to the nature of the fluid that must be controlled to prevent staining. In addition to the fluid, for a good test of a sizing agent the temperature and other environmental conditions also need to simulate the end use of the paper. Thus, many tests were used to evaluate and develop a full understanding of the compounds and polymers described by this invention.

While commercial products and products described in literature, especially the patent literature, often provide oil sizing, none of these compounds/polymers have the combination of both efficient oil/grease- and efficient water size over ranges of temperature required for a breadth of commercial applications. None meet the performance criteria achieved by this invention.

Polymers of perfluoro-allyloxy and perfluoroalkyl-iodo propyloxy substituted polyamino acids or poly-$R_F$-fluoroallyl substituted polyamino acids are described in U.S. Pat. No. 6,156,222. While this reference teaches the use of these compounds in grease-proofing paper, none of these compounds have the epihalohydrin or epiorganosulfonate reaction fragment functionality, and thus the resultant cross-linking and cellulose reactive capability.

In International Publication No. WO 90/02110, Szonyi describes a perfluoroalkylated amino compound, which has been adducted with epichlorohydrin. There are only two nitrogens in these perfuoroalkylated diamino compounds. In all examples and revisions to the claims in the application file Szonyi describes the nitrogen at which the epi reacts as tertiary, which would not allow the formation of the 3-hydroxyazetidinium group. Szonyi's publication does not describe the secondary nitrogen atom required for the invention described herein for formation of the 3-hydroxyazetidinium group.

In International Publication No. WO 00/43438 perfluoro alkyl-substituted polyamino acid consisting of oligomers/copolymers of aliphatic diamino carboxylic acid—having 3 to 10 carbon atoms and containing at least two perfluoro-alkyl groups attached to nitrogen atoms through a linking group are described. Essential features are the limitation of two amino group per monomer unit and that there be a pendant carboxylic acid group, that is in the amino acid chemical structure.

An epoxidized amide-amine fluoro compound is taught in Great Britain Patent #1,214,528. A key feature of this compound is that in the backbone there is an amide linkage and there is no hydrophillic group that should stabilize an aqueous dispersion.

Thus, in spite of efforts to produce a material that provides both efficient oil/grease sizing and efficient water sizing to cellulosic products, these efforts have only partially given the combination of sizing needed. The invention described herein is especially useful when the treated paper must withstand hot oil/grease- and/or hot water environments.

SUMMARY OF THE INVENTION

A water-dispersible oil/grease-sizing and water-sizing agent for cellulosic materials comprising repeating units that are comprised of a polyamine with at least 3 nitrogen atoms in each recurring monomer unit wherein the amino groups are partially or completely substituted by:

a. a cellulose-reactive group which is formed by reaction of the polyamine and at least one reactive chemical which is selected from the group consisting of epi halohydrin, epi organosulfonates, and oxiranes, where the cellulose reactivity is present after reaction with the polyamine or is formed by subsequent reactivation;

b. an oleophobic and hydrophobic fluorochemical group, which is substituted with an alkyl chain which has a hydrophillic group;

wherein additionally, the cellulose-reactive group cross-links the polyamino groups and the $M_w$ molecular weight of the agent is 10,000 to 35,000,000 Daltons as measured by Size Exclusion Chromatography relative to a poly(methylmethacrylate) standard.

The present invention further provides a process for the preparation of water dispersible oil/grease-sizing and water-sizing agents, aqueous dispersions of such, paper treated with such and the process for treating paper with the water dispersible oil/grease-sizing and water-sizing agent.

Furthermore, cellulosic materials, which have been treated with the water dispersible oil/grease-sizing and water-sizing agent compounds of this invention, exhibit improved water, oil/grease-, and hot oil and soil repellency. Solutions/dispersions of water-dispersible oil/grease-sizing and water-sizing agent polymers of the invention have the advantage that they deliver efficient performance over a wide range of operating pH, hardness, and temperature.

DETAILED DESCRIPTION OF THE INVENTION

It has surprisingly been found that a water-dispersible oil/grease-sizing and water-sizing agent for cellulosic materials has been found that offers both oil/grease and water sizing. It is further surprising how well these agents work under hot oil and hot water conditions. Key to these inventions is the presence of a polyamine with at least 3 nitrogen atoms in each recurring monomer unit where the amino groups are partially or completely substituted by:

a. a cellulose-reactive group which is formed by reaction of the polyamine and at least one reactive chemical such as epihalohydrin, epiorganosulfonates, and oxiranes where the cellulose reactivity is present after reaction with the polyamine or is formed by subsequent reactivation;

b. an oleophobic and hydrophobic fluorochemical group, which is substituted with an alkyl chain which has a hydro phillic group, where the fluorochemical portion of the fluorochemical group is further characterized as a monovalent, perfluorinated, alkyl or alkenyl, straight, branched or cyclic organic radical having three to twenty fluorinated carbon atoms, which can be interrupted by divalent oxygen or sulfur atoms;

wherein additionally, the cellulose-reactive group cross-links between polyamino groups;

and the molecular weight of the agent is 10,000 to 35,000,000 Daltons.

Although we do not want to be bound by theory, we believe that the excellent performance observed when using materials of the current invention results from having several key structural features in the same molecule. The key to performance is the combination in one molecular structure with the following key features;

polyamine which is the repeating monomer unit to be substitued by cellulose-reactive substituents and functionality, fluorinated substituents (see $R_F$ in Structure III), which when taken together lead to three important functions cross-linking capability (combination of amine and cellulose-reactive functionality), high molecular weight (polymeric), and water-compatible functionality.

Polyamine functionality: The polyamine supplies the molecular scaffolding upon which the other essential components can be assembled. The polyamine functionality allows different molecules of the invention to cross-link with each other to form the polymeric structure and to react on the surface of the substrate, locking the invention in place on the substrate. When the nitrogens are substituted with four groups they have a cationic character which aids in the water compatibility and substantivity of the invention to negatively charged fibers.

Cellulose Reactivity: The cellulose reactivity results from the reaction of the polyamine or the fluorinated substituted polyamine with a reactive chemical that can react with the nitrogens of the polyamine and either retain cellulose reactivity or can be reactivated. Epihalohydrins are examples of this type of reactivity in that the halide can be displaced by the amine, leaving behind a reactive 3-hydroxyazetidinium and/or epoxide.

Fluorinated Groups: The fluorinated groups must be present and it is believed that they orient properly to reduce the surface tension to the point that oil and grease will not wet or stain material treated with the invention.

Cross-linking capability: The cellulose reactive groups can also cross-link to nitrogens of the same polyamine or different polyamines. In the latter case, this intermolecular reacting leads to the high molecular weight polymers required for this invention.

Polymeric: The polymeric nature of the structure of the invention makes it easier for different molecules of the invention to reach one another and cross-link on/around the cellulose substrate. The high molecular weight that the polymer provides also provides lower volatility than low molecular substances. The low volatility keeps the oil/ grease- and water-sizing agent from vaporizing from the substrate surface or reorienting on the surface when heated. The larger size of a polymeric material also keeps it on the surface of the treated substrate where it can remain effective, rather than penetrating into the interior of the substrate.

Hydrophillic functionality: The hydrophillic group provides critical molecular interaction with water, which results in a stable water dispersion. The hydroxyl functional group is one form of the hydrophillic group. The hydroxyl functional group serves to make the invention more dispersible in water and/or more water compatible. The water compatibility avoids the need for using organic solvents, which can provide environmental, health, and flammability hazards as well as adding addition cost to the delivery system. Other water-compatible functionality such as carboxylic acids, carboxylic salts, polyethers, and thiols can provide the hydrophillic group. While not being bound by theory, we believe that this hydrophillic group provides the stability and/or dispersibility of the product in an aqueous system. An aqueous delivery system is preferred for cellulose containing materials.

Another source of the hydrophillic functionality is the cationic nature that some of the polyamine nitrogens can assume if they have 4 substituents and are cationic.

For all of the chemical structures lower case letters are integers and represented molar substitution, mole ratios and other chemical designations.

Discussion of the Chemical Structures

The essential polyamine for the water dispersible oil/grease-sizing and water-sizing agent has the chemical structure shown in Structure I.

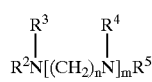

Structure I n=1–6,
m=2–1,000,
$R^2$, $R^3$, $R^5$=H, —$(CH_2)_{1-4}$H, —$(CH_2CH_2O)_{1-10}$H, —$CH_2CH(OH)CH_3$, —$CH(CH_3)CH_2OH$, —$CH_2CO_2$— $Met^+$ (Met=group 1 or 2 metal),
$R^4$=H, —$(CH_2)_{1-4}$H, —$(CH_2CH_2O)_{1-10}$H, —$CH_2CH(OH)CH_3$, —$CH(CH_3)CH_2OH$, —$CH_2CO_2$— $Met^+$ (Met=group 1 or 2 metal), —$(CH_2)_{1-6}NH_{2,1,0}(R_2)_{0,1,2}$,
where at least two of the $R^2$, $R^3$, $R^4$, or $R^5$ are H, and where any two of $R^2$, $R^4$, and $R^5$ could be the same carbon chain

Structure I: the Polyamine

Examples of the polyamines include polyalkyleneimines such as diethylenetriamine, triethylenetetraamine, tetraethylenepentamine, dihexamethylenetriamine, and their branched and/or alkylated derivatives. These include polyalkyleneimines containing primary, secondary, and tertiary amino groups. Apparently, the amino groups provide the reaction centers for the perfluoro and cellulose reactive compounds and permits the hydrophillic group to be substituted on the amino chain.

The polyamines can be further described as having a molecular weight of 75 to 32,000 Daltons with at least 3 nitrogen atoms in each monomer unit and it is preferred that at least one of the nitrogen atoms is secondary and the nitrogens atoms are partially or completely substituted by the fluorocarbon and the cellulose reactive precursor group. The molecular weight is a calculated molecular weight based on the repeating amine groups.

The cellulose-reactive group results from the reaction of the nitrogens on the polyamine with reactive chemicals that are often used to prepare chemicals for the paper industry. These cellulose-reactive chemicals have two modes of reaction, 1.) to form a bond to another organic molecule, in this case the polyamine and 2.) to lead to reactions onto the paper or to the pulp during the paper making process. The reactive chemicals are selected from the group consisting of epihalohydrin, epiorganosulfonates, and oxiranes. For the purpose of the invention these reactive chemicals will also be called 'cellulose reactive group precursors'.

The cellulose reactive group precursors must either react with the polyamine such that cellulose reactivity feature is retained, or is regenerated via reaction subsequent to the reaction between the fluorocarbon substituted polyamine and the cellulose reactive group precursor. If the epihalohydrin or epiorganosulfinate group has reacted with the polyamine to form a halohydrin, a base reactivation by conversion of this halohydrin to 3-hydroxyazetidinium and/or epoxide is an example of reactivation of the cellulose-reactive group.

The preferred cellulose reactive group precursors are epihalohydrins or epiorganosulfonates as depicted in Structure II.

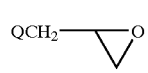

Structure II $Q = Cl, Br, I, CH_3C_6H_4SO_2, CH_3SO_2$.

Structure II: Preferred Reactive Chemical

The cellulosic-reactive material binds the water-dispersible oil/grease-sizing and water-sizing agent to and or around the cellulosic containing material with covalent and other bonds or physical associations based forces such as Van der Waals forces.

The cellulose reactive functionality can also provide a means to cross-link between amine groups from the same polyamino chain or from another polyamine chain and substituents on the amine groups. When cross-linking between polyamino chains occurs, the molecular weight increases resulting in a polymeric, water-dispersible material.

The fluorochemical ($R_F$) portion of the fluorochemical group is characterized as a monovalent, perfluorinated, alkyl or alkenyl, straight, branched or cyclic organic radical having three to twenty fluorinated carbon atoms, which can be interrupted by divalent oxygen or sulfur atoms.

The fluorochemical group is further characterized as having a carbon backbone with each $R_F$ radical being identical or different from the other $R_F$ radicals and has an amino-reactive component. This fluorochemical class of organic radicals in which a large percentage of hydrogen atoms are replaced by fluorine atoms provides a segment that provides low surface energy for the sizing agent. Typically, the mass of the fluorochemical portion of this group is 30–80% fluorine.

A preferred chemical structural form of the water dispersible oil/grease-sizing and water-sizing agent is shown in Structure III.

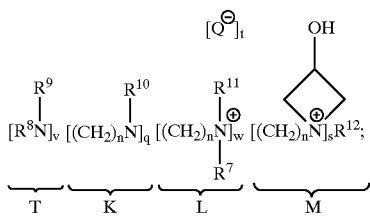

Structure III wherein
$R^8, R^9, R^{10}, R^{11}, R^{12}$=J, H,—$(CH_2)_{1-6}$H, —$(CH_2CH_2O)_{1-10}$H,

—$CH_2CH(OH)CH_3$, —$CH(CH_3)CH_2OH$,

—$CH_2CH(OH)CH_2Cl$, 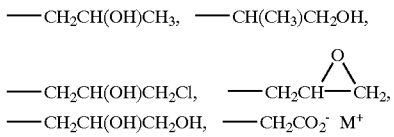

—$CH_2CH(OH)CH_2OH$, —$CH_2CO_2^-$ $M^+$ (M=group 1 or 2 metal), —$(CH_2)_{1-6}NH_{2,1,0}(R_8)_{0,1,2}$, where any two of $R^8$, $R^{10}$, $R^{11}$, or $R^{12}$ could be the same carbon chain, $R^7$,=H, —$CH^2CH(OH)CH^2$, which can be cross-linked to nitrogen on K or L or m on a different fluoro(hydroxyl) alkyl, polyalkyl amino halohydrin or organo sulfonate, where at lest one of $R^8$, $R^9$, $R^{10}$, $R^{11}$, $R^{12}$ must be a fluorochemical as denoted by J, and J is selected from

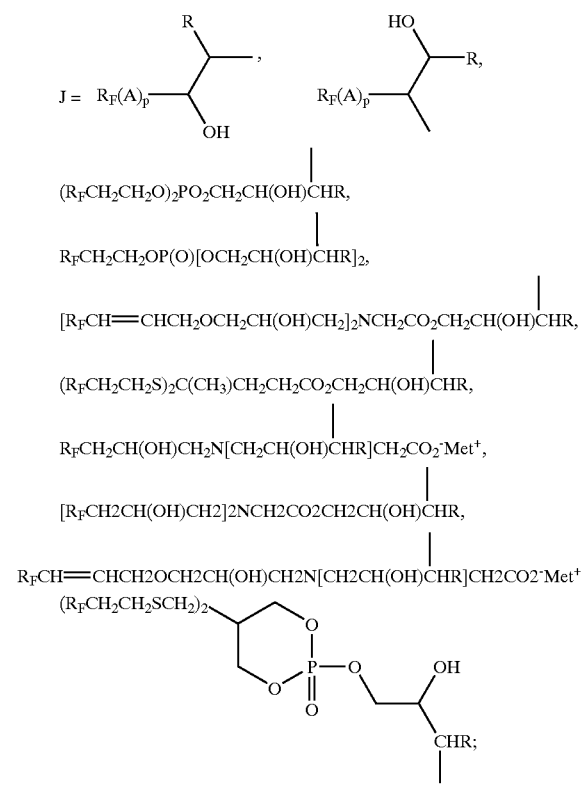

wherein
A=—$(CH_2)_{1-9}$—, —$CH_2CHI(CH_2)_{1-9}BCH_2$—, —CH=CH$(CH_2)_{1-9}BCH_2$—, —$(CH_2)_{1-11}BCH_2$—,—$(CH_2)_{1-2}B(CH_2)_{1-10}BCH_2$—, where B=O, $CO_2$, $CO_2[(CH_2)_{1-2}O]_{1-10}$, $OCH_2CO_2$, $OCH_2CO_2CO_2[(CH_2)_{1-2}O]_{1-10}$, S, $SO_2$, $SCH_2$, C(O)S, $SCH_2C_2O[(CH2)_{1-2}O]_{1-10}$, $S[(CH_2)_{1-2}O]_{1-10}$, S(O)NR', C(S)NR', $S(O)NR'CH_2CH_2O$, C(O)NR', $OCH_2C(O)NR'$, $OPO_3$, NR', $SCH_2C(O)NR'$, —$N(R)CH_2CO_2$, where R'=H, $(CH_2)_{1-6}$; R=H, —$(CH_2)_{1-6}$H:

RF=$F(CF_2)_{4-18}$, $CF_3CF(CF_3)(CF_2)_{3-5}$, $CF_3CF_2CF(CF_3)(CF_2)_{3-5}$, $H(CF_2)_{4-18}$, $HCF_2CF(CF_3)(CF_2)_{3-5}$, $HCF_2CF_2CF(CF_3)(CF_2)_{3-5}$, cycloperfluoroalky radicals of the formula $C_zF_{(2z-1)}$ where z is an integer having a value of from 4–6 inclusive;

n, p, q, s, t, v, and w are integers,
p=0, 1,
n=1–6
v+q+w+s=3–1000,
q, w, s each may be zero,
t=w+s,
Q=$Cl^-$, $Br^-$, $I^-$, $CH_3C_6H_4SO_2^-$, $CH_3SO_2^-$,
and K, L and M are randomly distributed along the polyamine and T is a amine on the end of the polyamine chain.

Structure III: Preferred Structure of the Oil/Grease- and Water-Sizing Agent

The preferred structure of the agent can be called perfluoro(hydroxyl)alkyl, alkylpolyamino halohydrin or organo sulfonate polymer and is shown in Structure III. It has the following components:

The polyamine is made up of randomly distributed K, L and M groups and the terminal T group and is shown in Structure III.

the cellulose-reactive group is $R^8$, $R^9$, $R^{10}$, $R^{11}$, $R^{12}$ and/or $R^7$.

the fluorochemical group is J with J substituted upon the polyamine occurring as $R^8$, $R^9$, $R^{10}$, $R^{11}$, and or $R^{12}$, the hydrophillic group can be the hydroxyl functionality in the J substructure.

The combination of K, L, and M groups and the T group shown in Structure III is derived from the polyamine. K, L, and M groups are randomly distributed along the polyamine chain. The polyamine substructure is also depicted in Structure IV, the Polyamine with Fluorocarbon Substitution, as groups V, W, Y, and U.

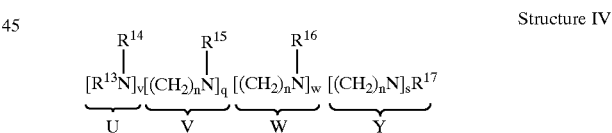

Structure IV $R^{13}$, $R^{14}$, $R^{15}$, $R^{16}$, $R^{17}$=J, H, —$(CH_2)_{1-6}$H, —$(CH_2CH_2O)_{1-10}$H,
—$CH_2CH(OH)CH_3$, —$CH(CH_3)CH_2OH$, —$CH_2CO_2$—$M^+$ (M=group 1 or 2 metal), —$(CH_2)_{1-6}NH_{2,1,0}(R^{13})_{0,1,2}$, where any two of $R^{13}$, $R^{15}$, $R^{16}$, or $R^{17}$ could be the same carbon chain, and J is selected from

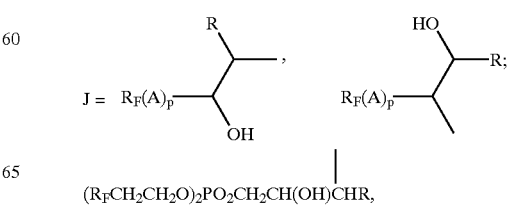

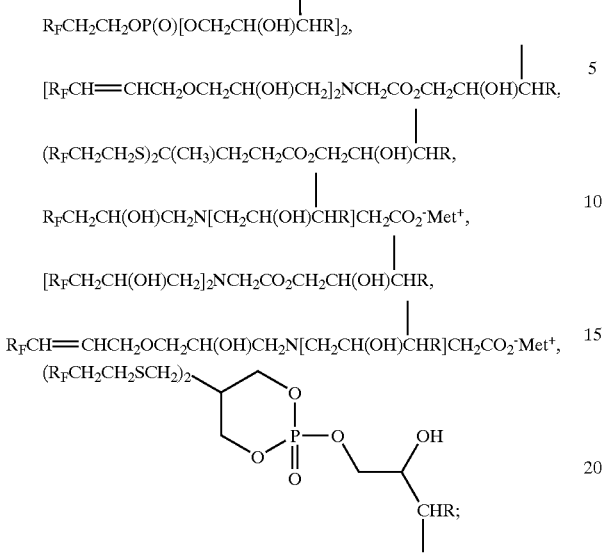

$R_FCH_2CH_2OP(O)[OCH_2CH(OH)CHR]_2$, $[R_FCH=CHCH_2OCH_2CH(OH)CH_2]_2NCH_2CO_2CH_2CH(OH)CHR$, $(R_FCH_2CH_2S)_2C(CH_3)CH_2CH_2CO_2CH_2CH(OH)CHR$, $R_FCH_2CH(OH)CH_2N[CH_2CH(OH)CHR]CH_2CO_2\text{-}Met^+$, $[R_FCH_2CH(OH)CH_2]_2NCH_2CO_2CH_2CH(OH)CHR$, $R_FCH=CHCH_2OCH_2CH(OH)CH_2N[CH_2CH(OH)CHR]CH_2CO_2\text{-}Met^+$, $(R_FCH_2CH_2SCH_2)_2$—

Wherein
$R_F = F(CF_2)_{4-18}$, $CF_3CF(CF_3)(CF_2)_{3-5}$, $CF_3CF_2CF(CF_3)(CF_2)_{3-5}$, $H(CF_2)_{4-18}$, $HCF_2CF(CF_3)(CF_2)_{3-5}$, $HCF_2CF_2CF(CF_3)(CF_2)_{3-5}$, Cycloperfluoroalky radicals of the formula $C_zF_{(2z-1)}$ wherein z is an Integer having a value of from 4–6 inclusive;
R=H, —$(CH_2)_{1-6}H$;
n, q, s, v, and w are integers,
n=1–6,
v+q+w+s=3–1000
q, w, s each may be zero,
and V, W and Y are randomly distributed along the fluorcheicals-substituted polyamine and U is an amine on the end of the polyamine chain.

Structure IV: Polyamine With Fluorochemical Group Substitution

The polyamines include polyalkyleneimines, diethylenetriamine, triethylenetetraamine, tetraethylenepentamine, dihexamethylenetriamine, and their branched and/or alkylated derivatives. These would include polyalkyleneimines containing primary, secondary and tertiary amino groups. Apparently, the amino group provides the reaction centers for the fluorochemical and cellulose-reactive component precursors and permits the hydrophillic group to be substituted on the polyamino chain.

Some examples of the most preferred polyamines include diethylenetriamine, triethylenetetraamine, and tetraethylenepentamine.

The cellulose reactive group precursor is a reactive chemical selected from the list consisting of epihalohydrins, epiorganosulfonates and oxiranes.

The preferred cellulose reactive group precursor are epihalohydrins or epiorganosulfonates depicted in Structure II.

The even more preferred cellulose reactive group precursor is epichlorohydrin. The epihalohydrins are often referred to as 'epi' and this abbreviation is used in this invention description.

Structure VI and Analogues

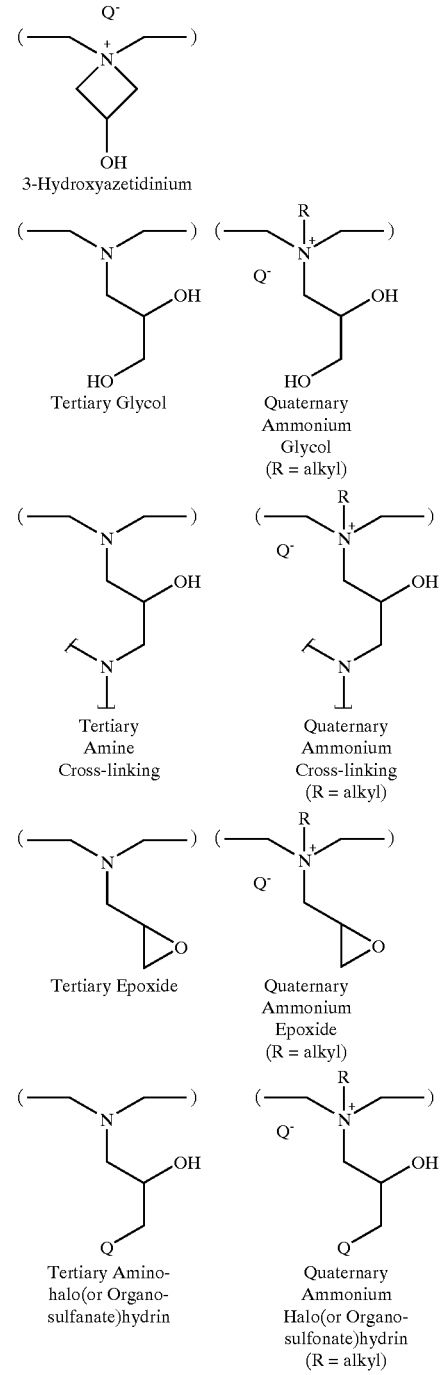

3-Hydroxyazetidinium

Tertiary Glycol

Quaternary Ammonium Glycol (R = alkyl)

Tertiary Amine Cross-linking

Quaternary Ammonium Cross-linking (R = alkyl)

Tertiary Epoxide

Quaternary Ammonium Epoxide (R = alkyl)

Tertiary Amino-halo(or Organo-sulfanate)hydrin

Quaternary Ammonium Halo(or Organo-sulfonate)hydrin (R = alkyl)

If the cellulose reactive group is derived from epihalohydrin or epiorganosulfonates (Structure II), then the product of the reaction with the fluorocarbon substituted polyamine can take many forms as shown in The scheme that shows Structure VI and Reaction Analogues.

Although most of the forms shown in Structure VI and Reaction Analogues are believed to react with cellulose and/or other nitrogen atoms of the polyamines, the 3-hydroxyazetidinium structural formalism or the epoxide structure are likely the most reactive with cellulose. Additionally, they are also the most reactive with nitrogens from different polyamines leading to cross-linking. The 3-hydroxyazetidinium or the epoxide can also react with nitrogens from the same molecule creating intramolecular cross-linking. Each of the structural forms have varying reactivity to cellulose and inter or intra molecular reactivity with amines to produce cross-linking. The presence of the 3-hydroxyazetidinium has been substantiated by nuclear magnetic resonance spectroscopy analysis, while the epoxide is not present based on the spectroscopy. However, the epoxide might be a fleeting intermediate due to its high reactivity.

The intermolecular cross-linking leads to the polymeric nature of the agent. The Mw measured molecular weight of the agents is from 10,000 to 35,000,000 Daltons as measured by size exclusion chromatography.

The 3-hydroxyazetidinium formation is dependent upon the epi compounds reacting at a secondary amine. The 3-hydroxyazetidinium and the epoxide form are the preferred forms of the cellulose reactive group.

The fluorochemical group, ($R_F$), is further characterized as a monovalent, perfluorinated, alkyl or alkenyl, straight, branched or cyclic organic radical having three to twenty fully fluorinated carbon atoms, which can be interrupted by divalent oxygen or sulfur atoms with each $R_F$ radical being identical or different from the other $R_F$ radicals and has an amino-reactive component. This fluorochemical class of organic radicals in which a large percentage of hydrogen atoms are replaced by fluorine atoms giving a segment that provides low surface energy for the sizing agent. Typically, the mass of these fluorochemical compounds is 30–80% fluorine.

It is useful to consider the generalized reaction scheme to obtain the invention is shown in Generalized Reaction Scheme. Although a reaction sequence is shown, it should be possible to perform the reactions in any order. It is preferred to react the $R_F$ group with the polyamine in the reaction labeled 'Reaction # 1', followed by reaction with the cellulose reactive group precursor in the reaction labeled 'Reaction # 2'. The structural depiction in the Generalized Reaction Scheme should be considered a schematic representation of the reactions to obtain the invention. Although an order is implied in the schematic, any reaction order should be possible.

Generalized Reaction Scheme

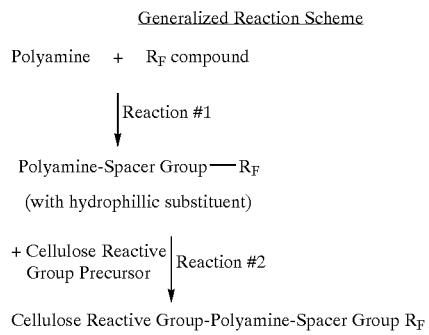

Based on the generalized reaction scheme and the Structure shown in Structure III, the $R_F$ compound has certain structural features. Prior to reaction with the polyamine (Reaction #1), the $R_F$ Compound group has an amine-reactive substituent. Examples of this amine-reactive component are epoxide, or halohydrin functionality. After the reaction there is a spacer group between the $R_F$ and the polyamine. The precursor to the spacer group normally has an amine-reactive component and leads to the hydrophillic substituent on the $R_F$ Spacer Group. Examples of the amine-reactive substituent on the $R_F$ compound are epoxides and halohydrin.

A preferred but not limiting means to prepare the perfluoro(hydroxyl)alkyl, alkylamino halohydrin (or organo sulfonate) polymer is to first react a fluorinated halohydrin or fluorinated epoxide(Structure V) with the unsubstituted polyamine backbone(Reaction #1). This reaction results in the Polyamine with Fluorocarbon Substitution, Structure IV. The next reaction (Reaction #2) is the fluorocarbon substituted polyamine with epihalohydrin or epiorganosulfonates (Structure II) to produce the polymer depicted in Structure III.

The preferred precursors to the agent described in this invention are fluoroalkyl-hydroxyl-alkylpolyamine compounds, which can be produced in several ways. Preparations of some useful fluoroalkylhydroxylamine compounds are taught in J. Fluorine Chemistry V55, 1–11 (1991), J. Fluorine Chem. V84, 53–61 (1997) and references therein, J. Fluorine Chem. V24, 105–115 (1984), French patent FR2530623, New J. Chem. 1993, 17, 425–434, U.S. Pat. No. 4,084,059 (1978), U.S. Pat. No. 4,165,338 (1979), U.S. Pat. No. 4,284,746 (1981), J. Fluorine 30 (1985) 37–57, U.S. Pat. No. 5,750,043 (1998), U.S. Pat. No. 6,156,222 (2000), DE 2018461 (1971). One particularly useful route to intermediate fluoro-alkyl-hydroxyl-amine compounds involves reaction of fluorinated epoxides of the general structure shown in Structure V with the unsubstituted polyamine backbone, Structure II. Alternatively, fluorinated halohydrins could be used in place of the fluorinated epoxides.

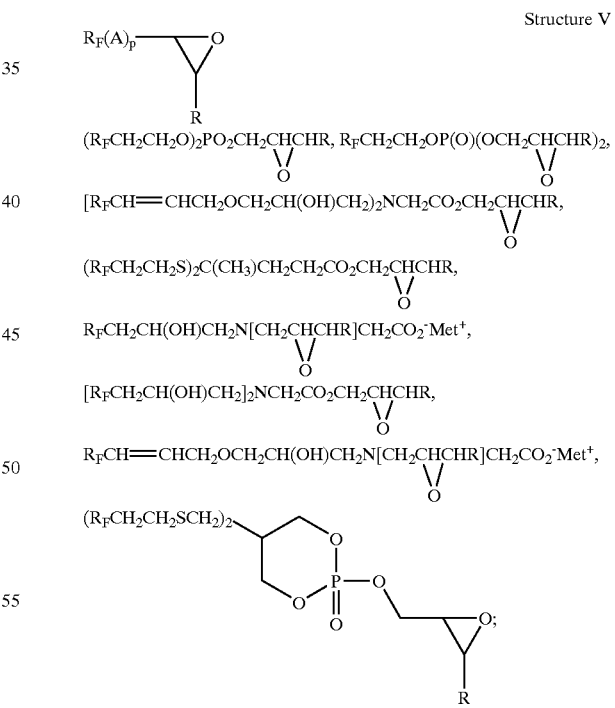

Structure V $R_F$=F(CF$_2$)$_{4-18}$, CF$_3$CF(CF$_3$)(CF$_2$)$_{3-5}$, CF$_3$CF$_2$CF(CF$_3$)(CF$_2$)$_{3-5}$, H(CH$_2$)$_{4-18}$, HCH$_2$CF(CH$_3$)(CH$_2$)$_{3-5}$, HCH$_2$CH$_2$CF(CH$_3$)(CH$_2$)$_{3-5}$, Cycoperfluoroalky radicals of the formula C$_z$F$_{(2g-1)}$ where z is an Integer having a value of from 4–6 inclusive A=—(CH$_2$)$_{1-9}$—, —CH$_2$CHI(CH$_2$)$_{1-9}$BCH$_2$—, —CH=CH(CH$_2$)$_{1-9}$BCH$_2$—, —(CH2)$_{1-11}$BCH$_2$—, —(CH$_2$)$_{1-2}$B $(CH_2)_{1-10}BCH_2$—, where B=O, $CO_2$, $CO_2[(CH_2)_{1-2}O]_{1-10}$, $OCH_2CO_2$, $OCH_2CO_2[(CH_2)_{1-2}O]_{1-10}$, $O[(CH_2)_{1-2}O]_{1-10}$, S, $SO_2$, $SCH_2CO_2$, C(O)S, $SCH_2C_2O$ $[(CH_2)_{1-2}O]_{1-10}$, $S[(CH_2)_{1-2}O]_{1-10}$, S(O)NR', C(S)NR', $S(O)NR'CH_2CH_2O$, C(O)NR', $OCH_2C(O)NR'$, $OPO_3$, NR', $SCH_2C(O)NR'$, —N(R)$CH_2CO_2$, where R'=H, $(CH_2)_{1-6}$;
P=0, 1
R=$(CH_2)_{0,6}H$ Structure V: Fluorinated Epoxides Fluorinated epoxides can be readily produced by several methods known to those skilled in the art. Examples of preparations of some of these fluorinated epoxides are given in German Patent DE 2018461 (1971), J. Fluorine Chemistry V55, 1–11 (1991); V Cirkva, B. Ameduri, B. Boutevin, O. Paleta, J. Fluorine Chem. V84, 53–61 (1997) and references therein; Japanese Kokai Patent Application No. Sho 63[1988]-17858; J Fluor. Chem. 83, 151 (1997); U.S. Pat. No. 5,585,517 (1986); FR Pat. 2529890; J. Fluor. Chem. 24, 93 (1984). One example involves free-radical initiated reactions of commercially available fluoroalkyl iodides and allylalcohols to generate fluorakyliodohydrins, which are readily converted to epoxides with base.

Both the $R_F$ spacer group and the cellulose reactive cursor group need the nitrogens of the polyamine as the reaction centers to assemble the perfluoro(hydroxyl)alkyl, alkylpolyamino halohydrin (or organo sulfonate) polymer. From Structure III the number moles of $R_F$ spacer group in the repeating monomer unit is denoted as "r". "r" also be denotes the number of J groups per repeating monomer unit.

A key variable is the mole ratio of this $R_F$ Spacer group to the number of nitrogen atoms of the polyamine. The number of moles of $R_F$ Spacer group must be less than the total number of available nitrogens to allow the cellulose reactive precursor amine reaction sites. Since the $R_F$ reaction with the nitrogen atoms is preferably carried out first, the cellulose reactive group will likely react with the remaining nitrogen atoms of the polyamine. The subsequent reaction of cellulose reactive group adds the cellulose-reactive and cross-linking functionality. Thus, the ratio of epihalohydrins or epiorganosulfonates to available nitrogen atoms is also an important synthetic variable.

Because of the variety of reaction products between the fluorocarbon substituted polyamine and the cellulose reactive group precursor, a single fixed ratio of total reactants to nitrogens is difficult to identify. For example, in the case of epichlorohydrin see Structure VI and Analogues for the variety of products. At a single nitrogen the epi might react twice at one nitrogen. This could convert a primary amine to a tertiary amine.

The preferred reaction sequence is for the polyamine and the $R_F$ spacer group to be reacted together first. Then the cellulose-reactive group is added to the $R_F$-spacer group/polyamine or fluorocarbon substituted polyamine.

For the perfluoro(hydroxyl)alkyl, alkylpolyamino halohydrin (or organo sulfonate) polymers shown in Structure III, the more preferred (relative to performance and dispersion stability) are resulting from the reaction of epichlorohydrin with the intermediate fluoroalkyl-hydroxyl-alkylpolyamine. compound, wherein A=—$CH_2$—,—$CH_2CHI(CH_2)_{1-9}OCH_2$—, —CH=CH$(CH_2)_{1-9}OCH_2$—, —$CH_2CHI$ $(CH_2)_{1-8}CO_2CH_2$—, —CH=CH$(CH_2)_{1-8}CO_2CH_2$—, —$(CH_2)_{1-11}OCH_2$—, —$(CH_2)_{1-11}SCH_2$—, p=0 or 1, $R_F$=a mixture predominantly consisting of —$(CF_2)_{4-18}F$, r-to-nitrogen-atoms-on-the polyamine reactant ratio=0.05–0.75, R=$CH_3$, H, n=2, 3, 4, or 6, the sum of v, q, w, and s is 3 to 100, $R^{8-12}$=H or a mix of H and $CH_3$, and the ratio of epihalohydrins or epiorganosulfonates to nitrogen atoms on the polyamine of 0.05–2.0.

Even more preferred (relative to performance and dispersion stability) are perfluoro(hydroxyl)alkyl, alkylpolyamino halohydrin (or organo sulfonate) polymers shown in Structure III, resulting from the reaction of epichlorohydrin with the intermediate fluoroalkyl-hydroxyl-alkylpolyamine compound of the formula with A=—$CH_2$—, —$CH_2CHI(CH_2)_{1-9}OCH_2$—, —CH=CH$(CH_2)_{1-9}OCH_2$—, —$CH_2CHI$ $(CH_2)_{1-8}CH_2CH_2$—, —CH=CH$(CH_2)_{1-8}CO_2CH_2$—, —$(CH_2)_{1-11}OCH_2$—, p=0 or 1, $R_F$=mixture of consisting predominantly —$(CF_2)_{8-14}F$, r-to-nitrogen-atoms-on the polyamine reactant ratio=0.1–0.65, R=$CH_3$, H, n=2, 3, or 6, the sum of v, q, w, and s is 3 to 25, $R^{8-12}$=H or a mix of H and $CH_3$, and the ratio of epihalohydrins or epiorganosulfonates to nitrogen atoms on the fluorochemical polyamine composition of 0.10 to 1.0.

Most preferred (relative to performance and dispersion stability) are perfluoro(hydroxyl)alkyl, alkylpolyamino halohydrin (or organo sulfonate) polymers shown in Structure III resulting from the reaction of epichlorohydrin with the intermediate fluoroalkyl-hydroxyl-alkylpolyamine compound of the formula wherein A=—$CH_2$— p=1, $R_F$=mixture of consisting predominantly of $(CF_2)_{6-12}F$, r-to-nitrogen-atoms-on-the polyamine reactant ratio=0.3–0.55, R=H, n=2, the sum of v, q, w, and s is 3 to 6, $R^{6-12}$=H, with the ratio of epihalohydrins or epiorganosulfonates-nitrogen atoms on the polyamine of 0.33–0.75.

The batch reaction (Generalized Reaction Scheme) of the epihalohydrins or epiorganosulfonates of the formula shown in Structure II, with an intermediate fluoroalkyl-hydroxyl-alkylpolyamine must be performed in a suitable solvent. Useful solvents of this invention dissolve or disperse the reagents and product evenly and stabilize the product as a dispersion for ease of use. Non-polar solvents can be used to react the epi and amine materials to one another, but the solvent must be of a polar nature to facilitate the formation of the important 3-hydroxyazetidinium functionality. Examples of preferred solvents/dispersants include, water soluble solvents such as $C_{1-6}$ alcohols and diols, acetonitrile, $C_{3-6}$ ketones, mixtures of these solvents and water, or just water. More preferred solvents include $C_{1-4}$ alcohols, water, and mixtures of $C_{1-4}$ alcohols and water. The most preferred solvent is water.

If the reaction of epihalohydrins or epialkylsulfonates with fluoroalkyl-hydroxyl-polyalkylamine is run without solvent present, an intractable material will form due to extensive cross-linking. This material can not be dispersed for practical application and usage. If the reaction is run in very high concentration, a very viscous product will result, that is difficult to manage. If the reaction is run at too low of concentration, a low viscosity product will result that does not remain stable as a homogeneous dispersion/solution. Useful products are produced when the solids concentration is 2 to 75%, more preferred is a total solids concentration of 5 to 55% and the most preferred concentration is 20 to 45% total solids.

Before bringing the epihalohydrins or epialkylsulfonates together with the fluoroalkyl-hydroxyl-alkylpolyamine. it is essential to predisperse/dissolve the fluoroalkyl-hydroxyl-alkylpolyamine evenly in the solvent. If the predispersing/dissolution step is carried out at too low a temperature and/or for too short of time, much of the fluoroalkyl-hydroxyl-alkylpolyamine will remain in an undispersed/undissolved state. Less effective products are produced if the fluoroalkylhydroxyl-polyamine is not thoroughly dispersed/dissolved. Higher temperatures lower the fluoroalkyl-hydroxyl-polyamine viscosity, and improve the completeness and homogeneity of the dispersion/solution and/or allow the fluoroalkyl-hydroxyl-polyamine to disperse/dissolve in a shorter period of time. The preferred process dispersing/dissolving step is carried out at >50 C for >60 min. A more useful process dispersing/dissolving step is carried out at >75 C for >20 min. The most useful process dispersing/dissolving step is carried out at 95 C for greater than 5 min. The fluoroalkyl-hydroxyl-polyamine may be dispersed all at once or in a dropwise fashion.

For practical purposes including applications to cellulosic materials, the invention must be water soluble or dispersible and the resulting solution/dispersion must remain stable. The water solubility/dispensability and subsequent stability of the invention is related to the level of hydrophilic character incorporated into the invention. The more hydrophobic character incorporated in the invention, the more hydrophilic character that must also be incorporated to result in a water soluble/dispersible material and subsequent stability. This is commonly referred to as the hydrophobic/hydrophilic balance. Functionality that is effective at increasing the water solubility/dispensability of the invention include, but are not limited to, alcohols (OH), ammonium salts ($NR_4^+$ $Cl^-$), carboxylate salts ($CO_2^-$ $M^+$), amines ($NRH_2$ or $NR_2H$), thiols (SH), Sulfate salts ($RSO_3^{-M+}$), and phosphate salts ($ROPO_2^-$ $M^+$, $[RO]_2$ $PO^-$ $M^+$). In the invention examples, the alcohol and ammonium salt serve to impart the hydrophilic character that results in water solubility/dispensability. In addition to having the right balance of hydrophilicity and hydrophobicity, the distribution of the hydrophilic groups can be important to stability.

The solution/dispersion stability of the invention is determined by the length of time that the invention remains homogeneously dissolved/dispersed after initial formation. Precipitation, stratification, and gelatin are examples of ways that instability can manifest itself. Gelation commonly occurs if a material is too highly cross-linked. Stratification can occur if two phases of differing densities are incorporated into the solution/dispersion and over time the more dense material with stratify to the bottom. If adequate viscosity is built into the mixture of phases, stratification can be eliminated or retarded. Viscosity can be varied by varying the concentration of the invention in the solution/dispersion, varying the degree of cross-linking on the polymeric backbone of the invention, and by varying the type and amount of moieties on the polymer backbone that associate strongly with similar moieties on separate polymer molecules. The latter property is commonly referred to as associative thickening. In the current invention, the hydrophobic fluorocarbon segments tend to associate with one another when placed in a hydrophilic medium, such as water.

Useful products will be formed when the reaction of epihalohydrins or epiorganosulfonates with fluoroalkyl-hydroxyl-polyamine is performed at temperatures above 60 C for 30 min. or more. During the desired reaction of the epihalohydrins or epiorganosulfonates with the fluoroalkyl-hydroxyl-alkylpolyamine, undesired side reactions may occur between the epihalohydrins or epiorganosulfonates and the solvent. The undesired side reactions are minimized with lower reaction temperatures. Higher reaction temperatures facilitate 3-hydroxyazetidinium formation and cross-linking. Thus, in order to achieve the preferred result, an effective perfluoro(hydroxyl)alkyl, alkylamino halohydrin (or organo sulfonate), it is preferred to perform the reaction in two stages, first at a lower temperature, then at a higher temperature. The lower end of the first stage temperature is often limited by the reaction viscosity. More useful products are obtained with a first stage reaction temperature of <70 C for 30 min or more followed by a second stage reaction temperature of >70 C for 30 min or more. The most useful products are obtained when the first stage reaction temperature of <55 C for 30 min or more followed by a second stage reaction temperature of >75 C for 30 min or more.

Running the reaction of epihalohydrins or epiorganosulfonates with fluoroalkyl-hydroxyl-alkylpolyamine at too high of a pH results in excessive cross-linking and partial or complete destruction of the essential 3-hydroxyazetidinium functionality. Running the reaction at too low of a pH results in minimal reaction. A useful product is obtained when the reaction pH is initially <10.5 and >2.5 throughout the reaction. A more useful product is obtained when the initial reaction pH is <10 and >3.0 throughout the reaction. The most useful product is obtained when the initial reaction pH is <9.5 and >3.5 throughout the reaction.

Structure VI: 3-hydroxyazetidinium

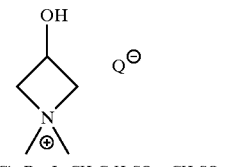

Structure VI $Q = Cl^-, Br^-, I^-, CH_3C_6H_4SO_2^-, CH_3SO_2^-$.

The cross-linking of the cellulose reactive group with nitrogen groups can occur via intra- and inter-molecular processes. This cross-linking is important since it converts the compound into a polymeric compound, which is important for the final performance and water compatibility of the invention. A preferred form of the cellulose reactive group is the 3-hydroxyazetidinium, which is a very effective cross-linker to other nitrogen atoms. This group is shown in Structure VI.

An indirect measurement of the amount of cross-linking is the molecular weight. The product average molecular weight may be from 10 thousand to 20 million as measured by size exclusion chromatography (SEC) using hexafluoro-isopropanol as the solvent. SEC separates molecules according to their hydrodynamic volume in solution. The detectors used for the SEC studies were Refractive Index and a UV photo diode array detectors SEC is not an absolute technique for molecular weight determinations and requires column calibration with standard polymers of known molecular weight. This method determines the number average molecular weight ($M_n$), weight average molecular weight ($M_w$), Z-average molecular weight ($M_z$), polydispersity index ($M_w/M_n$ and $M_z/M_w$), and molecular weight distribution of a polymer sample. The calculated molecular weights, in this procedure are based on a calibration derived from narrow distribution poly(methyl methacrylate) (PMMA) standards. Since they are chemically dissimilar to the analytes in question, this procedure provides relative molecular weight data only.

Another measurement of the molecular weight is by doing light scattering studies. Light scattering is a more absolute method than SEC which relies on calibration standards. The molecular weight measurements of the invention are reported in Table XII.

A monomer unit as shown in Structure III, with the preferred substituents has a molecular weight of about 1200

Daltons. For a typical product encompassed by this invention, Table XIII, the SEC measured molecular weight is 82,000 as $M_n$ or 7,454,000 as $M_w$ for a typical product encompassed by this invention, Table XIII. Thus, the cross-linking is quite extensive. Interestingly, the preferred 3-hydroxyazetidinium reactive component Structure VI and Table XVII is a major component of the product even after this 3-hydroxyazetidinium or other reactive species such as the epoxide shown in Structure VI and Analogues have efficiently created the cross-linking.

The cellulose reactive group plays a crucial function in the performance of the oil/grease-and water-sizing agent. The 3-hydroxyazetidinium and the similar epoxide (see Structure VI and Analogues) are the preferred cellulose reactive groups. Since these structures are important for the preferred structure, a more extensive discussion is useful to describe various aspects of the 3-hydroxyazetidinium functionality.

3-hydroxyazetidinium Group: The 3-hydroxyazetidinium group is reactive towards cellulosic materials (see Chapter 2 by H. H. Espy in "Wet-Strength Resins and Their Application", TAPPI Press, Atlanta, Ga., 1994, L. L. Chan, Ed and references cited therein). While not being bound by theory we conclude that this group will form covalent bonds between the cellulose and the invention, thus anchoring the invention to the cellulose and locking the orientation of the material of the invention in place such that the perfluorinated tails may be pointed away from the treated cellulose substrate, providing the maximum efficiency from the perfluorinated tail component of the invention. It is believed that the 3-hydroxyazetidinium group reacts with the cellulose primarily through the carboxylic acid or salt groups on the cellulose.

The reaction of 3-hydroxyazetidinium groups with carboxylic acid or salt groups is well known, but the combination of perfluorinated tails and 3-hydroxyazetidinium groups have not before been combined in the same molecule. In addition, it is believed that the 3-hydroxyazetidinium group can act to cross-link different molecules of the invention across and around the surface of the cellulosic substrate through free amine functionality (amines that have less than four bonds to alkyl groups) also present in the structure of the invention, further locking it into place on the cellulosic substrate (Espy cited above). The 3-hydroxyazetidinium group also provides cationic character to the structure of the invention. This attracts the invention to anionic substrates, such as cellulose, and provides additional anchoring to the substrate. The strong anchoring resulting from both the covalent bonds between the invention and the substrate, the cross-link bonds between different molecules of the invention, and the ionic bonds formed between the cationic invention and the anionic substrate, lock the orientation of the invention on the surface of the cellulosic substrate. It is believed that molecules of previous technologies lost their orientation when exposed to elevated temperatures or polar substances, such as water, thus losing the ability to repel oil as temperature increased and to provide very inefficient resistance to polar wetting agents. The strong anchoring of the current invention allows the invention to maintain the efficient orientation on the substrate, even when exposed to elevated temperatures or polar solvents. Thus the current invention provides both efficient hot oil/grease and hot water sizing properties to a treated substrate.

The most effective form of the 3-hydroxyazetidinium results when the reactive site for the reaction of the epihalohydrin or epiorganosulfonate with the polyamine occurs at a secondary amine. Thus, for most effectiveness secondary amines must be present in the polyamines prior to reaction with the epihalohydrin or epiorganosulfonate.

In order to determine the 3-hydroxyazetidinium component derived from the epichlorohydrin, extensive analytical work to verify its presence was done. The presence of the 3-hydroxyazetidinium functionality in the structure can be observed by carbon nuclear magnetic resonance ($^{13}C$ peaks centered between 70–75 ppm). Failure to generate, or loss of, this functionality reduces the effectiveness of the invention. See Table XVII for performance versus 3-hydroxyazetidinium content.

The analysis method of choice was nuclear magnetic resonance spectroscopy. 1 dimensional and 2 dimensional techniques were utilized which provided structural linkage data and quantitative data, respectively. To assure the carbon and hydrogen chemical shift assignments of the preferred invention were correct the product was synthesized with $^{13}C$ enriched epichlorohydrin, labeled in the number two carbon position. This labeled product was used in an Heteronuclear Multiple Quantum Coherence experiment. Additionally a COSY (Correlated Spectroscopy) provided information about the $^1H$—$^1H$ connectivity. Referring to the structure in Structure VI, the chemical shift of the ring methylene protons is 4.12 and 4.52 and the methine proton is 4.63.

Based on the nuclear magnetic resonance spectroscopy the 3-hydroxyazetidinium concentration is greater than about 10% relative to the moles of polyamine for the preferred formulation of the invention. Greater than 5 mol % relative to $R_F$ segment moles or >10 mole % relative to TETA segment moles is preferred and >10 and >20 mole % respectively even more preferred. Since the cross-linking is due to the 3-hydroxyazetidinium or other highly reactive species such as the epoxide, both shown in Structural VI and Analogues, it is possible that during the reaction the 3-hydroxyazetidinium content may even be higher. The materials that were measured by this method were as the final cross-linked material.

Based on the known chemistry of 3-hydroxyazetidinium other tests have been done to confirm the presence of the 3-hydroxyazetidinium. Strong base is known to decompose the 3-hydroxyazetidinium. When an agent that had demonstrated good performance in oil/grease- and water-sizing was treated by base both the 3-hydroxyazetidinium content was decreased as measured by nmr and the sizing performance was significantly reduced. See Table 17. Conditions that are expected to destroy azetidinium functionality are detrimental to the hot oil sizing performance of the invention.

When the compounds of this invention are used as oil/grease- and water-sizing agents for paper, they are applied to the paper or paper board either internally or externally. When applied externally, the application can be by any conventional method such as padding, spraying or from a size press in amounts sufficient to obtain the desired results. It is common to deposit from 0.01 to 0.6 wt, percent based on the weight of the dry fiber. In addition to the compound of the invention, any of the conventional additives used in the paper industry such as calcium carbonate, clay, optical brighteners, alum, titanium dioxide, defoaming agents, salt, dyes, starch, polymeric latex binders, carboxymethyl cellulose, polyvinyl alcohol, sizing agents such as alkyl-ketene-dimer or alkenyl-succinic anhydride, styrene-maleic-anhydride, styrene acrylate emulsions, etc. can be present. The agent can be added to the wet end of the paper making process. This application technique is referred to as internal addition. This can also be referred to as addition to the paper furnish prior to forming the paper.

Examples of Preparation and Testing of the Agent

The following examples are illustrative of the preparation, characterization and testing of the water-dispersible oil/grease-sizing and water-sizing agent for cellulosic materials.

Procedures for application of water-dispersible oil/grease-sizing and water-sizing agent to substrates Internal Addition Method: Chemical additives, including fluoroalkyl-hydroxyl-alkylpolyamine-3-hydroxyazetidinium polymers were added to the furnish while paper was being made using a pilot Fourdrinier papermachine. The type of furnish, chemical additives, and addition points are listed with each example described below. All chemical additions are expressed as a weight percent of the dry weight of furnish. The sizing property of the paper was determined using the test methods described.

Surface Application (External Sizing) Method: Unless otherwise specified in the examples the paper was prepared by the following methodology. Sheets of standard 42–70 g/m$^2$ basis weight pet-food bag base paper (no previous surface treatment), cut from rolls of paper prepared on a commercial or pilot paper machine were used for all testing. Paper strips were passed through a single-nip, two-roll, puddle-type press containing 60° C. aqueous dilutions of chemical additives and immediately dried between the felt and stainless steel of a rotating drum-type drier at 104° C. for 50 seconds. Distilled water was used to prepare all solutions. The weight basis for all additives is expressed as wt % dry chemical/dry weight of the fiber. Two-weight percent ethylated starch (Penford 270) was co-applied to the paper samples from the same aqueous dilutions containing the oil/grease-sizing agents. The time that the chemical additive solutions were mixed and heated before treating the paper was five minutes. This time is called the 'hold time'. The amount of chemical additive on the paper was routinely calculated based on the weight of the aqueous solution/emulsion/dispersion picked up by the paper strip. The weight of chemical additive on the paper was periodically confirmed by determining the weight percent fluorine contained in the paper by combusting the paper and analyzing the combustion product by ion chromatography. The sizing property of the paper was determined using the test methods described.

There have been numerous examples of oil/grease-sizing compounds described in the patent literature and several of these are used commercially for oil sizing. These include Scotchban® FC 845, Scotchban® FC807A—3M, St Paul Minn.; Lodyne®® P208E, Lodyne® P201, Lodyne® P514—Ciba Specialty Chemicals, Tarrytown N.Y.; Zonyl® RP and Zonyl® NF—Dupont, Wilmington, Del.; Cartafluor® UHC—Clariant, Charlotte, N.C.; Repearl® F-53N—Mitsubishi International Corp. New York, N.Y. Several of these were evaluated for comparative purposes during the testing of the agents of this invention. The results of these comparative tests are listed in the tables which demonstrate the performance of the agents described in this invention.

Testing Procedures

A. Kit Test:

The oil repellency of the surface is determined by using the TAPPI UM 557 OIL KIT TEST. This test method consists of applying drops of twelve different mixtures of castor oil/heptane/toluene to the paper surface, waiting 15 seconds, wiping off the oil. If the paper is visually stained, it fails the test using that particular mix. The mixtures are ranked from least aggressive to most aggressive by a numbering system from 1–12. More aggressive mixtures were added to the testing, thus extending the possible rating to 16 to differentiate performance against even more aggressive penetrants. The higher the number, the better the result. The respective ratios of castor oil/heptane/toluene for each of the test mixtures are given in the following table.

TABLE I

| Kit Number/Mixed Solvent Number | Kit Test Mixture | | |
|---|---|---|---|
| | Castor Oil (ml) | Toluene (ml) | Heptane (ml) |
| 1 | 200 | 0 | 0 |
| 2 | 180 | 10 | 10 |
| 3 | 160 | 20 | 20 |
| 4 | 140 | 30 | 30 |
| 5 | 120 | 40 | 40 |
| 6 | 100 | 50 | 50 |
| 7 | 80 | 60 | 60 |
| 8 | 60 | 70 | 70 |
| 9 | 40 | 80 | 80 |
| 10 | 20 | 90 | 90 |
| 11 | 0 | 100 | 100 |
| 12 | 0 | 90 | 110 |
| 13 | 0 | 70 | 130 |
| 14 | 0 | 50 | 150 |
| 15 | 0 | 30 | 170 |
| 16 | 0 | 0 | 200 |

B. Boiling Boat Test (BB):

Common test to determine the degree of hot-water sizing obtained in paper. Commonly also referred to as the Hot Float Test or Boat Test (similar to TAPPI Test Method T819). A two-inch square boat is formed from the paper sample and floated on the surface of 99 C distilled water. The time required to reach an arbitrary end point is recorded (100% penetration over 100% of the paper surface area for this work). The side of the paper that is not in contact with the water becomes darkened when penetration occurs. As the test time increases, the resistance to hot-water penetration increases. Unsized paper would register zero seconds, lightly sized paper gives times ranging from 5–20 seconds, moderately sized paper from 21–100 seconds, well sized paper from 101–600 seconds, and hard sized paper will give greater than 600 seconds. If after 600 seconds, the paper is not 100% saturated, the experiment is stopped and the percent saturation noted.

C. Hot Oil Test 1 (Oleic Acid Float):

The test is identical to the Boiling Boat Test, except that 65° C. or 75° C. oleic acid (as indicated in each table) is used in place of water.

D. RP2 Test:

ASTM Test method D722, located in ASTM test methods, V15.09, slightly modified by the Ralston Purina Company. Modification is available from Ralston Purina Company, Checkerboard Square, St. Louis, Mo. 63164-0001. Synthetic fat-simulating oil provided by Ralston Purina. Results are expressed as percent exposed paper surface stained. Lower areas of staining represent greater oil repellency. This test method consisted of cutting paper to be tested into 10 cm×10 cm square samples, lightly folding paper in half and creasing by running a 4.5 cm-wide, 2040-g hard rubber roller along the fold one time. A second crease is created 90 deg to the first in the same manner. A 10 cm×10 cm-grid sheet divided into 100 equal squares (supplied by Ralston Purina Packaging TAPPI laboratory, Checkerboard Square, St. Louis, Mo.) is placed on top of a flat aluminum metal plate, on top of which is placed the creased piece of paper to be tested, on top of which is centered a 2.5-cm high, 2.5-cm inside diameter metal ring. Five-grams of sand is poured into the ring and the ring is removed. Red dyed synthetic oil (1.3 cc, supplied from Ralston Purina Company) is applied evenly to the sand. The entire set up is place in a 60-deg C oven for 24 hours. At the end of this time the percent of surface area of the grid sheet that has been stained is determined and recorded. The stained area varies from 0–100%, with lower staining representing better oil repellency.

E. Hot Oil Test 2: Pet Food:

The oil repellency of the paper samples were additionally or alternatively determined by applying pet food, fatty food, to the paper under pressure and elevated temperature and determining the level of staining obtained on paper exposed to the opposite side of the paper. This test has been described by Ciba Specialty Chemicals Corporation, Tarrytown, N.Y. in the brochure, "Accelerated Pet Food Bag Tests", no date given. This test method consisted of taking a flat aluminum metal plate, on top of which is placed a grid sheet (supplied by Ralston Purina Packaging TAPPI laboratory, Checkerboard Square, St. Louis, Mo.), on top of which is placed a flat piece of paper to be tested, on top of which is placed a metal ring containing ground pet food (minimum 23% chicken fat content) under pressure (38 gms/cm2). The entire stack of materials are heated at a constant elevated temperature (60 C–70 C) for 24 hr. At the end of this time the percent of surface area of the grid sheet that has been stained is determined and recorded. The stained area varies from 0–100%, with lower staining representing better oil repellency. During the tests supporting this invention, a new source of ground pet food was used and apparently this second source had more and/or different fat and oil in it.

F. Molded Board Oil Size Test:

This oil resistance test is similar to a Cobb sizing test. For each molded test article, 1) obtain its original dry weight, 2) Pour 210 deg. F Mazola corn oil into the article to a 0.25" depth, 3) After 5 minutes, pour out the oil, wipe off the plate and reweigh it, 4) obtain the % pick up of oil and inspect for wet spots/staining. The sample fails the test if the weight percent of oil pick up is greater than 10%, or if greater than 5 percent of the surface area of the article is stained.

G. Hercules Size Test (HST)

The sizing property performance in sized paper may be characterized by the Hercules Size Test, a well-recognized test for measuring sizing performance. The Hercules Size Test is described in *Pulp and Paper Chemistry and Chemical Technology*, J. P. Casey, Ed., Vol. 3, p. 1553–1554 (1981). The Hercules Size Test determines the degree of water sizing obtained in paper, by measuring the change in reflectance of the paper's surface as an aqueous solution of dye penetrates from the opposite surface side. The aqueous dye solution, e.g., naphthol green dye in 1% formic acid in the Examples described below, is contained in a ring on the top surface of the paper, and the change in reflectance is measured photoelectrically from the bottom surface.

Test duration is limited by choosing a convenient end point, e.g., a reduction in reflected light of 20%, corresponding to 80% reflectance, in the Examples described below. A timer measures the time (in seconds) for the end point of the test to be reached. Longer times correlate with increased sizing performance, i.e., resistance to water penetration increases. Unsized paper will typically fail at 0 seconds, lightly sized paper will register times of from about 1 to about 20 seconds, moderately sized paper from about 21 to about 150 seconds, and hard sized paper from about 151 to about 2000 seconds or more.

H. Molded Board Water Sizing Test:

This water resistance test is similar to Molded Board oil size test, except 75 C, 2% saline solution is used in place of corn oil and is poured to a depth of 0.50 inches rather than 0.25 inches. The pass/fail criteria are the same as for the Molded Board oil size test.

I. Soil Release Testing:

1. Bleached cotton print cloth (#400), obtained from Test Fabrics, Inc. of West Pittston, Pa. were treated as described for the, "SURFACE APPLICATION (EXTERNAL SIZING) METHOD, but no starch was utilized. The AATCC Test Method 130 was utilized to determine the impact on the polymers of the invention on soil release from stained cellulosic textiles.

The method measures the ability of fabrics to release oily stains during home laundering. A stain is applied to a test specimen. An amount of the staining substance is forced into the fabric by using a specified weight. The stained fabric is then laundered in a prescribed manner (washing procedure Method III and AATCC Standard Reference Detergent 1993) and the residual stain rated on a scale from 5 to 1 by comparison with a stain release replica showing a graduated series of stains. The ratings definitions are as follows, 5—negligible or no stain, 4—slight stain, 3—noticeable stain, 2—considerable stain, 1—severe stain. Independent Textile Testing Service, Inc. of 1503 Murray Ave., Dalton, Ga. 30722, preformed all testing. Test Method 130 Source AATCC (American Associates of Textile Chemists and Colorists), Soil Release: Oily Stain Release Method (Washing procedure: Method III, Ballast: Bleach Cotton, Detergent: AATCC Standard Reference Detergent 1993, Washer: Kenmore Heavy Duty Series 80, Dryer: Kenmore Heavy Duty).

K. Nuclear Magnetic Resonance Spectorscopy:

The equipment used for these measurements were taken using Bruker Avanve NMR and Bruker AMX NMR spectrometers. The solution was prepared by adding ~55 mg of polymer to a 5 mL vial. Then 1 g of methyl sulfoxide-$d_6$ followed by ~85 mg of deuteriated trifluoroacetic acid. After heating with a heat gun a uniform solution was achieved. This solution was transferred to a 5 mm New Era NMR tube for analysis. The 2-Dimensional spectra were collected on a Bruker Avance NMR Spectrometer at a $^1H$ operating frequence of 500 MHz. The 1-Dimensional spectra were collected on the AMX instrument.

L. Wt % F Measurements:

The total fluorine (F) content in paper was determined by ion chromatography (IC). The oil sized paper sample is decomposed in a Schöniger Oxygen flask using combustion paper. The combustion products were absorbed in approximately 25 mL of 5 mM sodium hydroxide solution, transferred, and diluted to volume in a 50 mL volumetric flask (polypropylene). The solution was then, if necessary, filtered through a 0.2 M filter member and analyzed for total F content using a series of ion chromatographic columns coupled to a conductivity detector. An external standard method is used to quantitative the total F level in the sample solution; the limit of detection for this procedure is 0.1 g/mL total F. At very low levels, <0.10 g/mL, spiking of the sample solution with the standard is helpful for peak identification.

M. Molecular Weight Determinations:

1. Aqueous size exclusion chromatography (SEC) of the polymer products was performed utilizing a two-micron, in-line pre-column filter, a Polar Fluoro Gel, 100-angstrom column bank (Polymer standard Service USA Inc., Silver Spring, Md.), a Waters M 996 Photodiode array detector monitoring UV spectra in the range from 210 nM to 400 nM, a Waters Millennium 32 data system, a 45 C hexafluoroisopropanol mobile phase with a flow rate of 1 mL/min, and a tetrahydrofuran internal reference marker. Freeze-dried samples of the invention were made down in the mobile phase (10–20 mg/ml) and injected in 100 micro-liter aliquots. Poly(methyl methacrylate) Standards were used to calibrate the SEC columns.

2. The light scattering measurements were done by using a Size exclusion Chromatography-Multi Angle Laser Light Scattering (SEC-MALLS). The chromatography system, consisting of a Waters M510 analytical pump (Waters Corporation, 34 Maple Street, Milford, Mass. 01757-3696), a manual Injector (Rheodyne, equipped with an 2000 µl injection loop—Fisher Scientific), a Waters "In-line" pre-column filter (frit pore size 2 µm installed between the injector and the column set), a SEC column bank—poly (styrene/divinyl benzene based columns of 100 Å and a Linear (Polymer Standard Service USA Inc., Silver Spring, Md.), a Waters temperature control module for maintaining constant temperature in the column oven, a DAWN DSP Light scattering photometer (Wyatt Technology Corporation, Santa Barbara, Calif.), a Wyatt OPTILAB interferometric refractometer-differential refractive index detector (DRI). The DAWN DSP and DRI detectors are connected in series.

3. The analyses are performed at a flow rate 1 ml/min and the temperature maintained in the column oven is 45° C.

N. Contact Angle Test:

Run as described in ASTM method D5725, found in ASTM test method volume 15.09 utilizing a glycol-based test solution. Higher contact angles (reported in degrees) are achieved with higher levels of sizing. The time that the solution has been in contact with the paper is reported with the contact angle. Longer contact times usually lead to lower contact angles. Contact angles can vary from 0 to 180 degrees. An unsized paper would typically give a 0 degree contact angle after 5 seconds. Paper with high levels of sizing would give a contact angle of >90 degrees after 20 seconds.

O. Oleic Acid Drop Test

Test similar to Kit test in that oleic acid is dropped on a paper sample, and a measurement is taken. All materials are at room temperature. A drop of oleic acid is put on a test sample of paper. After 15 seconds the oleic acid is wiped off. The amount and intensity of staining is observed. If there is no staining a value of 0 is assigned. If the stain has spread in the paper and it is dark, a value 5 is assigned. Intermediate test results are assigned. By its nature this is a relatively qualitative test. Three measurements on three different paper samples are averaged and reported.

Synthesis of Oil/Grease- and Water-sizing Agents

General Synthesis Procedure

In all of the synthetic procedures the dilution solvent is water unless otherwise indicated. Where possible residual monomers were monitored by gas chromatography to determine the end of the reaction. The chemicals used in these syntheses were generally available from Aldrich, Milwaukee except for those chemicals indicated below. The chemicals peculiar to the agent are listed below with the sources.

Aldrich Chemical Co., Milwaukee, Wis.
Epichlorohydrin (epi)
Polyethylimine (PEI) (423 $MW_{ave}$)
Diethylenetriamine (DETA)
Isopropyl Alcohol
Chloroform
(2,2,3,3,4,4,5,5,6,6,7,7,7 Tridecafluoroheptyl) Oxirane
(2,2,3,3,4,4,5,5,6,6,7,7,8,8,9,9,9 Heptadecafluorononyl) Oxirane
(2,2,3,3,4,4,5,5,6,6,7,7,8,8,9,9,10,10,11,11,11 Heneicosafluoroundecyl) Oxirane
Perfluorododecyl iodide used to prepare $R_F$-Epoxide-C12, $(F(CF_2)_{12}CH_2)$ Oxirane
Allylglycidylether used to prepare $R_F$-AGE epoxides
Union Carbide Corp., Danbury, Conn.
Triethylenetetraamine (TETA)
Dupont, Wilmington, Del.
Zonyl® TELA-N perfluoroalkyl iodide
Zonyl® TELA perfluoroalkyl iodide
Zonyl® TELA-L perfluoroalkyl iodide
The carbon chain distribution is

| | Rf Chain Length Compostion | | | | | |
|---|---|---|---|---|---|---|
| | Ave. | C4 | C6 | C8 | C10 | C12 | >C12 |
| TELA-L | 7.3 | <4 | 50 | 29 | 11 | 4 | <2 |
| TELA | 8.2 | <4 | 35 | 30 | 17 | 8 | <6 |
| TELA-N | 9 | — | <6 | 50 | 29 | 11 | <4 |

Zonyl® TE fluorinated epoxide
MS182 Freon® TF clorofluorocarbon
Atofina USA, Philadelphia, Pa.
Foralkyl I-10N fluorinated alkyl iodide
Foralkyl I-8N fluorinated alkyl iodide
Foralkyl I-6 fluorinated alkyl iodide
Acros Organics, Geel, Belgium
Tetraethylenepentaamine (TEPA)
Fluorochem USA, West Columbia, S.C.
Perfluoroheptyl iodide (1-iodo-1,1,2,2,3,3,4,4,5,5,6,6,7,7,7 Tridecafluorohexane) used to prepare (2,2,3,3,4,4,5,5,6,6,7,7,8,8 Pentadecafluorooctyl) Oxirane
3-[2-(perfluorohexyl)ethoxy]-1,2-epoxypropane
3-(Perfluoro-9-methyldecyl)-1,2-propenoxide
3-(Perfluoro-5-methylhexyl)-1,2-propenoxide
3-(Perfluoro-7-methyloctyl)-1,2-propenoxide Table II, Synthetic Examples, composition and comments, lists the variables used for the manufacture of the material. Examples of specific synthetic descriptions are included. These examples correspond to entries in Table II.

Synthesis of the fluoroalkyl-hydroxyl-alkylpolyamine

The PEI of choice (typically diethylenetriamine (DETA) or triethylenetetraamine (TETA)) is charged to a nitrogen-blanketed 1-Liter resin kettle, equipped with overhead stirrer, reflux condenser, and nitrogen inlet tube and heated to 70–150 C, typically 80 C or 130 C 0.25 to 1.0 molar equivalents of the fluorinated epoxide of choice (typically 0.37 to 0.5), based on PEI molar equivalents of amine atoms, is added to the resin kettle over a period of 50 minutes while the mixture is stirred. The temperature of the reaction is controlled utilizing an oil or water-circulating bath. The reaction is held at the designated temperature, typically 80 C or 130 C for two hours after the addition of the epoxide is complete. Enough hot water is then added below the surface of the reaction mixture to result in a 10–40% solids dispersion, typically this is performed at 20–30% solids.

Conversion of the fluoroalkyl-hydroxyl-alkylpolyamine to the perfluoro(hydroxyl)alkyl, alkyl polyamino halohydrin or organo sulfonate polymeric Composition The dispersion is heated to 80 C to 95 C for 5–15 minutes (until a homogeneous dispersion is obtained). The aqueous dispersion is then cooled to 40–65 C, typically 50 C, and 0.25 to 2.0 molar equivalents of epichlorohydrin per PEI amine atom is added below the surface of the reaction mixture over a period of 1–60 minutes, typically 30 minutes. The mixture is mixed for a period of 30 to 180 minutes, typically 120 minutes after the epi addition is complete. The temperature of the mixture is increased to 70 C to 95 C, typically 80 C and held for 30–180 minutes, typically 120 minutes. Enough hot dilution water is then added below the surface of the mixture to result in the desired solids, typically 14–20 percent. Table II, Synthetic Examples, composition and comments, lists the variables used for the manufacture of the material.

Specific Examples of Preparations of fluoroalkyl-hydroxyamine-azetidinium Polymers:

In the following cases GC analysis indicated the complete consumption of the fluorinated epoxide and epichlorohydrin in each respective step.

A) $R_F$-TETA-C6

A1) 1.75 $R_F$-EPOXIDE-C6 to Triethylenetetramine (TETA) (X-32749-32-1)

0.98 g of TETA (6.7 mmol) was charged to a 100 ml reaction vessel equipped with an overhead stirrer, condenser, and thermocouple. The vessel was heated to 80° C., using an oil bath equipped with an immersion heater. Once the vessel and TETA were at 80° C., 4.4 g of (2,2,3,3,4,4,5,5,6,6,7,7,7 Tridecafluoroheptyl) Oxirane (11.7 mmol) was charge, via constant addition funnel, at a rate sufficient to control the exotherm. Once addition was complete, the reaction was held for 1 hr. After 1 hr the reaction was shutdown. C13 NMR shows 100% of the epoxide has been consumed.

A1(a) 1.75/2.2 $R_F$-TETA-C6 Chlorohydrin (X-32749–36–1)

5.28 g of A1 (6.7 mmol) and 37.7 g of water was charged to a 100 ml reaction vessel equipped with an overhead stirrer, condenser, and thermocouple. With vigorous mixing, the reaction vessel was heated, using an oil bath equipped with an immersion heater, to 50° C. Once material was evenly dispersed, and the temperature stable at 50° C., 1.37 g of Epichlorohydrin (14.8 mmol) was charged to reaction vessel. The reaction was held at 50° C. for 1 hr and then the temperature was increased to 80° C. and held for 0.5 hr. After 0.5 hrs reaction was shutdown.

B) $R_F$-TETA-C8

B1) 1.75 $R_F$-EPOXIDE-C8 to TETA (X-32749-34-1)

The reaction was carried out in a manner similar to that of A1 except 1.76 g of TETA (12.0 mmol) and 10 g of (2,2,3,3,4,4,5,5,6,6,7,7,8,8,9,9,9 Heptadecafluorononyl) Oxirane (21.0 mmol) was charged via constant addition funnel. The addition funnel must be heated to ~70° C. to liquefy epoxide. Once addition was complete, the reaction was held for 2 hrs.

B1(a) 1.75/2.25 $R_F$-TETA-C8 Chlorohydrin (X-32749-38-1)

11.66 g of B1 (11.9 mmol) and 80.12 g of water (to dilute to 15% solids) was charged to a 100 ml reaction vessel equipped with an overhead stirrer, condenser, and thermocouple. The reaction vessel was heated via hot oil bath to 90° C., with vigorous mixing to disperse (B1) in water. Once material was evenly dispersed the reaction temperature was reduced to 50° C., 2.48 g of Epichlorohydrin (26.8 mmol) was then charged to the reaction vessel. The reaction was held at 50° C. for 1 hr, then the temperature was increased to 80° C. and held for 0.5 hr. After 0.5 hrs the reaction was shutdown.

C) $R_F$-TETA-C10

C1) 2.12 $R_F$-EPOXIDE-C10 to TETA (X-32749-37-1)

The reaction was carried out in a manner similar to that of B1 except 1.45 g of TETA (10.0 mmol) and 12.1 g of (2,2,3,3,4,4,5,5,6,6,7,7,8,8,9,9,10,10,10,11,11,11 Heneicosafluoroundecyl) Oxirane (21 mmol) was charged and reaction was held for 3.5 hrs.

C1(a) 2.12/2.69 $R_F$-TETA-C10 Chlorohydrin (X-32749-39-1)

The reaction was carried out in a manner similar to that of B2 except 13.4 g of C1 (10.0 mmol) and 89.8 g of water (to dilute to 15% solids) was charged to a 100 ml reaction vessel equipped with an overhead stirrer, condenser, and thermocouple. The reaction vessel was heated using an oil bath equipped with an immersion heater to 88° C., with vigorous mixing, to disperse C1. Once material was evenly dispersed the reaction temperature was reduced to 50° C., 2.44 g of Epichlorohydrin (26.4 mmol) was then charged to the reaction vessel. The reaction was held at 50° C. for 1 hr and then the temperature was increased to 80° C. and held for 0.5 hr. After 0.5 hr the reaction was shutdown.

D) $R_F$-TETA C12 (X32770-44)

D1) 1.75 $R_F$-EPOXIDE-C12 to TETA (X-32770-44-1)

The reaction was carried out in a manner similar to that of B1 except, to a 100 ml reaction vessel equipped with an overhead stirrer, condenser, and thermocouple, 5.1 g of $R_F$-Epoxide-C12 (7.54 mmol) was charged. The reaction vessel was heated, using an oil bath equipped with an immersion heater, to 100° C. Once the vessel and $R_F$-Epoxide-C12 were at 100° C., 0.63 g of TETA (4.31 mmol) was charged, via Disposable Syringe, in one shot. Once the addition of TETA was complete, the reaction was held for 1 hr. Addition funnel must be heated to ~70° C. to liquify epoxide D1(a) 1.75/2.25 $R_F$-TETA-C12 Chlorohydrin (X-32770-44-1)

5.73 g of (D1) (4.31 mmol) and 89.8 g of water (to dilute to 19% solids) was charged to a 100 ml reaction vessel equipped with an overhead stirrer, condenser, and thermocouple. The reaction vessel was heated using an oil bath equipped with an immersion heater to 80° C., with vigorous mixing, to disperse (D1). Once material was evenly dispersed, the reaction temperature was reduced to 50° C. 0.897 g of Epichlorohydrin (9.69 mmol) was then charged to the reaction vessel. The reaction was held at 50° C. for 1 hr and then the temperature was increased to 90° C. and held for 1 hr. After 1 hr, the reaction was shutdown and an additional 7.6 g of water was charged to dilute reaction to 15% Solids.

$R_F$-TETA-N

E1) 1.5 $R_F$-TETA-N (X-32749-1)

The reaction was carried out in a manner similar to that of B1 except, to a 100 ml reaction vessel equipped with an overhead stirrer, condenser, and thermocouple, 7.4 g of TETA (50.60 mmol) was charged. The reaction vessel was heated using an oil bath equipped with an immersion heater to 80° C. Once the vessel and TETA were at 80° C., 40 g of Rf-Epoxide-N (75.90 mmol) was charged via heated constant addition funnel at a rate sufficient to control any exotherm (5–30 min), Once addition was complete, the reaction was held for 1 hr. After 1 hr C13 NMR shows 100% of the epoxide has been consumed. Addition funnel must be heated to ~70° C. to liquify epoxide E1(a) 1.5/1.75 Chlorohydrin (X-32749-4)

10 g of (E1) (10.68 mmol) and 30 g of water (to dilute to 30% solids) were charged to a 100 ml reaction vessel equipped with an overhead stirrer, condenser, and thermocouple. The reaction vessel was heated using an oil bath equipped with an immersion heater to 50° C., with vigorous mixing to disperse (E1). Once material was evenly dispersed, 1.73 g of Epichlorohydrin (18.68 mmol) was then charged to reaction vessel. The reaction was held at 50° C. for 1 hr, at which point the temperature was increased to 80° C. and held for 0.5 hr. After 0.5 hrs reaction was shutdown and the dispersion was diluted to 15% Solids E1(b) 1.5/2.25 Chlorohydrin (X-32749-5)
The reaction was carried out in a manner similar to that of E1(a) except once material was evenly dispersed, 2.22 g of Epichlorohydrin (24.02 mmol) was then charged to reaction vessel.

E1(c) 1.5/3.78 Chlorohydrin (X-32749-6)
The reaction was carried out in a manner similar to that of E1(a) except once material was evenly dispersed, 3.74 g of Epichlorohydrin (40.42 mmol) was then charged to reaction vessel.

E2) 1.75 $R_F$-TETA-N (X32749-7)
The reaction was carried out in a manner similar to that of E1 except 1.37 g of TETA (9.36 mmol) was charged, and once vessel and TETA was at 80° C., 8.63 g of N-Epoxide (16.38 mmol) was charged.

E2(a) 1.75/1.75 Chlorohydrin (X32749-7)
The reaction was carried out in a manner similar to that of E1(a) except once material was evenly dispersed, 1.52 g of Epichlorohydrin (16.43 mmol) was then charged to reaction vessel.

E2(b1) 1.75/2.25 Chlorohydrin (X32650-32)
The reaction was carried out in a manner similar to that of E1(a) except once material was evenly dispersed, 1.95 g of Epichlorohydrin (21.1 mmol) was then charged to reaction vessel.

E2(b2) 1.75/2.25 Chlorohydrin (X3)
The reaction was carried out in a manner similar to that of E2(b1) except the TETA/epoxide reaction was carried out at 130 C rather than 80 C, the resulting product was dispersed in water at 95 C rather than 80 C, the epichlorohydrin was introduced in three equal aliquots, the first at 60-65 C, and the second and third at 50 C, the reaction temperature held at 50 C for 2 hours followed by holding the reaction temperature at 80 C for 2 hours before adding 90 C water to dilute the product to 17.5% total solids.

E2(c) 1.75/3.25 Chlorohydrin (X32650-33)
The reaction was carried out in a manner similar to that of E1(a) except once material was evenly dispersed, 2.81 g of Epichlorohydrin (30.4 mmol) was then charged to reaction vessel.

E2(d) 1.75/4.25 Chlorohydrin (X32650-34)
The reaction was carried out in a manner similar to that of E1(a) except once material was evenly dispersed, 3.68 g of Epichlorohydrin (40.0 mmol) was then charged to reaction vessel.

E3) 2.5 $R_F$-TETA-N (X-32650-30)
The reaction was carried out in a manner similar to that of E1 except 3.33 g of TETA (23.0 mmol) was charged, and once vessel and TETA were at 80° C., 30 g of $R_F$-Epoxide-N (57 mmol) was charged.

E3(a) 2.5/2.48 Chlorohydrin (X32650-35)
The reaction was carried out in a manner similar to that of E1(a) except using E3 starting material, and once material was evenly dispersed, 1.56 g of Epichlorohydrin (16.9 mmol) was then charged to reaction vessel.

E3(b) 2.5/3.58 Chlorohydrin (X32650-36)
The reaction was carried out in a manner similar to that of E1(a) except using E3 Starting material, and once material was evenly dispersed, 2.26 g of Epichlorohydrin (24.4 mmol) was then charged to reaction vessel.

E3(c) 2.5/4.67 Chlorohydrin (X32650-37)
The reaction was carried out in a manner similar to that of E1(a) except using E3 Starting material, and once material was evenly dispersed, 2.95 g of Epichlorohydrin (31.9 mmol) was then charged to reaction vessel.

E4(d) 2.5/5.0 Chlorohydrin (X32520-74)
The reaction was carried out in a manner similar to that of E1(a) except using E3 Starting material, and once material was evenly dispersed once material was evenly dispersed, 3.53 g of Epichlorohydrin (38.0 mmol) was then charged to reaction vessel.

E4) 3.0 $R_F$-TETA-N (X-32650-31)
The reaction was carried out in a manner similar to that of E1 except, 2.77 g of TETA (18.94 mmol) was charged and once heated to 80° C., 30 g of $R_F$-Epoxide-N (57 mmol) was charged via heated Constant Addition Funnel.

E4(a) 3.0/2.25 Chlorohydrin (X32650-38)
The reaction was carried out in a manner similar to that of E1(a) except using E4 Starting material, and once material was evenly dispersed in distilled water, 1.21 g of Epichlorohydrin (13.03 mmol) was then charged to reaction vessel.

E4(b) 3.0/3.25 Chlorohydrin (X32650-39)
The reaction was carried out in a manner similar to that of E1(a) except using E4 Starting material, and once material was evenly dispersed, 1.74 g of Epichlorohydrin (18.82 mmol) was then charged to reaction vessel.

E4(c) 3.0/4.25 Chlorohydrin (X32650-40)
The reaction was carried out in a manner similar to that of E1(a) except using E4 starting material, and once material was evenly dispersed, 2.28 g of Epichlorohydrin (24.61 mmol) was then charged to reaction vessel.

$R_F$-TETA-Foralkyl I10N (X32770-39)
F1) 1.75 $R_F$-EPOXIDE-Foralkyl I10N to TETA (X-32770-39)
The reaction was carried out in a manner similar to that of E1 except 6.58 g of TETA (44.98 mmol) was charged. Once the vessel and TETA were at 80° C., 50.00 g of Foralkyl I10N (78.72 mmol) was charged.

F1(a) 1.75/2.2 $R_F$-TETA-Foralkyl I10N Chlorohydrin (X-32770-39)
The reaction was carried out in a manner similar to that of E1(a) except 56.58 g of F1 (44.98 mmol) and 150 g of water was charged. Once the temperature was stable at 50° C., 9.36 g of Epichlorohydrin (101.21 mmol) was charged to reaction vessel dropwise over 30 min. The reaction was held at 50° C. for 1 hr. 80 g of distilled water was then charged and the temperature was increased to 80° C. and held for 1 hr. After 1 hr reaction was shutdown and 143.7 g of distilled water was charged to dilute dispersion to 15% Solids Foralkyl 8N TETA Material (X32770-37)
G1) 1.75-$R_F$-EPOXIDE-Foralkyl I8N to TETA (X-32770-37)
The reaction was carried out in a manner similar to that of E1 except to a 500 ml reaction vessel equipped with an overhead stirrer, condenser, and thermocouple, 8.35 g of TETA (57.13 mmol) was charged. The reaction vessel was heated using an oil bath equipped with an immersion heater, to 80° C. Once the vessel and TETA were at 80° C., 53.00 g of Foralkyl I8N Epoxide (99.97 mmol) was charged slowly over 60 minutes via constant addition funnel. Once addition was complete, the reaction was held for 2 hr.

G1(a) 1.75/2.2 $R_F$-TETA-Foralkyl I8N Chlorohydrin (X-32770-37)
61.35 g of G1 (57.13 mmol) and 200 g of hot distilled water was charged to a 1000 ml reaction vessel equipped with an overhead stirrer, condenser, and thermocouple. With vigorous mixing, the reaction vessel was heated, using an oil bath equipped with an immersion heater, to 80° C. Once material was evenly dispersed, the temperature was decreased to 50° C., 11.89 g of Epichlorohydrin (128.53 mmol) was charge, dropwise over 1.3 hrs. The reaction was held at 50° C. for 1 hr. After 1 hour 80.26 g of distilled water was charged and the temperature was increased to 80° C. and held for 2 hr. After 2 hr reaction was shutdown and 134.76 g of Distilled water was charged to dilute dispersion to 15% Solids $R_F$-DETA-N H1) 1.75 $R_F$-EPOXIDE-N to Diethylenetriamine (DETA) (X-32216-55-1)

The reaction was carried out in a manner similar to that of E1 except 5.59 g of DETA (54.2 mmol) was charged. The reaction vessel was heated, using an oil bath equipped with an immersion heater, to 80° C. Once the vessel and DETA were at 80° C., 50.0 g of $R_F$-Epoxide-N (94.88 mmol) was charged via constant addition funnel. Once addition was complete, the reaction was held for 1 hr.

H1a) 1.75/1.0 $R_F$-HACH-N (X-32216-81)

The reaction was carried out in a manner similar to that of E1(a) except 10.10 g of H1 (9.85 mmol) and 40 g of water (to dilute to 21.59% solids) was charged. Once H1 was dispersed and the temperature stable at 50° C., 0.91 g of Epichlorohydrin (9.8 mmol) was then charged to reaction vessel. The reaction was held at 50° C. for 1 hr, at which point the temperature was increased to 80° C. and held for 0.5 hr and shutdown.

H1b) 1.75/1.99 $R_F$-HACH-N (X-32216-73)

The reaction was carried out in a manner similar to that of H1(a) except once material was evenly dispersed, 1.8 g of Epichlorohydrin (19.0 mmol) was then charged to reaction vessel.

H1c) 1.75/2.25 $R_F$-HACH-N (X-32650-63)

The reaction was carried out in a manner similar to that of H1(a) except 30.64 g of Starting H1 (29.88 mmol) was charged to 110.58 g of Distilled water, and once material was evenly dispersed, 6.22 g of Epichlorohydrin (67.23 mmol) was then charged to reaction vessel.

H1d) 1.75/3.10 $R_F$-HACH-N (X-32650-25)

The reaction was carried out in a manner similar to that of H1(a) except 9.28 g of Starting H1 (9.88 mmol) was charged to 30 g of Distilled water, and once material was evenly dispersed, 2.8 g of Epichlorohydrin (30.2 mmol) was then charged to reaction vessel.

H1e) 1.75/3.25 $R_F$-HACH-N (X-32216-69)

The reaction was carried out in a manner similar to that of H1(a) except 10.0 g of Starting H1 (9.75 mmol) was charged to 40 g of Distilled water, and once material was evenly dispersed, 2.93 g of Epichlorohydrin (32.0 mmol) was then charged to reaction vessel H1f) 1.75/3.4 $R_F$-HACH-N (X-32650-24)

The reaction was carried out in a manner similar to that of H1(a) except 10 g of Starting H1 (9.75 mmol) was charged to 30 g of Distilled water, and once material was evenly dispersed, 3.07 g of Epichlorohydrin (33.2 mmol) was then charged to reaction vessel.

H1g) 1.75/3.75 $R_F$-HACH-N (X-32216-65)

The reaction was carried out in a manner similar to that of H1(a) except 10 g of Starting H1 (9.75 mmol) was charged to 45.28 g of Distilled water, and once material was evenly dispersed, 3.38 g of Epichlorohydrin (33.2 mmol) was then charged to reaction vessel.

H1h) 1.75/5.0 $R_F$-HACH-N (X-32216-59)

The reaction was carried out in a manner similar to that of H1(a) except 9.9 g of Starting H1 (9.7 mmol) was charged to 35 g of Distilled water, and once material was evenly dispersed, 4.47 g of Epichlorohydrin (48.0 mmol) was then charged to reaction vessel.

H2) 1.85 $R_F$-DETA-N (X-32650-16)

The reaction was carried out in a manner similar to that of E1 except 3.65 g of DETA (35.38 mmol) was charged. Once the vessel and DETA were at 80° C., 35.0 g of $R_F$-Epoxide-N (66.0 mmol) was charged at a rate sufficient to control the exotherm (5-30 min), via constant addition funnel. Once addition was complete, the reaction was held for 2 hr.

H2(a) 1.85/3.25 $R_F$-DETA-N Chlorohydrin (X32650-23)

The reaction was carried out in a manner similar to that of H1(a) except 10 g of Starting H2 (9.2 mmol) was charged to 30 g of Distilled water, and once material was evenly dispersed, 2.76 g of Epichlorohydrin (29.8 mmol) was then charged to reaction vessel.

H2(c) 1.85/3.4 $R_F$-DETA-N Chlorohydrin (X32650-21)

The reaction was carried out in a manner similar to that of H1(a) except 10 g of Starting H2 (9.2 mmol) was charged to 30 g of Distilled water, and once material was evenly dispersed, 2.88 g of Epichlorohydrin (31.1 mmol) was then charged to reaction vessel.

H3) 2.0 $R_F$-DETA-N

The reaction was carried out in a manner similar to that of E1 except 5.87 g of DETA (56.89 mmol) was charged to reaction vessel and once the vessel and DETA were at 80° C., 60.0 g of $R_F$-Epoxide-N (113.9 mmol) was charged.

H3(a) 2.0/1.0 $R_F$-DETA-N Chlorohydrin (X32216-80)

The reaction was carried out in a manner similar to that of H1(a) except 10.43 g of Starting H3 (9.00 mmol) was charged to 40 g of Distilled water, and once material was evenly dispersed, 0.83g of Epichlorohydrin (9.0 mmol) was then charged to reaction vessel.

H3(b) 2.0/2.85 $R_F$-DETA-N Chlorohydrin (X32216-72)

The reaction was carried out in a manner similar to that of H1(a) except 10 g of Starting H3 (9.00 mmol) was charged to 40 g of Distilled water, and once material was evenly dispersed, 2.28 g of Epichlorohydrin (24.6 mmol) was then charged to reaction vessel.

H3(c) 2.0/3.1 $R_F$-DETA-N Chlorohydrin (X32650-20)

The reaction was carried out in a manner similar to that of H1(a) except 10.43 g of starting H3 (9.00 mmol) was charged to 40 g of Distilled water, and once material was evenly dispersed, 2.48 g of Epichlorohydrin (27.0 mmol) was then charged to reaction vessel H3(d) 2.0/3.25 $R_F$-DETA-N Chlorohydrin (X32216-68)

The reaction was carried out in a manner similar to that of H1(a) except 10 g of Starting H3 (8.64 mmol) was charged to 30 g of Distilled water, and once material was evenly dispersed, 2.6 g of Epichlorohydrin (28.0 mmol) was then charged to reaction vessel H3(e) 2.0/3.4 $R_F$-DETA-N Chlorohydrin (X32650-18)

The reaction was carried out in a manner similar to that of H1(a) except 5.75 g of Starting H3 (5.00 mmol) was charged to 30 g of Distilled water, and once material was evenly dispersed, 1.56 g of Epichlorohydrin (17.0 mmol) was then charged to reaction vessel H3(f) 2.0/3.75 $R_F$-DETA-N Chlorohydrin (X32216-64)

The reaction was carried out in a manner similar to that of H1(a) except 10 g of Starting H3 (9.00 mmol) was charged to 45.5 g of Distilled water, and once material was evenly dispersed, 3.00 g of Epichlorohydrin (32.0 mmol) was then charged to reaction vessel H3(g) 2.0/5.0 $R_F$-DETA-N Chlorohydrin (X32216-58)

The reaction was carried out in a manner similar to that of H1(a) except 10 g of Starting H3 (9.00 mmol) was charged to 35 g of Distilled water, and once material was evenly dispersed, 4.00 g of Epichlorohydrin (43.0 mmol) was then charged to reaction vessel H3(h) 2.0/6.32 $R_F$-DETA-N Chlorohydrin (X32216-75)

The reaction was carried out in a manner similar to that of H1(a) except 10 g of Starting H3 (9.00 mmol) was charged to 40 g of Distilled water, and once material was evenly dispersed, 5.09 g of Epichlorohydrin (55.0 mmol) was then charged to reaction vessel

H4) 2.25 $R_F$-DETA-N (X-32216-53)

The reaction was carried out in a manner similar to that of E1 except 40.0 g of Rf-Epoxide-N (80.0 mmol) was charged to 3.48 g of DETA (30.0 mmol).

H4(a) 2.25/1.0 $R_F$-DETA-N Chlorohydrin (X32216-79)

The reaction was carried out in a manner similar to that of H1(a) except 9.54 g of Starting H4 (7.4 mmol) was charged to 40.11 g of Distilled water, and once material was evenly dispersed, 0.68 g of Epichlorohydrin (7.4 mmol) was then charged to reaction vessel.

H4(b) 2.25/3.25 $R_F$-DETA-N Chlorohydrin (X32216-67)

The reaction was carried out in a manner similar to that of H1(a) except 10 g of Starting H4 (8.00 mmol) was charged to 40 g of Distilled water, and once material was evenly dispersed, 2.33 g of Epichlorohydrin (25 mmol) was then charged to reaction vessel.

H4(c) 2.25/3.75 $R_F$-DETA-N Chlorohydrin (X32651-12)

The reaction was carried out in a manner similar to that of H1(a) except 10 g of Starting H4 (8.00 mmol) was charged to 30 g of Distilled water, and once material was evenly dispersed, 2.69 g of Epichlorohydrin (29 mmol) was then charged to reaction vessel.

H4(d) 2.25/5.0 $R_F$-DETA-N Chlorohydrin (X32216-57)

The reaction was carried out in a manner similar to that of H1(a) except 10 g of Starting H4 (8.00 mmol) was charged to 30 g of Distilled water, and once material was evenly dispersed, 3.59 g of Epichlorohydrin (39 mmol) was then charged to reaction vessel.

H4(e) 2.25/7.93 $R_F$-DETA-N Chlorohydrin (X32216-63)

The reaction was carried out in a manner similar to that of H1(a) except 10 g of Starting H4 (8.00 mmol) was charged to 40 g of Distilled water, and once material was evenly dispersed, 5.69 g of Epichlorohydrin (61.5 mmol) was then charged to reaction vessel.

H5) 2.50 $R_F$-DETA-N (X-32216-63)

The reaction was carried out in a manner similar to that of E1 except 50.0 g of Rf-Epoxide-N (90.0 mmol) was charged to 3.92 g of DETA (40.0 mmol).

H5(a) 2.5/1.0 $R_F$-DETA-N Chlorohydrin (X32216-78)

The reaction was carried out in a manner similar to that of H1(a) except 10.3 g of Starting H5 (7.00 mmol) was charged to 50.8 g of Distilled water, and once material was evenly dispersed, 0.67 g of Epichlorohydrin (7 mmol) was then charged to reaction vessel.

H5(b) 2.5/3.25 $R_F$-DETA-N Chlorohydrin (X32216-66)

The reaction was carried out in a manner similar to that of H1(a) except 10 g of Starting H5 (7.00 mmol) was charged to 40.0 g of Distilled water, and once material was evenly dispersed, 2.12 g of Epichlorohydrin (23.0 mmol) was then charged to reaction vessel.

H5(c) 2.5/3.75 $R_F$-DETA-N Chlorohydrin (X32216-62)

The reaction was carried out in a manner similar to that of H1(a) except 10 g of Starting H5 (7.00 mmol) was charged to 40.0 g of Distilled water, and once material was evenly dispersed, 2.44 g of Epichlorohydrin (26.0 mmol) was then charged to reaction vessel.

H5(d) 2.5/6.16 $R_F$-DETA-N Chlorohydrin (X32216-74)

The reaction was carried out in a manner similar to that of H1(a) except 10 g of Starting H5 (7.00 mmol) was charged to 40.0 g of Distilled water, and once material was evenly dispersed, 4.01 g of Epichlorohydrin (43.0 mmol) was then charged to reaction vessel.

I) $R_F$-DETA-TELA Materials

I1) 1.5 $R_F$-DETA-TELA (X-32520-48)

The reaction was carried out in a manner similar to that of E1 except 75.0 g of $R_F$-Epoxide (157.0 mmol) was charged to 10.8 g of DETA (105.0 mmol).

I1(a) 1.5/1.5 $R_F$-HACH X-32520-49

10 g of I1 (12.0 mmol) and 20 g of Isopropyl Alcohol were charged to a 100 ml reaction vessel equipped with an overhead stirrer, condenser, and thermocouple. The reaction vessel was heated using a Heating Mantel with Temp-o-Trol Temperature Controller to 50° C., with vigorous mixing to disperse/Dissolve (I1). Once material was evenly dispersed, 1.7 g of Epichlorohydrin (18.4 mmol) was then charged to reaction vessel. The reaction was held at 50° C. for 1 hr and shutdown.

I1(b) 1.5/2.5 $R_F$-HACH X-32520-81-1

13.38 g of (I1) (16.4 mmol) and 27.83 g of water (to dilute to 38.2% solids) were charged to a 100 ml reaction vessel equipped with an overhead stirrer, condenser, and thermocouple. The reaction vessel was heated using an oil bath equipped with an immersion heater to 80° C., with vigorous mixing to disperse (I1). Once material was evenly dispersed, reaction was cooled to 50° C. and 3.79 g of Epichlorohydrin (41 mmol) was then charged to reaction vessel. The reaction was held at 50° C. for 1 hr, at which point the temperature was increased to 80° C. and held for 0.5 hr and shutdown.

I1(c) 1.5/5.0 $R_F$-HACH X-32520-79-1

100 g of (I1) (122.3 mmol) and 203.6 g of water (to dilute to 43.5% solids) were charged to a 1000 ml reaction vessel equipped with an overhead stirrer, condenser, and thermocouple. The reaction vessel was heated using an oil bath equipped with an immersion heater to 80° C., with vigorous mixing to disperse (I1). Once material was evenly dispersed, reaction was cooled to 50° C. and 56.59 g of Epichlorohydrin (612 mmol) was then charged to reaction vessel. The reaction was held at 50° C. for 1 hr, at which point the temperature was increased to 80° C. and held for 0.75 hr and shutdown.

I2) 2.0 $R_F$-DETA-TELA X-32336-52-1

The reaction was carried out in a manner similar to that of I1 except 5.42 g of DETA (55.0 mmol) was charged to reaction vessel and, once temperature at 70° C., 50 g of $R_F$-Epoxide (110.0 mmol) was charged to reaction.

I2(b) 2.0/0.5 $R_F$-AA/DETA X-32336-56-1

The reaction was carried out in a manner similar to that of I1(a) except 10 g of I2 (9.5 mmol) and 20 g of Isopropyl Alcohol were charged to the reaction vessel, and once material was evenly dispersed, 0.44 g of Epichlorohydrin (5.0 mmol) was then charged.

I2(c) 2.0–0.75 $R_F$-AA/DETA X-32336-54-1

The reaction was carried out in a manner similar to that of I1(a) except 0.66 g of Epichlorohydrin (7.13 mmol) was charged to reaction vessel.

I2(d) 2/0.91 $R_F$-AA/DETA X-32520-2

The reaction was carried out in a manner similar to that of I1(a) except 0.80 g of Epichlorohydrin (8.6 mmol) was charged to reaction vessel.

I2(e) 2/1.37 $R_F$-AA/DETA X-32520-1

The reaction was carried out in a manner similar to that of I1(a) except 1.2 g of Epichlorohydrin (12.96 mmol) was charged to reaction vessel.

I2(f) 2.0/1.5 $R_F$-HACH 1@50 2@80 X-32520-42

10.61 g of I2 (10.0 mmol) and 20 g of water (to dilute to 37.5% solids) were charged to a 100 ml reaction vessel equipped with an overhead stirrer, condenser, and thermocouple. The reaction vessel was heated using an oil bath equipped with an immersion heater to 80° C., with vigorous mixing to disperse (I2). Once material was evenly dispersed, reaction was cooled to 50° C. and 1.40 g of Epichlorohydrin (15 mmol) was then charged to reaction vessel. The reaction was held at 50° C. for 1 hr, at which point the temperature was increased to 80° C. and held for 1.5 hr. The pH was adjusted to 9.0 and reaction held for an additional 0.5 hr and then shutdown.

I2(g) 2/1.5 $R_F$-HACH 1@50 1@80 X-32520-41

9.95 g of (I2) (10.0 mmol) and 20 g of water (to dilute to 36% solids) were charged to a 100 ml reaction vessel equipped with an overhead stirrer, condenser, and thermocouple. The reaction vessel was heated using an oil bath equipped with an immersion heater to 80° C., with vigorous mixing to disperse (I2). Once material was evenly dispersed, reaction was cooled to 50° C. and 1.31 g of Epichlorohydrin (15 mmol) was then charged to reaction vessel. The reaction was held at 50° C. for 1 hr, at which point the temperature was increased to 80° C., the pH was adjusted to 9.0 and reaction held for an additional 1 hr and then shutdown.

I2(h) 2/1.5 $R_F$-AA/DETA 1@50 X-32520-40

10.12 g of (I2) (9.6 mmol) and 20 g of Isopropyl Alcohol were charged to a 100 ml reaction vessel equipped with an overhead stirrer, condenser, and thermocouple. The reaction vessel was heated using a Heating Mantel with Temp-o-Trol Temperature Controller to 50° C., with vigorous mixing to disperse/Dissolve (I1). Once material was evenly dispersed, 1.39 g of Epichlorohydrin (15.0 mmol) was then charged to reaction vessel. The reaction was held at 50° C. for 1 hr and shutdown.

I2(i) 2/2.28 $R_F$-AA/DETA Chlorohydrin X-32520-7

The reaction was carried out in a manner similar to that of I1(a) except 2.0 g of Epichlorohydrin (22.0 mmol) was charged to reaction vessel.

I2(j) 2.0/5.0 $R_F$-HACH X-32520-72

13.38 g of I1 (12.7 mmol) and 27.83 g of water (to dilute to 38.2% solids) were charged to a 100 ml reaction vessel equipped with an overhead stirrer, condenser, and thermocouple. The reaction vessel was heated using an oil bath equipped with an immersion heater to 80° C., with vigorous mixing to disperse (I1). Once material was evenly dispersed, reaction was cooled to 50° C. and 3.79 g of Epichlorohydrin (41 mmol) was then charged to reaction vessel. The reaction was held at 50° C. for 1 hr, at which point the temperature was increased to 80° C. and held for 0.5 hr and shutdown.

I3) 2.5 $R_F$-DETA-TELA (X-32520-47)

The reaction was carried out in a manner similar to that of I1 except 6.52 g of DETA (63.0 mmol) was charged to reaction vessel and, once temperature at 80° C., 75 g of $R_F$-Epoxide (158.0 mmol) Charged to reaction.

I3(a) 2.5/1.5 $R_F$-HACH X-32520-50

The reaction was carried out in a manner similar to that of I1(a) except used I3 as Starting Material and 1.073 g of Epichlorohydrin (12.0 mmol) was charged to reaction vessel.

I3(b) 2.5/1.5 $R_F$-HACH X-32520-54-1

10.1 g of (I3) (7.8 mmol) and 20.24 g of water (to dilute to 36.84% solids) were charged to a 100 ml reaction vessel equipped with an overhead stirrer, condenser, and thermocouple. The reaction vessel was heated using an oil bath equipped with an immersion heater to 80° C., with vigorous mixing to disperse (I3). Once material was evenly dispersed, reaction was cooled to 50° C. and 1.084 g of Epichlorohydrin (11.7 mmol) was then charged to reaction vessel. The reaction was held at 50° C. for 1 hr and shutdown.

I3(c) 2.5/1.5 $R_F$-HACH X-32520-55-1

The reaction was carried out in a manner similar to that of I2(g) except 10.02 g of (I3) (7.75 mmol) and 20.29 g of water and once material was evenly dispersed, the reaction was cooled to 50° C. and 1.084 g of Epichlorohydrin (11.7 mmol) was then charged to reaction vessel. The reaction was held at 50° C. for 1 hr, at which point the temperature was increased to 80° C., the pH was adjusted to 9.0 and reaction held for an additional 0.5 hr and then shutdown.

I3(d) 2.5/3.0 $R_F$-HACH X-32520-57-1

The reaction was carried out in a manner similar to that of I2(g) except 10.06 g of (I3) (7.8 mmol) and 21.01 g of water was charged and once material was evenly dispersed at 50° C., 2.16 g of Epichlorohydrin (23.3 mmol) was then charge.

I3(e) 2.5/3.0 $R_F$-HACH X-32520-56-1

The reaction was carried out in a manner similar to that of I3(b) except 2.17 g of Epichlorohydrin (23.4 mmol) was charged to reaction vessel.

I3(f) 2.5/3.0 $R_F$-HACH X-32520-58-2

The reaction was carried out in a manner similar to that of I2(h) except 22.91 g of I3 (17.7 mmol) and 40 g of IPA charged. Once material dispersed at 50° C., 4.92 g of Epichlorohydrin (53.1 mmol) was charged to reaction vessel.

I3(g) 2.5/3.0 $R_F$-HACH (condition 1/0.5) X-32520-63

10.24 g of (I3) (7.9 mmol) and 21.98 g of water (to dilute to 36.5% solids) were charged to a 100 ml reaction vessel equipped with an overhead stirrer, condenser, and thermocouple. The reaction vessel was heated using an oil bath equipped with an immersion heater to 80° C., with vigorous mixing to disperse (I3). Once material was evenly dispersed, reaction was cooled to 50° C. and 2.19 g of Epichlorohydrin (23.7 mmol) was then charged to reaction vessel. The reaction was held at 50° C. for 1 hr, at which point the temperature was increased to 80° C. and held for 0.5 hr and shutdown.

I3(h) 2.5/3.0 $R_F$-HACH (1@50° C/2@80° C.) X-32520-64

The reaction was carried out in a manner similar to that of I3(g) except the reaction was held at 50° C. for 1 hr, at which point the temperature was increased to 80° C. and held for 2.0 hr and shutdown.

I3(i) 2.5/5.0 $R_F$-HACH (1 hr @ 50° C.) X-32520-65-1

The reaction was carried out in a manner similar to that of I3(g) except 10.18 g of (I3) (7.87 mmol) and 20.57 g of water was charged and once material was evenly dispersed at 50° C., 3.64 g of Epichlorohydrin (39.35 mmol) was then charge. The reaction was held at 50° C. for 1 hr and shutdown.

I3(j) 2.5/5.0 $R_F$-HACH (1 hr @ 50° C., 0.5 hr @ 80° C.) X-32520-66

The reaction was carried out in a manner similar to that of I3(g) except 10.22 g of (I3) (7.9 mmol) and 20.57 g of water was charged and once material was evenly dispersed at 50° C., 3.66 g of Epichlorohydrin (39.5 mmol) was then charge. The reaction was held at 50° C. for 1 hr, at which point the temperature was increased to 80° C. and held for 0.5 hr and shutdown.

I3(k) 2.5/5.0 $R_F$-HACH (1 hr @ 50° C., 2.0 hr @ 80° C.) X-32520-67

The reaction was carried out in a manner similar to that of I3(g) except log of (I3) (7.73 mmol) and 20.65 g of water was charged and once material was evenly dispersed at 50° C., 3.58 g of Epichlorohydrin (38.65 mmol) was then charge. The reaction was held at 50° C. for 1 hr, at which point the temperature was increased to 80° C. and held for 2 hr and shutdown.

J) $R_F$-DETA-TELA-L

J1) 2.0 $R_F$-AA-L/DETA X-32369-25

The reaction was carried out in a manner similar to that of I1 except 5.42 g of DETA (52.5 mmol) was charged to reaction vessel and, once temperature at 70° C., 50 g of $R_F$-Epoxide-L (100 mmol) charged to reaction.

J1(a) 2.0/0.5 $R_F$-AA-L/DETA X-32520-17

The reaction was carried out in a manner similar to that of I1(a) except 10 g of J1 (10.0 mmol) and 20 g of Isopropyl Alcohol were charged to the reaction vessel, and once material was evenly dispersed, 0.44 g of Epichlorohydrin (5.0 mmol) was then charged.

J1(b) 2/0.91 $R_F$-AA-L/DETA X-32520-4

The reaction was carried out in a manner similar to that of J1(a) except 0.83 g of Epichlorohydrin (9.0 mmol) was charged.

J1(c) 2/1.36 $R_F$-AA-L/DETA X-32520-3

The reaction was carried out in a manner similar to that of J1(a) except 1.24 g of Epichlorohydrin (13.0 mmol) was charged.

K) $R_F$-DETA-Zonyl TE (X-32214-41)

1) 2.0 Zonyl TE/DETA X32520-11

The reaction was carried out in a manner similar to that of J1 except 5.42 g of DETA (50.0 mmol) was charged to reaction vessel and, once temperature at 80° C., 50 g of Zonyl TE (110 mmol) charged to reaction. The reaction was held for 2 hrs and shutdown.

K1(a) 2.0/0.25 Zonyl TE/DETA X32520-22

The reaction was carried out in a manner similar to that of J1(a) except 10 g of K1 (9.5 mmol) and 20 g of Isopropyl Alcohol were charged to the reaction vessel, and once material was evenly dispersed, 0.22 g of Epichlorohydrin (2.0 mmol) was then charged.

K1(b) 2.0/0.5 Zonyl TE/DETA X32520-15

The reaction was carried out in a manner similar to that of K1(a) except 0.44 g of Epichlorohydrin (5.0 mmol) was charged.

K1(c) 2.0/0.75 Zonyl TE/DETA X32214-61

The reaction was carried out in a manner similar to that of J1(a) except 27.7 g of K1 (26.0 mmol) and 25 g of Chloroform were charged to the reaction vessel, and once material was evenly dispersed, 1.821 g of Epichlorohydrin (20.0 mmol) was then charged.

K1(d) 2.0/0.75 Zonyl TE/DETA X32520-21

The reaction was carried out in a manner similar to that of K1(a) except 0.66 g of Epichlorohydrin (7.0 mmol) was charged.

K1(e) 2.0/0.91 Zonyl TE/DETA X32520-13

The reaction was carried out in a manner similar to that of K1(a) except 0.80 g of Epichlorohydrin (9.0 mmol) was charged.

K1(g) 2.0/1.0 Zonyl TE/DETA X32214-49

The reaction was carried out in a manner similar to that of J1(a) except 22.25 g of K1(21.0 mmol) and 90 g of 50:50 Chloroform/Isopropyl Alcohol were charged to the reaction vessel, and once material was evenly dispersed, 1.95 g of Epichlorohydrin (21.0 mmol) was then charged.

K1(h) 2.0/1.37 Zonyl TE/DETA X32520-14

The reaction was carried out in a manner similar to that of K1(a) except 1.20 g of Epichlorohydrin (13.0 mmol) was charged.

K1(j) 2.0/7.0 Zonyl TE/DETA X32214-51

The reaction was carried out in a manner similar to that of K1(c) except 8.43 g of Epichlorohydrin (91.0 mmol) was charged to 13.74 g of K1 (13 mmol).

K1(k) 2.0/7.0 Zonyl TE/DETA X32214-29

The reaction was carried out in a manner similar to that of K1(a) except 7.13 g of Epichlorohydrin (7.7 mmol) was charged to 12.0 g of K1 (11 mmol).

M) Zonyl TE/TETA Material (32214-56)

To a 100 ml reaction vessel equipped with an overhead stirrer, condenser, and thermocouple, 5.0 g of TETA (34.0 mmol) was charged. The reaction vessel was heated, using an oil bath equipped with an immersion heater, to 50° C. Once the vessel and TETA were at 50° C., 32.37 g of Zonyl TE (68 mmol) was charge, via constant addition funnel, over 10 hrs. Once addition was complete, the reaction was held for 5 hr and shutdown. 100% conversion was observed.

M1(a) 2/1 Zonyl TE/TETA X-32214-65

The reaction was carried out in a manner similar to that of E1(a) except 9 g of M1 (8.0 mmol) and 20 g of Chloroform were charged to the reaction vessel. Once material was evenly dispersed, 0.74 g of Epichlorohydrin (8.0 mmol) was then charged. Reaction was held at 50° C. for 5 hrs.

M1(b) 2/2 Zonyl TE/TETA X-32214-64

The reaction was carried out in a manner similar to that of M1(a) except 18 g of M1 (16 mmol) and 20 g of Chloroform were charged to the reaction vessel. Once material was evenly dispersed, 2.96 g of Epichlorohydrin (32.0 mmol) was then charged. Reaction was held at 50° C. for 5 hrs.

M1(c) 2/7 Zonyl TE/TETA X-32214-66

The reaction was carried out in a manner similar to that of M1(a) except 9 g of M1 (8 mmol) and 20 g of Chloroform were charged to the reaction vessel. Once material was evenly dispersed, 5.31 g of Epichlorohydrin (57.0 mmol) was then charged. Reaction was held at 50° C. for 5 hrs.

Q) $R_F$-AGE

Q1) 2.0 $R_F$-AGE/DETA. X32336-58

2.0/0.62 $R_F$-AGE/DETA X32336-69-1

The reaction was carried out in a manner similar to that of J1(a) except 10 g of Q1 (7 mmol) and 20 g of Isopropyl Alcohol were charged to the reaction vessel, and once material was evenly dispersed, 0.41 g of Epichlorohydrin (4.0 mmol) was then charged.

2.0/0.75 $R_F$-AGE/DETA X32336-60

The reaction was carried out in a manner similar to that of Q1(a) 40 g of Isopropyl Alcohol were charged to the reaction vessel, and once material was evenly dispersed, 0.497 g v of Epichlorohydrin (5.0 mmol) was then charged.

2.0/1.22 $R_F$-AGE/DETA X32336-67-1

The reaction was carried out in a manner similar to that of Q1(a) except 0.81 g of Epichlorohydrin (9.0 mmol) was then charged.

S) $R_F$-PEI

S1) 4.7 $R_F$-PEI-L423 X-32650-86

To a 100 ml reaction vessel equipped with an overhead stirrer, condenser, and thermocouple, 6.83 g of PEI-L423 (16.1 mmol) was charged. The reaction vessel was heated using an oil bath equipped with an immersion heater to 80° C. Once the vessel and PEI-L423 were at 80° C., 40 g of $R_F$-Epoxide-N (75.9 mmol) was charged via heated constant addition funnel at a rate sufficient to control any exotherm (5–30 min), Once addition was complete, the reaction was held for 1 hr. The addition funnel must be heated to ~70° C. to liquify epoxide.

S1a) 4.7/5.96 $R_F$-PEI L423 HACH-N X32650-88

10 g of S1 (34.48 mmol) and 30 g of water was charged to a 100 ml reaction vessel equipped with an overhead stirrer, condenser, and thermocouple. With vigorous mixing, the reaction vessel was heated, using an oil bath equipped with an immersion heater, to 80° C. Once material was evenly dispersed, the temperature was reduced to 50° C. Once the temperature was stable at 50° C., 1.9 g of Epichlorohydrin (20.55 mmol) was charged to reaction vessel. The reaction was held at 50° C. for 1 hr and then the temperature was increased to 80° C. and held for 1 hr. After 1 hr the reaction was shutdown and reaction was diluted to 15% Solids.

S1b) 4.7/4.75 $R_F$-PEI L423 HACH-N 10 g of S1 (34.48 mmol) and 30 g of water was charged to a 100 ml reaction vessel equipped with an overhead stirrer, condenser, and thermocouple. With vigorous mixing, the reaction vessel was heated, using an oil bath equipped with an immersion heater, to 80° C. Once material was evenly dispersed, the temperature was reduced to 50° C. Once the temperature was stable at 50° C., 1.52 g of Epichlorohydrin (16.38 mmol) was charged to reaction vessel. The reaction was held at 50° C. for 1 hr and then the temperature was increased to 80° C. and held for 1 hr. After 1 hr the reaction was shutdown and reaction was diluted to 15% Solids.

S2) 5.5 $R_F$-PEI-L423 X-32650-87

The reaction was carried out in a manner similar to that of S1 except 5.84 g of PEI-L423 (13.8 mmol) was then charged, and the reaction was held for 1 hr.

S2a) 5.5/10.22 $R_F$-PEI L423 HACH-N X32650-76

The reaction was carried out in a manner similar to that of S1a except 10.16 g of S2 (3.058 mmol) and 30.42 g of water was charged and once the temperature was stable at 50° C., 2.88 g of Epichlorohydrin (31.00 mmol) was charged to reaction vessel.

S2b) 5.5/5.96 $R_F$-PEI L423 HACH-N X32650-77

The reaction was carried out in a manner similar to that of S1a except 10 g of S2 (3.05 mmol) and 30 g of water was charged and once the temperature was stable at 50° C., 1.66 g of Epichlorohydrin (17.94 mmol) was charged to reaction vessel.

S2c) 5.5/7.07 $R_F$-PEI L423 HACH-N X32650-78

The reaction was carried out in a manner similar to that of S1a except 10 g of S2 (3.05 mmol) and 31.1 g of water was charged and once the temperature was stable at 50° C., 1.97 g of Epichlorohydrin (21.30 mmol) was charged to reaction vessel.

S2d) 5.5/5.96 $R_F$-PEI L423 HACH-N X32650-77

The reaction was carried out in a manner similar to that of S1a except 10.16 g of S2 (3.05 mmol) and 30.42 g of water was charged and once the temperature was stable at 50° C., 2.88 g of Epichlorohydrin (31.00 mmol) was charged to reaction vessel.

S2e) 5.5/4.75 $R_F$-PEI L423 HACH-N X32650-87

The reaction was carried out in a manner similar to that of S1a except 10 g of S2 (3.01 mmol) and 30 g of water was charged and once the temperature was stable at 50° C., 1.32 g of Epichlorohydrin (14.3 mmol) was charged to reaction vessel.

S3) 7.46 $R_F$-PEI-L423 X-32650-87

The reaction was carried out in a manner similar to that of S1 except 4.3 g of PEI-L423 (10.17 mmol) was then charged, and the reaction was held for 1 hr.

S3a) 7.46/8.08 $R_F$-PEI L423 HACH-N X32650-80

The reaction was carried out in a manner similar to that of S1a except log of S3 (2.3 mmol) and 30 g of water was charged and once the temperature was stable at 50° C., 1.72 g of Epichlorohydrin (18.5 mmol) was charged to reaction vessel.

S3b) 7.46/9.59 $R_F$-PEI L423 HACH-N X32650-81

The reaction was carried out in a manner similar to that of S1a except 10 g of S3 (2.3 mmol) and 30 g of water was charged and once the temperature was stable at 50° C., 2.04 g of Epichlorohydrin (22.0 mmol) was charged to reaction vessel.

S3c) 7.46/13.87 $R_F$-PEI L423 HACH-N X32650-82

The reaction was carried out in a manner similar to that of S1a except 10 g of S3 (2.3 mmol) and 30 g of water was charged and once the temperature was stable at 50° C., 2.95 g Epichlorohydrin (31.8 mmol) was charged to reaction vessel.

T1a) General Synthesis Procedure for Table XV (A)

Triethylenetetraamine (TETA) is charged to a nitrogen-blanketed 1-Liter resin kettle, equipped with overhead stirrer, reflux condenser, and nitrogen inlet tube and heated to 80 C, 130, or 147 C 0.4375 to 1.0 molar equivalents of the fluorinated epoxide of choice based on TETA molar equivalents of amine atoms, is added to the resin kettle over a period of 50 minutes while the mixture is stirred. The temperature of the reaction is controlled utilizing an oil or water-circulating bath. The reaction is held at the designated temperature for two hours after the addition of the epoxide is complete. Enough hot water is then added below the surface of the reaction mixture with mixing to result in a 30% solids dispersion. The dispersion is heated to 80 C to 95 C for 5-15 minutes (until a homogeneous dispersion is obtained). The dispersion is then cooled to 50 C and 0.5625 molar equivalents of epichlorohydrin per TETA amine atom is added below the surface of the reaction mixture over a period of 30 minutes. The mixture is mixed for a period of 120 minutes, after the epi addition is complete. At the end of the 120 minutes, the temperature of the mixture is increased to 80 C and held for 120 minutes. Enough hot dilution water is then added below the surface of the mixture (with mixing), to result in a 17.5% solids dispersion.

Preparation of fluoroalkyl-hydroxy-amine-azetidinium Polymers of Varying Azetidinium Content Table 17 examples U1a)

2.25 molar equivalents of epichlorohydrin was reacted with the fluorinatedepoxide/TETA reaction product described in example E2(b2) in an identical fashion as example E2(b2). Carbon NMR of the resulting product clearly showed the presence of 3-hydroxy-azetidinium functionality as demonstrated by peaks occurring between 70-75 ppm.

U2a)

The pH of a portion of the resulting product was increased to 11 with sodium hydroxide and was stirred overnight at 40 C Carbon NMR showed that the peaks between 70–75 ppm were gone demonstrating that the 3-hydroxy-azetidinium functionality was no longer present. SEC analysis indicated that the molecular weight had remained constant demonstrating that the base had not impacted the polymer crosslinks.

U3a)

2.25 molar equivalents of epichlorohydrin was reacted with the fluorinated TETA material described in example X, but the reaction was run at 22 C and five percent concentration in water over a period of 10 days. Carbon NMR showed the absence of peaks between 70–75 ppm demonstrating that no 3-hydroxy-azetidinium functionality had been generated. GC analysis of the same demonstrated that the epichlorohydrin had been consumed by the fluorinated amine.

TABLE II

SPECIFIC EXAMPLES OF PREPARATIONS OF FLUOROALKYL-HYDROXY-POLYAMINE-3-HYDROXYAZETIDINIUM POLYMERS:
Chemical abbreviations used in Table II and Specific Synthetic Examples

| | |
|---|---|
| CH2CHICH2OCH2 | |
| Aldrich C6 Epoxide | C6 |
| Aldrich C8 Epoxide | C8 |
| Aldrich C10 Epoxide | C10 |
| Aldrich C12 Epoxide | C12 |
| Zonyl ® TELA-N | N |
| Foralkyl I10N | I10N |
| Foralkyl I8N | I8N |
| Zonyl ® TE | TE |
| Zonyl ® TELA | A |
| Zonyl ® TELA-L | L |
| Polyethyleneimine | PEI |
| Alylglycidylether | AGE |
| Diethylene Triamine | DETA |
| Tetraethylenetetramine | TETA |
| Allyl Alcohol | AA |
| Hydroxyaminochlorohydrin or perfluoro(hydroxyl)alkyl, alkylamino halohydrin | HACH |
| Perfluorinated alkyl or fluorinated organic | Rf |
| Poly amine, PEI with Linear chain with 423 Mw ave | L423 |

TABLE II-continued

SPECIFIC EXAMPLES OF PREPARATIONS OF
FLUOROALKYL-HYDROXY-POLYAMINE-3-
HYDROXYAZETIDINIUM POLYMERS:
Chemical abbreviations used in Table II
and Specific Synthetic Examples

| | |
|---|---|
| CH2OCH2CHICH2 and CH2OCH2C=CH2 | ALT1 |
| Chemical group between $R_F$ and epoxide on Rf-epoxide after condensation with polyamine | A, shown in Structure III |

Table II lists various compositions that were made to test and develop this invention. The Table entries are indexed with the same labeling scheme as the synthetic examples which were described above. Those designated with SS means that the exact synthetic description is not in the synthetic examples above, but the material was made with minor changes to the mole ratios or other reaction conditions. Unless noted the letter references refer back to Structure III. The headings on the column are:

Example: This index refers to examples described in the synthetic examples $R_F$ Equiv: This indicates the number of moles of $R_F$ groups per monomer or polyamine unit. This is also the number of J groups. The number of moles of $R_F$ groups per monomer unit is also designated as "r".

Epi Equiv: This indicates the number of moles relative to the polyamine.

n: Number of $CH_2$ groups between the amine nitrogens m: number of repeating amine groups in Structure I; the total number of amines will be m+1.

$R_F$ type: The type of fluorochemical group. In the preferred reaction scheme it is the $R_F$ substituent on the fluorinated epoxide.

A: The group in J, Structure III.

p: The number of A groups in J, Structure III.

r/N: Ratio of r groups to the total number of nitrogen atoms in the polyamine epi/N: Ratio of epi groups to the total number of nitrogen

TABLE II

Synthetic Examples, Composition and Comments
Keyed to Synthetic Examples Section

| Example | $R_F$ Equiv. | Epi Equiv. | N | m | $R_F$ type | A | p | r/N | epi/N | Notes |
|---|---|---|---|---|---|---|---|---|---|---|
| A1 | 1.75 | 0 | 2 | 3 | C6 | $CH_2$ | 1 | 0.44 | 0.00 | 1.75 $R_F$-EPOXIDE-C6 to Triethylenetetramine (TETA), Rxn at 80° C. |
| A1a | 1.75 | 2.2 | 2 | 3 | C6 | $CH_2$ | 1 | 0.44 | 0.55 | 1.75/2.2 $R_F$-TETA-C6 Chlorohydrin |
| B1 | 1.75 | 0 | 2 | 3 | C8 | $CH_2$ | 1 | 0.44 | 0.00 | 1.75 $R_F$-EPOXIDE-C8 to TETA, RXN at 80° C. |
| B1a | 1.75 | 2.25 | 2 | 3 | C8 | $CH_2$ | 1 | 0.44 | 0.56 | 1.75/2.25 $R_F$-TETA-C8 Chlorohydrin |
| C1 | 0 | 0 | 2 | 3 | C10 | $CH_2$ | 1 | 0.00 | 0.00 | $R_F$-EPOXIDE-C10 to TETA, RXN at 80° C. |
| C1a | 2.12 | 2.69 | 2 | 3 | C10 | $CH_2$ | 1 | 0.53 | 0.67 | 1.75/2.25 $R_F$-TETA-C10 Chlorohydrin |
| D | 0 | 0 | 2 | 3 | C12 | $CH_2$ | 1 | 0.00 | 0.00 | $R_F$-TETA C12, RXN at 100° C. |
| D1 | 1.75 | 0 | 2 | 3 | C12 | $CH_2$ | 1 | 0.44 | 0.00 | 1.75 $R_F$-EPOXIDE-C12 to TETA |
| D1a | 1.75 | 2.25 | 2 | 3 | C12 | $CH_2$ | 1 | 0.44 | 0.56 | 1.75/2.25 $R_F$-TETA-C12 Chlorohydrin |
| E1 | 1.5 | 0 | 2 | 3 | N | $CH_2$ | 1 | 0.38 | 0.00 | 1.5 $R_F$-TETA-N, RXN at 100° C. |
| E1a | 1.5 | 1.75 | 2 | 3 | N | $CH_2$ | 1 | 0.38 | 0.44 | 1.5/1.75 Chlorohydrin |
| E1b | 1.5 | 2.25 | 2 | 3 | N | $CH_2$ | 1 | 0.38 | 0.56 | 1.5/2.25 Chlorohydrin |
| E1c | 1.5 | 3.78 | 2 | 3 | N | $CH_2$ | 1 | 0.38 | 0.95 | 1.5/3.78 Chlorohydrin |
| E2 | 1.75 | 0 | 2 | 3 | N | $CH_2$ | 1 | 0.44 | 0.00 | 1.75 $R_F$-TETA-N, RXN at 80° C. |
| E2a | 1.75 | 1.75 | 2 | 3 | N | $CH_2$ | 1 | 0.44 | 0.44 | 1.75/1.75 Chlorohydrin |
| E2b | 1.75 | 2.25 | 2 | 3 | N | $CH_2$ | 1 | 0.44 | 0.56 | 1.75/2.25 Chlorohydrin |
| E2c | 1.75 | 3.25 | 2 | 3 | N | $CH_2$ | 1 | 0.44 | 0.81 | 1.75/3.25 Chlorohydrin |
| E2d | 1.75 | 4.25 | 2 | 3 | N | $CH_2$ | 1 | 0.44 | 1.06 | 1.75/4.25 Chlorohydrin |
| E3 | 2.5 | 0 | 2 | 3 | N | $CH_2$ | 1 | 0.63 | 0.00 | 2.5 $R_F$-TETA-N, RXN at 80° C. |
| E3a | 2.5 | 2.48 | 2 | 3 | N | $CH_2$ | 1 | 0.63 | 0.62 | 2.5/2.48 Chlorohydrin |
| E3b | 2.5 | 3.58 | 2 | 3 | N | $CH_2$ | 1 | 0.63 | 0.90 | 2.5/3.58 Chlorohydrin |
| E3c | 2.5 | 4.67 | 2 | 3 | N | $CH_2$ | 1 | 0.63 | 1.17 | 2.5/4.67 Chlorohydrin |
| E3d | 2.5 | 5 | 2 | 3 | N | $CH_2$ | 1 | 0.63 | 1.25 | 2.5/5.0 Chlorohydrin |
| E4 | 3 | 0 | 2 | 3 | N | $CH_2$ | 1 | 0.75 | 0.00 | 3.0 RF-TETA-N, RXN at 80° C. |
| E4a | 3 | 2.25 | 2 | 3 | N | $CH_2$ | 1 | 0.75 | 0.56 | 3.0/2.25 Chlorohydrin |
| E4b | 3 | 3.25 | 2 | 3 | N | $CH_2$ | 1 | 0.75 | 0.81 | 3.0/3.25 Chlorohydrin |
| E4c | 3 | 4.25 | 2 | 3 | N | $CH_2$ | 1 | 0.75 | 1.06 | 3.0/4.25 Chlorohydrin |
| F | 0 | 0 | 2 | 3 | I10N | $CH_2$ | 1 | 0.00 | 0.00 | $R_F$-TETA-Foralkyl I10N, RXN at 80° C. |
| F1 | 1.75 | 0 | 2 | 3 | I10N | $CH_2$ | 1 | 0.44 | 0.00 | 1.75 $R_F$-EPOXIDE-Foralkyl I10N to TETA |
| F1a | 1.75 | 2.2 | 2 | 3 | I10N | $CH_2$ | 1 | 0.44 | 0.55 | 1.75/2.2 $R_F$-TETA-Foralkyl I10N Chlorohydrin |
| G | 0 | 0 | 2 | 3 | 8N | $CH_2$ | 1 | 0.00 | 0.00 | Foralkyl 8N TETA, RXN at 80° C. |
| G1 | 0 | 0 | 2 | 3 | 8N | $CH_2$ | 1 | 0.00 | 0.00 | 1.75-$R_F$-EPOXIDE-Foralkyl I8N to TETA |
| G1a | 1.75 | 2.2 | 2 | 3 | I8N | $CH_2$ | 1 | 0.44 | 0.55 | 1.75/2.2 $R_F$-TETA-Foralkyl I8N Chlorohydrin |

TABLE II-continued

Synthetic Examples, Composition and Comments
Keyed to Synthetic Examples Section

| Example | $R_F$ Equiv. | Epi Equiv. | N | m | $R_F$ type | A | p | r/N | epi/N | Notes |
|---|---|---|---|---|---|---|---|---|---|---|
| H1  | 1.75 | 0    | 2 | 2 | N | $CH_2$ | 1 | 0.58 | 0.00 | 1.75 $R_F$-EPOXIDE-N to Diethylenetriamine DETA |
| H1a | 1.75 | 1    | 2 | 2 | N | $CH_2$ | 1 | 0.58 | 0.33 | 1.75/1.0 RF-HACH-N |
| H1b | 1.75 | 1.99 | 2 | 2 | N | $CH_2$ | 1 | 0.58 | 0.66 | 1.75/1.99 $R_F$-HACH-N |
| H1c | 1.75 | 2.25 | 2 | 2 | N | $CH_2$ | 1 | 0.58 | 0.75 | 1.75/2.25 $R_F$-HACH-N |
| H1d | 1.75 | 3.1  | 2 | 2 | N | $CH_2$ | 1 | 0.58 | 1.03 | 1.75/3.10 $R_F$-HACH-N |
| H1e | 1.75 | 3.25 | 2 | 2 | N | $CH_2$ | 1 | 0.58 | 1.08 | 1.75/3.25 $R_F$-HACH-N |
| H1f | 1.75 | 3.4  | 2 | 2 | N | $CH_2$ | 1 | 0.58 | 1.13 | 1.75/3.4 $R_F$-HACH-N |
| H1g | 1.75 | 3.75 | 2 | 2 | N | $CH_2$ | 1 | 0.58 | 1.25 | 1.75/3.75 $R_F$-HACH-N |
| H1h | 1.75 | 5    | 2 | 2 | N | $CH_2$ | 1 | 0.58 | 1.67 | 1.75/5.0 $R_F$-HACH-N |
| H2  | 1.85 | 0    | 2 | 2 | N | $CH_2$ | 1 | 0.62 | 0.00 | 1.85 $R_F$-DETA-N, RXN at 80° C. |
| H2a | 1.85 | 3.25 | 2 | 2 | N | $CH_2$ | 1 | 0.62 | 1.08 | 1.85/3.25 $R_F$-DETA-N Chlorohydrin |
| H2c | 1.85 | 3.4  | 2 | 2 | N | $CH_2$ | 1 | 0.62 | 1.13 | 1.85/3.4 $R_F$-DETA-N Chlorohydrin |
| H3  | 2    | 0    | 2 | 2 | N | $CH_2$ | 1 | 0.67 | 0.00 | 2.0/1.0 $R_F$-DETA-N Chlorohydrin, Rxn at 80° C. |
| H3a | 2    | 1    | 2 | 2 | N | $CH_2$ | 1 | 0.67 | 0.33 | 2.0/1.0 $R_F$-DETA-N Chlorohydrin |
| H3b | 2    | 2.85 | 2 | 2 | N | $CH_2$ | 1 | 0.67 | 0.95 | 2.0/2.85 $R_F$-DETA-N Chlorohydrin |
| H3c | 2    | 3.1  | 2 | 2 | N | $CH_2$ | 1 | 0.67 | 1.03 | 2.0/3.1 $R_F$-DETA-N Chlorohydrin |
| H3d | 2    | 3.25 | 2 | 2 | N | $CH_2$ | 1 | 0.67 | 1.08 | 2.0/3.25 $R_F$-DETA-N Chlorohydrin |
| H3e | 2    | 3.4  | 2 | 2 | N | $CH_2$ | 1 | 0.67 | 1.13 | 2.0/3.4 $R_F$DETA-N Chlorohydrin |
| H3f | 2    | 3.75 | 2 | 2 | N | $CH_2$ | 1 | 0.67 | 1.25 | 2.0/3.75 $R_F$-DETA-N Chlorohydrin |
| H3g | 2    | 5    | 2 | 2 | N | $CH_2$ | 1 | 0.67 | 1.67 | 2.0/5.0 $R_F$-DETA-N Chlorohydrin |
| H3h | 2    | 6.32 | 2 | 2 | N | $CH_2$ | 1 | 0.67 | 2.11 | 2.0/6.32 $R_F$-DETA-N Chlorohydrin |
| H4  | 2.25 | 0    | 2 | 2 | N | $CH_2$ | 1 | 0.75 | 0.00 | 2.0/1.0 $R_F$-DETA-N Chlorohydrin, Rxn at 80° C. |
| H4a | 2.25 | 1    | 2 | 2 | N | $CH_2$ | 1 | 0.75 | 0.33 | 2.25/1.0 $R_F$-DETA-N Chlorohydrin |
| H4b | 2.25 | 3.25 | 2 | 2 | N | $CH_2$ | 1 | 0.75 | 1.08 | 2.25/3.25 $R_F$-DETA-N Chlorohydrin |
| H4c | 2.25 | 3.75 | 2 | 2 | N | $CH_2$ | 1 | 0.75 | 1.25 | 2.25/3.75 $R_F$-DETA-N Chlorohydrin |
| H4d | 2.25 | 5    | 2 | 2 | N | $CH_2$ | 1 | 0.75 | 1.67 | 2.25/5.0 $R_F$-DETA-N Chlorohydrin |
| H4e | 2.25 | 7.93 | 2 | 2 | N | $CH_2$ | 1 | 0.75 | 2.64 | 2.25/7.93 $R_F$-DETA-N Chlorohydrin |
| H5  | 2.5  | 0    | 2 | 2 | N | $CH_2$ | 1 | 0.83 | 0.00 | 2.5/1.0 $R_F$-DETA-N Chlorohydrin, Rxn at 80° C. |
| H5a | 2.5  | 1    | 2 | 2 | N | $CH_2$ | 1 | 0.83 | 0.33 | 2.5/1.0 $R_F$-DETA-N Chlorohydrin |
| H5b | 2.5  | 3.25 | 2 | 2 | N | $CH_2$ | 1 | 0.83 | 1.08 | 2.5/3.25 $R_F$-DETA-N Chlorohydrin |
| H5c | 2.5  | 3.75 | 2 | 2 | N | $CH_2$ | 1 | 0.83 | 1.25 | 2.5/3.75 $R_F$-DETA-N Chlorohydrin |
| H5d | 2.5  | 6.16 | 2 | 2 | N | $CH_2$ | 1 | 0.83 | 2.05 | 2.5/6.16 $R_F$-DETA-N Chlorohydrin |
| I1  | 1.5  | 0    | 2 | 2 | A | $CH_2$ | 1 | 0.50 | 0.00 | 1.5 $R_F$-DETA-TELA, RXN at 80° C. |
| I1a | 1.5  | 1.5  | 2 | 2 | A | $CH_2$ | 1 | 0.50 | 0.50 | 1.5/1.5 $R_F$-HACH |
| I1b | 1.5  | 2.5  | 2 | 2 | A | $CH_2$ | 1 | 0.50 | 0.83 | 1.5/2.5 $R_F$-HACH |
| I1c | 1.5  | 5    | 2 | 2 | A | $CH_2$ | 1 | 0.50 | 1.67 | 1.5/5.0 $R_F$-HACH |
| I2  | 2    | 0    | 2 | 2 | A | $CH_2$ | 1 | 0.67 | 0.00 | 2. $R_F$-DETA-TELA, RXN at 80° C. |
| I2b | 2    | 0.5  | 2 | 2 | A | $CH_2$ | 1 | 0.67 | 0.17 | 2.0/0.5 $R_F$-AA/DETA |
| I2c | 2    | 0.75 | 2 | 2 | A | $CH_2$ | 1 | 0.67 | 0.25 | 2.0–0.75 $R_F$-AA/DETA |
| I2d | 2    | 0.91 | 2 | 2 | A | $CH_2$ | 1 | 0.67 | 0.30 | 2/0.91 $R_F$-AA/DETA |
| I2e | 2    | 1.37 | 2 | 2 | A | $CH_2$ | 1 | 0.67 | 0.46 | 2/1.37 $R_F$-AA/DETA |
| I2f | 2    | 1.5  | 2 | 2 | A | $CH_2$ | 1 | 0.67 | 0.50 | 2.0/1.5 $R_F$-HACH 1@50 2@80 |
| I2g | 2    | 1.5  | 2 | 2 | A | $CH_2$ | 1 | 0.67 | 0.50 | 2/1.5 $R_F$-HACH 1@50 1@80 |
| I2h | 2    | 1.5  | 2 | 2 | A | $CH_2$ | 1 | 0.67 | 0.50 | 2/1.5 $R_F$-AA/DETA 1@50 |
| I2i | 2    | 2.28 | 2 | 2 | A | $CH_2$ | 1 | 0.67 | 0.76 | 2/2.28 AA/DETA Chlorohydrin |
| I2j | 2    | 5    | 2 | 2 | A | $CH_2$ | 1 | 0.67 | 1.67 | 2.0/5.0 $R_F$-HACH |
| I3  | 2.5  | 0    | 2 | 2 | A | $CH_2$ | 1 | 0.83 | 0.00 | 2.5 $R_F$-DETA-TELA, RXN at 80° C. |
| I3a | 2.5  | 1.5  | 2 | 2 | A | $CH_2$ | 1 | 0.83 | 0.50 | 2.5/1.5 $R_F$-HACH see specific example description for rxn conditions |
| I3c | 2.5  | 1.5  | 2 | 2 | A | $CH_2$ | 1 | 0.83 | 0.50 | 2.5/1.5 $R_F$-HACH 2.5/1.5 $R_F$-HACH see specific example description for rxn conditions |
| I3d | 2.5  | 3    | 2 | 2 | A | $CH_2$ | 1 | 0.83 | 1.00 | 2.5/3.0 $R_F$-HACH |
| I3e | 2.5  | 3    | 2 | 2 | A | $CH_2$ | 1 | 0.83 | 1.00 | 2.5/3.0 $R_F$-HACH |
| I3f | 2.5  | 3    | 2 | 2 | A | $CH_2$ | 1 | 0.83 | 1.00 | 2.5/3.0 $R_F$-HACH |
| I3g | 2.5  | 3    | 2 | 2 | A | $CH_2$ | 1 | 0.83 | 1.00 | 2.5/3.0 $R_F$-HACH (condition 1/0.5) |
| I3h | 2.5  | 3    | 2 | 2 | A | $CH_2$ | 1 | 0.83 | 1.00 | 2.5/3.0 $R_F$-HACH (1@50° C./2@80° C.) |
| I3i | 2.5  | 5    | 2 | 2 | A | $CH_2$ | 1 | 0.83 | 1.67 | 2.5/5.0 $R_F$-HACH (1 hr @ 50° C.) |
| I3j | 2.5  | 5    | 2 | 2 | A | $CH_2$ | 1 | 0.83 | 1.67 | 2.5/5.0 $R_F$-HACH (1 hr @ 50° C., 0.5 hr @ 80° C.) |
| I3k | 2.5  | 5    | 2 | 2 | A | $CH_2$ | 1 | 0.83 | 1.67 | 2.5/5.0 $R_F$-HACH (1 hr @ 50° C., 2.0 hr @ 80° C.) |
| J1  | 2    | 0    | 2 | 2 | L | $CH_2$ | 1 | 0.67 | 0.00 | 2.0 $R_F$-AA-L/DETA, RXN at 80° C. |
| J1a | 2    | 0.5  | 2 | 2 | L | $CH_2$ | 1 | 0.67 | 0.17 | 2.0/0.5 $R_F$-AA-L/DETA |
| J1b | 2    | 0.91 | 2 | 2 | L | $CH_2$ | 1 | 0.67 | 0.30 | 2/0.91 $R_F$-AA-L/DETA |
| J1c | 2    | 1.36 | 2 | 2 | L | $CH_2$ | 1 | 0.67 | 0.45 | 2/1.36 $R_F$-AA-L/DETA |
| K   | 0    | 0    | 2 | 2 | TE | $CH_2$ | 1 | 0.00 | 0.00 | $R_F$-DETA-Zonyl TE, RXN at 80° C. |
| K1  | 2    | 0    | 2 | 2 | TE | $CH_2$ | 1 | 0.67 | 0.00 | 2.0 Zonyl TE/DETA, RXN at 80° C. |
| K1a | 2    | 0.25 | 2 | 2 | TE | $CH_2$ | 1 | 0.67 | 0.08 | 2.0/0.25 Zonyl TE/DETA |
| K1b | 2    | 0.5  | 2 | 2 | TE | $CH_2$ | 1 | 0.67 | 0.17 | 2.0/0.5 Zonyl TE/DETA |

TABLE II-continued

Synthetic Examples, Composition and Comments
Keyed to Synthetic Examples Section

| Example | $R_F$ Equiv. | Epi Equiv. | N | m | $R_F$ type | A | p | r/N | epi/N | Notes |
|---|---|---|---|---|---|---|---|---|---|---|
| K1c | 2 | 0.75 | 2 | 2 | TE | $CH_2$ | 1 | 0.67 | 0.25 | 2.0/0.75 Zonyl TE/DETA |
| K1d | 2 | 0.75 | 2 | 2 | TE | $CH_2$ | 1 | 0.67 | 0.25 | 2.0/0.75 Zonyl TE/DETA |
| K1e | 2 | 0.91 | 2 | 2 | TE | $CH_2$ | 1 | 0.67 | 0.30 | 2.0/0.91 Zonyl TE/DETA |
| K1g | 2 | 1 | 2 | 2 | TE | $CH_2$ | 1 | 0.67 | 0.33 | 2.0/1.0 Zonyl TE/DETA |
| K1h | 2 | 1.37 | 2 | 2 | TE | $CH_2$ | 1 | 0.67 | 0.46 | 2.0/1.37 Zonyl TE/DETA |
| K1j | 2 | 7 | 2 | 2 | TE | $CH_2$ | 1 | 0.67 | 2.33 | 2.0/7.0 Zonyl TE/DETA |
| K1k | 2 | 7 | 2 | 2 | TE | $CH_2$ | 1 | 0.67 | 2.33 | 2.0/7.0 Zonyl TE/DETA |
| M | 0 | 0 | 2 | 3 | TE | $CH_2$ | 1 | 0.00 | 0.00 | Zonyl TE/TETA Material |
| M1a | 2 | 1 | 2 | 3 | TE | $CH_2$ | 1 | 0.50 | 0.25 | 2/1 Zonyl TE/TETA |
| M1b | 2 | 2 | 2 | 3 | TE | $CH_2$ | 1 | 0.50 | 0.50 | 2/2 Zonyl TE/TETA |
| M1c | 2 | 7 | 2 | 3 | TE | $CH_2$ | 1 | 0.50 | 1.75 | 2/7 Zonyl TE/TETA |
| Q1 | 2 | 0 | 2 | 2 | A | ALT1 | 1 | 0.67 | 0.00 | 2.0 $R_F$-AGE/DETA. |
| Q1a | 2 | 0.62 | 2 | 2 | A | ALT1 | 1 | 0.67 | 0.21 | 2.0/0.62 $R_F$-AGE/DETA |
| Q1b | 2 | 0.75 | 2 | 2 | A | ALT1 | 1 | 0.67 | 0.25 | 2.0/0.75 $R_F$-AGE/DETA |
| Q1c | 2 | 1.22 | 2 | 2 | A | ALT1 | 1 | 0.67 | 0.41 | 2.0/1.22 $R_F$-AGE/DETA |
| S1 | 4.7 | 0 | 2 | 9.44 | N | $CH_2$ | 1 | 0.45 | 0.00 | 4.7 $R_F$-PEI-L423, RXN at 80° C. |
| S1a | 4.7 | 5.96 | 2 | 9.44 | N | $CH_2$ | 1 | 0.45 | 0.57 | 4.7/5.96 $R_F$-PEI L423 HACH-N |
| S1b | 4.7 | 4.75 | 2 | 9.44 | N | $CH_2$ | 1 | 0.45 | 0.45 | 4.7/4.75 $R_F$-PEI L423 HACH-N |
| S2 | 5.5 | 0 | 2 | 9.44 | N | $CH_2$ | 1 | 0.53 | 0.00 | 5.5 $R_F$-PEI-L423, RXN at 80° C. |
| S2a | 5.5 | 10.22 | 2 | 9.44 | N | $CH_2$ | 1 | 0.53 | 0.98 | 5.5/10.22 $R_F$-PEI L423 HACH-N |
| S2b | 5.5 | 5.96 | 2 | 9.44 | N | $CH_2$ | 1 | 0.53 | 0.57 | 5.5/5.96 $R_F$-PEI L423 HACH-N |
| S2c | 5.5 | 7.07 | 2 | 9.44 | N | $CH_2$ | 1 | 0.53 | 0.68 | 5.5/7.07 $R_F$-PEI L423 HACH-N |
| S2d | 5.5 | 5.96 | 2 | 9.44 | N | $CH_2$ | 1 | 0.53 | 0.57 | 5.5/5.96 $R_F$-PEI L423 HACH-N |
| S2e | 5.5 | 4.75 | 2 | 9.44 | N | $CH_2$ | 1 | 0.53 | 0.45 | 5.5/4.75 $R_F$-PEI L423 HACH-N |
| S3 | 7.46 | 0 | 2 | 9.44 | N | $CH_2$ | 1 | 0.71 | 0.00 | 7.46 $R_F$-PEI-L423, RXN at 80° C. |
| S3a | 7.46 | 8.08 | 2 | 9.44 | N | $CH_2$ | 1 | 0.71 | 0.77 | 7.46/8.08 $R_F$-PEI L423 HACH-N |
| S3b | 7.46 | 9.59 | 2 | 9.44 | N | $CH_2$ | 1 | 0.71 | 0.92 | 7.46/9.59 $R_F$-PEI L423 HACH-N |
| S3c | 7.46 | 13.87 | 2 | 9.44 | N | $CH_2$ | 1 | 0.71 | 1.33 | 7.46/13.87 $R_F$-PEI L423 HACH-N |

Testing of Paper and Textiles Treated With perfluoro(hydroxyl)alkyl, Alkyl Polyamino Halohydrin or Organo Sulfonate Polymeric Composition and Other Oil-water Sizing Agents Except for the tests described below as Table VII all of the paper was treated using a surface application (external sizing). Standard conditions were used to prepare the sheets unless otherwise noted. Sheets of paper (no previous surface treatment), cut from rolls of paper prepared on commercial pilot paper machines were used for all testing unless specified otherwise. Paper strips were passed through a solution with the additives. The solution temperature is about 60° C. Then the paper is immediately dried between the felt and stainless steel of a rotating drum-type drier at 104° C. for 50 seconds. Two-weight percent ethylated starch (Penford 270) was co-applied to the paper samples from the same aqueous dilutions containing the oil/grease-sizing agents. The amount of chemical additive on the paper was routinely calculated based on the weight of the aqueous solution/emulsion/dispersion picked up by the paper strip. The weight of chemical additive on the paper was periodically confirmed by determining the weight percent fluorine contained in the paper by combusting the paper and analyzing the combustion product by ion chromatography. The oil- and water-sizing properties of the paper were determined using the test methods described.

In all of the examples listed below, A, see Structure III is $CH_2$ and the $R_F$-spacer group and is —$CH_2CH(OH)CH_2$— unless otherwise indicated. Unless otherwise specified the conditions for the reaction of the epihalohydrin to the fluoroalkyl-hydroxyl-polyamine is the two-step reaction of ~2 hours at 50° C. followed by ~2 hours at 80° C.

All water dispersible oil/grease-sizing and water-sizing agents can be described via listing the mole ratios of the combined fluorochemical and spacer group, the polyamine and the cellulose reactive component. This is expressed as 1.0/1.0/1.0 if each component is in a 1.0-to-1.0-to-1.0-mole ratio. For simplicity the moles of the polyamine is assigned a mole ratio value of 1.0. The number of moles per polyamine is at least 3 nitrogens/polyamine. For instance diethylenetriamine has 3 nitrogen atoms/mole of polyamine and tetraethylenetriamine has 4 nitrogens atoms/mole of polyamine.

For each of the tested papers the method of synthesizing the agent is listed and refers to the synthetic examples listed above. The synthetic example compositions are also listed in Table II. If the synthetic example is not explictly listed above, a reference is given to a similar synthetic example. The agent tested could be made by the similar synthetic example by adjustment of the mole ratios to obtain the listed composition. The similar synthetic experiment will be listed as the example number followed by a "ss" to indicate a Similar Synthetic example is used.

In most tests conducted comparison tests were done with starch only or commercially available oil-sizing compounds. The compounds tested were 3M's Scotchban® FC845 and Ciba's Lodyne® ® PS14, and/or P208E. In the tables these are not explicitly labeled as comparisons to the invention, but are intended to be comparative examples.

The tests used to evaluate paper and textile performance were 1. Kit Test, 2. Boiling Boat Test, 3. Hot Oil Test(Oleic Acid Float), 4. RP2 Test, 5. Molded Board Oil Size Test, 6. Hercules Size Test, 7. Molded Board Water Sizing Test, and 8 Soil Release Testing.

Different Papers Tested

A broad spectrum of papers were used to test the water-dispersible oil/grease-sizing and water-sizing agent. The base sheet characterization is listed in Table II. As a control, papers treated with only starch were tested using the Hot Oil/Grease Test 2: Pet Food and Hot Oil/Grease Test 1: Oleic Boat and the Kit Test. Aqueous sizing was tested using the Hercules Size Test. Note that the papers tested for oil- and water sizing with starch treatment only, have virtually no oil/grease- or water sizing.

Standard paper prepared on pilot paper machines utilized 100 ppm hardness water (CaCl$_2$); 50 ppm alkalinity (NaHCO$_3$); papermaking pH of 7.2 and no fillers. The tests of the sizing agents are by the hot oil- Test 2 and the Kit Test.

TABLE III

Paper Description

| | Base Sheet Characterization | | | | | | | | | Treated with Penford 270 Starch Only (2 wt % pick up) | | |
|---|---|---|---|---|---|---|---|---|---|---|---|---|
| | Wet Wt. Pick Up (Wt %) | Basis Wt g/m$^2$ | Hot Extract pH | Wt % Ash | Gurley Porosity (sec/ 100 ml) | Caliper (mills) | Formation (Ambertec Beta, v g/m) | Furnish Ratio of Bleached Hardwood/ Softwood | Previous Size Press Treatment | Other | Aggressive Pet Food Test (% Stain) | Kit # | HST (80% refl., #2 ink) |
| Commercial Mill Paper | | | | | | | | | | | | | |
| A | 67 | 57 | 7.1 | 1.0 | 15 | 2.9 | 0.49 | 70/30 | None | | 100 | 0 | 0 |
| B | 53 | 57 | 7.1 | 2.0 | 34 | 3.3 | 0.53 | 73/27 | None | | 100 | 0 | 0 |
| C | 53 | 50 | 8.2 | 11 | 25 | 2.5 | 0.55 | 81/19 | None | | 100 | 0 | 0 |
| D | 45 | 57 | 6.2 | 0 | 34 | 3.2 | 0.53 | 73/27 | None | | 100 | 0 | 0 |
| T | 29 | 70 | 9.0 | 8 | 20 | 3.7 | 0.53 | 85/15 | None | | 100 | 0 | 86 |
| U | 41 | 42 | 6.2 | 1.0 | 42 | 2.2 | 0.57 | 74/26 | None | | 100 | 0 | 2 |
| Pilot Machine Paper | | | | | | | | | | | | | |
| E | 72 | 60 | 6.0 | 0 | 20 | 4.4 | 0.66 | 70/30 | None | 100 ppm Hardness | 100 | 0 | 0 |
| F | 81 | 59 | 6.3 | 4.0 | 15 | 4.5 | 0.64 | 70/30 | None | | 100 | 0 | 0 |
| G | 84 | 59 | 6.5 | 80 | 13 | 4.6 | 0.63 | 50/50 | None | | 100 | 0 | 0 |
| H | 72 | 60 | 6.9 | 0 | 14 | 4.5 | 0.71 | 50/50 | None | 0.25% Papermaker's Alum | 100 | 0 | 0 |
| I | 72 | 60 | 6.6 | 0 | 12 | 4.6 | 0.71 | 50/50 | None | 0.50% Papermaker's Alum | 100 | 0 | 0 |
| J | 71 | 60 | 6.7 | 0 | 12 | 4.5 | 0.70 | 50/50 | None | 0.75% Papermaker's Alum | 100 | 0 | 0 |
| K | 68 | 60 | 6.2 | 0 | 18 | 4.4 | 0.61 | 50/50 | None | <10 ppm Hardness | 100 | 0 | 0 |
| L | 72 | 57 | | 0 | 23 | 4.4 | 0.61 | 50/50 | None | 100 ppm Hardness | 100 | 0 | 0 |
| M | 69 | 59 | 6.5 | 0 | 18 | 4.4 | 0.64 | 50/50 | None | 350 ppm Hardness | 100 | 0 | 0 |
| N | 71 | 60 | 6.2 | 0 | 22 | 4.5 | 0.61 | 50/50 | None | <10 ppm alkalinity | 100 | 0 | 0 |
| O | 72 | 60 | 6.7 | 0 | 22 | 4.5 | 0.68 | 50/50 | None | 300 ppm alkalinity | 100 | 0 | 0 |
| P | 68 | 60 | 5.8 | 0 | 22 | 4.6 | 0.67 | 50/50 | None | pH 4.5 | 100 | 0 | 0 |
| Q | 72 | 60 | 6.3 | 0 | 21 | 4.4 | 0.68 | 50/50 | None | pH 9.0 | 100 | 0 | 0 |
| R | 69 | 59 | 6.1 | 0 | 26 | 4.3 | 0.69 | 50/50 | None | | 100 | 0 | 0 |
| S | 75 | 55 | 6.6 | 0 | 7 | 4.4 | 0.62 | 50/50 | None | | 100 | 0 | 0 |
| V | | 280 | | | 456 g/m$^2$ | | | 73/27 | None | Molded Board | NA | NA | NA |
| X | NA | 65 | Mfg at 7.2 | 0 | | | | 400 CSF, 90/10 Bleached Kraft hardwood/ softwood | NA | 0.5 wt % StaLok ® 400 Cationic Starch, 0.01% Cationic polyacrylamide retention aid | | | 0 |

NA = Not applicable test for molded board.
Tests on diverse selection of paper types The water dispersible oil/grease-sizing and water-sizing agent was tested with a diverse selection of paper types which are derived from different paper preparation conditions. In each case a single type of sizing agent was used. The polymer formulation used TELA-N as the fluorochemical source and TETA as the polyamine and the R$_f$/amine/epi mole ratio was 1.75/1.0/2.25. The polymer agent was made by the process described in Synthetic Example E2b. Scotchban® FC845 was also used as a comparative example in each paper type. The "Starch Only" entry shows the results of paper testing with no oil/grease- or water-sizing agent added. Items in parenthesis ( ) after each paper type in Table IV refer to variations in the paper preparation conditions that are different than the standard condition described above.

TABLE IV

TEST OF OIL-SIZING WITH DIVERSE SELECTION OF PAPER TYPES

| | Oil- Sizing Results | | | | | |
|---|---|---|---|---|---|---|
| | Hot Oil-Test 2: Pet Food (% Stain, ave. of 3) | | | Kit Test (ave. of 5) | | |
| Oil-Size (Mole Ratio) $R_F$/polyamine/Epi | 0.125 | 0.150 | 0.175 | 0.125 | 0.150 | 0.175 |
| Paper: E (No Filler) | | | | | | |
| Starch Only | | 99 | | | 0 | |
| Scotchban ® FC845 | 100 | 100 | 100 | 4– | 5 | 6 |
| 1.75/1.0/2.25 | 68 | 2 | 0 | 6– | 7+ | 9+ |
| Paper: F (5% Precipitated Calcium Carbonate) | | | | | | |
| Starch Only | | 99 | | | 0 | |
| Scotchban ® FC845 | 100 | 100 | 100 | 4– | 5 | 6 |
| 1.75/1.0/2.25 | 65 | 9 | 0 | 5– | 6 | 7– |
| Paper: G (10% Precipitated Calcium Carbonate) | | | | | | |
| Starch Only | | 99 | | | 0 | |
| Scotchban ® FC845 | 100 | 98 | 92 | 2+ | 3 | 4 |
| 1.75/1.0/2.25 | 61 | 20 | 3 | 4– | 5 | 6– |
| Paper: H (0.25% Alum) | | | | | | |
| Starch Only | | 99 | | | 0 | |
| Scotchban ® FC845 | 100 | 93 | 11 | 5 | 5+ | 6 |
| 1.75/1.0/2.25 | 17 | 3 | 0 | 6– | 8– | 10– |
| Paper: I (0.50% Alum) | | | | | | |
| Starch Only | | 99 | | | 0 | |
| Scotchban ® FC845 | 100 | 92 | 0 | 4– | 5 | 5+ |
| 1.75/1.0/2.25 | 10 | 0 | 0 | 5+ | 7+ | 9 |
| Paper: J (0.75% Alum) | | | | | | |
| Starch Only | | 99 | | | 0 | |
| Scotchban ® FC845 | 100 | 74 | 2 | 7 | 5– | 6 |
| 1.75/1.0/2.25 | 52 | 3 | 0 | 5+ | 8– | 9+ |
| Paper: K (<10 ppm Hardness) | | | | | | |
| Starch Only | | 99 | | | 0 | |
| Scotchban ® FC845 | 100 | 100 | 76 | 5 | 6– | 7– |
| 1.75/1.0/2.25 | 23 | 0 | 0 | 6 | 8+ | 10– |
| Paper: L (100 ppm Hardness) | | | | | | |
| Starch Only | | 99 | | | 0 | |
| Scotchban ® FC845 | 100 | 100 | 99 | 4+ | 5+ | 6+ |
| 1.75/1.0/2.25 | 29 | 2 | 0 | 7– | 9– | 10 |
| Paper: M (350 ppm Hardness) | | | | | | |
| Starch Only | | 99 | | | 0 | |
| Scotchban ® FC845 | 100 | 93 | 0 | 5+ | 6+ | 7 |
| 1.75/1.0/2.25 | 25 | 0 | 0 | 6 | 9 | 9+ |
| Paper: N (<10 ppm alkalinity) | | | | | | |
| Starch Only | | 99 | | | 0 | |
| Scotchban ® FC845 | 100 | 100 | 100 | 5– | 5+ | 6 |
| 1.75/1.0/2.25 | 73 | 36 | 1 | 6+ | 8– | 10– |
| Paper: O (300 ppm alkalinity) | | | | | | |
| Starch Only | | 99 | | | 0 | |
| Scotchban ® FC845 | 100 | 100 | 100 | 4 | 5– | 6 |
| 1.75/1.0/2.25 | 83 | 31 | 0 | 6 | 8– | 10– |
| Paper: P (pH 4.5) | | | | | | |
| Starch Only | | 99 | | | 0 | |

TABLE IV-continued

TEST OF OIL-SIZING WITH DIVERSE SELECTION OF PAPER TYPES

| | Oil- Sizing Results | | | | | |
|---|---|---|---|---|---|---|
| | Hot Oil-Test 2: Pet Food (% Stain, ave. of 3) | | | Kit Test (ave. of 5) | | |
| Oil-Size (Mole Ratio) $R_F$/polyamine/Epi | 0.125 | 0.150 | 0.175 | 0.125 | 0.150 | 0.175 |
| Scotchban ® FC845 | 100 | 100 | 95 | 5 | 6– | 9+ |
| 1.75/1.0/2.25 | 2 | 1 | 0 | 9 | 12 | 13 |
| Paper: Q (pH 9.0) | | | | | | |
| Starch Only | | 99 | | | 0 | |
| Scotchban ® FC845 | 100 | 100 | 100 | 4 | 5– | 6 |
| 1.75/1.0/2.25 | 93 | 8 | 2 | 7 | 10 | 10 |
| Paper: R (29 Gurley Porosity) | | | | | | |
| Starch Only | | 99 | | | 0 | |
| Scotchban ® FC845 | 100 | 100 | 1 | 5– | 5– | 7– |
| 1.75/1.0/2.25 | 70 | 19 | 2 | 7 | 10 | 11– |
| Paper: S (8 Gurley Porosity) | | | | | | |
| Starch Only | | 99 | | | 0 | |
| Scotchban ® FC845 | 100 | 100 | 100 | 4 | 5 | 6 |
| 1.75/1.0/2.25 | 98 | 88 | 4 | 7 | 8– | 11 |

These tests demonstrate that a wide variety of papers treated with water dispersible oil/grease-sizing and water-sizing agent have much improved oil/grease sizing. The agents of the invention permit broad ranges of paper types which are based on variation of the inorganic fillers, alum, water hardness, alkalinity, pH and porosity.

Preparation of Treated Paper with Different Size Press and Drying Conditions

The water dispersible oil/grease-sizing and water-sizing agent is effective over a wide range of size press papermaking conditions. Four different synthetic formulations of the invention were used and are indicated in Table V. In each case the polyamine used was DETA. The 1.85/1.0/3.4 agent was prepared by process described in Synthetic Example H2c. The 1.75/1.0/3.25 was prepared by process described in Synthetic Example H1e. The 2.0/1.0/5.0 was prepared by process described in Synthetic Example I2j. The 2.0/1.0/3.25 was prepared by process described in Synthetic Example H3d. Poly vinyl alcohol is abbreviated PVA. PVA amd was obtained from Air Products as Airvol(R) 203 Air Products and Chemicals, Inc., Allentown, Pa. 18195. The Cationic Starch used was Cargil Charge +39, Cargill, Cedar Rapids, Iowa 52406

TABLE V

TESTS OVER WIDE RANGE OF SIZE PRESS PAPERMAKING CONDITIONS

| Oil-Size (Mole Ratio) $R_F$/polyamine/Epi | Synthetic Example No. | Size Press Condition Variation from Standard | Oil- Sizing Results | | | | | |
|---|---|---|---|---|---|---|---|---|
| | | | Hot Oil- Test 2: Pet Food (% Stain ave. of 3) | | | Kit Test (ave. of 5) | | |
| | | | Addition Level (% wt size/wt dry fiber) | | | | | |
| | | | 0.250 | 0.325 | 0.400 | 0.250 | 0.325 | 0.400 |
| | | | PaperA | | | | | |
| Starch Only | | | 100 | | | 0 | | |
| 1.85/1.0/3.4 | H2c | Standard | 0 | 0 | | 11– | 13– | |
| 1.85/1.0/3.4 | H2c | 1-min Hold Time | 0 | 0 | | 11– | 13– | |
| 1.85/1.0/3.4 | H2c | 300-min Hold Time | 1 | 0 | | 10 | 12 | |
| 1.85/1.03.4 | H2c | 2% PVA, no Ethylated Starch | 0 | 1 | | 11 | 12 | |
| 1.85/1.0/3.4 | H2c | 50 C. | 1 | 0 | | 10 | 13– | |
| 1.85/1.0/3.4 | H2c | 75 C. | 0 | 0 | | 11 | 13 | |
| 1.75/1/3.25 | H1e | 250 ppm hardness | 2 | 0 | | 11– | 13 | |
| 1.75/1/3.25 | H1e | 2% Cationic Starch, no Ethylated Starch N | 1 | 0 | | 11– | 13 | |
| Lodyne ® P208E | | Standard | 0 | | | 12 | | |
| Lodyne ® P208E | | 2% PVA, no ethylated stardh | 100 | | | 5+ | | |
| | | 250 ppm Hardness (CaCl$_2$) | 85 | | | 10 | | |
| | | | Paper: B | | | | | |
| 2.0/1.0/3.25 | H3d | PH 7.5 | 2 | 1 | 8 | 9+ | 10– | |
| 2.0/1.0/3.25 | H3d | PH 5.5 | 5 | 1 | 9– | 9 | 10 | |

| Oil-Size (Mole Ratio) $R_F$/polyamine/Epi | Synthetic Example No. | Size Press Condition Variation from Standard | Hot Oil- Test 1: 75° C. Oleic Boat (sec to 100% Stain, Ave. of 3) | Kit # (ave. of 5) | HST Test (ave. of 3) |
|---|---|---|---|---|---|
| | | | 0.2% Additional Level (% wt size/wt dry fiber) | | |
| Starch Only | | | 0 | 0 | 0 |
| Scotchban ® FC845 | | Drum Dry 65 C., 17 sec | 11 | 3+ | 2 |
| Scotchban ® FC845 | | Drum Dry 105 C., 50 sec | 31 | 6+ | 136 |
| 2.0/1.0/5.0 | I2j | Drum Dry 65 C., 17 sec | 600+ | 6+ | 328 |
| 2.0/1.0/5.0 | I2j | Drum Dry 105 C., 50 sec | 600+ | 7 | 432 |
| 2.0/1.0/5.0 | I2j | 250 ppm Hardness (CaCl$_2$) | 600+ | 5+ | 307 |
| 2.0/1.0/5.0 | I2j | 250 ppm Alkalinity (NaHCO$_3$) | 600+ | 6– | 373 |

The water dispersible oil/grease-sizing and water-sizing agent can effectively be used under a variety of size press papermaking conditions including varied solution temperatures, solution hardness, solution alkalinity, solution pH, paper drying temperature and time and carrier (starch type and PVA). At higher addition levels the agent are more effective. When compared to Lodyne® P208E, the oil/grease- and water-sizing agent of this invention gives better hot oil-sizing when tested with 2% PVA (no ethylated starch) and at 250 ppm hardness. These comparisons are based on the Hot Oil-Test 2, the pet food test which measures the % stain and the Kit Test. Using the Hot Oil-Test 1, the oleic acid boat test, the agent of this invention outperforms the Scotchban® treated paper. In Hot Oil-Test 1 the time in seconds to observe 100% stain is reported.

The Agent of This Invention is Effective at Various Addition Rates

The water dispersible oil/grease-sizing and water-sizing agent's effectiveness increases with higher addition rates as measured by the Hot Oil-Test 2: Pet Food and the Kit Test. The material has a 1.75/1/2.25 ratio and was made by process similar to Synthetic Example E2b.

TABLE VI

EFFECTIVENESS INCREASES WITH INCREASED ADDITION RATE

Oil- Sizing Results

| Oil- Size (Mole Ratio TELA-N/TETA/Epi) | Hot Oil- Test 2: Pet Food (% Stain, ave. of 3) Addition Level (% wt size/wt dry fiber) | | | | | | | Kit Test (ave. of 5) | | | | | |
|---|---|---|---|---|---|---|---|---|---|---|---|---|---|
| | 0.150 | 0.175 | 0.20 | 0.25 | 0.30 | 0.35 | 0.40 | 0.15 | 0.175 | 0.20 | 0.25 | 0.30 | 0.35 | 0.40 |
| Paper: E (Pet food batch A) | | | | | | | | | | | | | | |
| Starch Only | | | | 100 | | | | | | | 0 | | | |
| 1.75/1.0/2.25 | 21 | 1 | 0 | 0 | 0 | 0 | 0 | 8+ | 10 | 11 | 12 | 13 | 14 | 15 |

The 0.15% size/dry fiber (wt/wt) produces good results. Above 0.20% the sizing is even more effective. Above 0.20% the hot oil-test does not differentiate among the papers with more oil/grease- and water-sizing agent, since the test results are all as good as the test can measure. For the Kit Test improvement is proportional to the amount of agent added.

The Agent can be Added Internally to the Pulp.

The water dispersible oil/grease-sizing and water-sizing agent can be used by adding it internally to the paper machine. The polymer of the invention used in the test shown in Table VII had a $R_f$/amine/epi mole ratio of 1.75/1.0/2.25. TELA N is the fluorocarbon source, TETA the polyamine and its synthesis is described in Synthetic Example E2b. The 2.00/1.0/0.75 compound had TELA as the fluorocarbon source, DETA as the polyamine and its synthesis is described in Synthetic Example I2c.

Internal Addition Method: Chemical additives, including fluoroalkyl-hydroxyl-alkylpolyamine.-3-hydroxyazetidinium polymers or, were added to the furnish while 65 g/m² basis weight paper was being made using a pilot Fourdrinier papermachine. The type of furnish, chemical additives, and addition points are listed with each example described below. All chemical additions are expressed as a weight percent of the dry weight of furnish. The sizing property of the paper was determined using the test methods described.

TABLE VII

Invention can also be added internally to the paper machine

Oil-Sizing and Water Sizing Results

| Oil-Size (Mole Ratio) $R_F$/polyamine/Epi | Kit Test (ave. of 5) Internal Addition Level (% wt size/wt dry fiber) | | HST (s) (ave. of 3) | |
|---|---|---|---|---|
| | 0.210 | 0.275 | 0.210 | 0.275 |
| Paper: X | | | | |
| Scotchban ® FC845 | 5– | | 7 | |
| 1.75/1.0/2.25 | 5 | | 492 | |
| 2.0/1.0/0.75 | | 6 | | 28 |

The agent is effective when it is added internally.

The Agent Performs Well at High Oil- and High Water Temperatures; Agent Incorporation in the Paper.

The water dispersible oil/grease-sizing and water-sizing agent performance was measured using hot oil- and hot water and ambient water sizing tests. Different oil-sizing tests were done at 70 and 75° C. For water sizing the Boiling Boat Test at 99° C. was used.

The incorporation of agent was measured on the paper by measuring the amount of fluorine detected in the combustion product of the paper sample. The measurement technique was ion chromatography.

The 1.75/1.0/2.25 compound had TELA N as the fluorocarbon source, TETA as the polyamine and its synthesis is described in Synthetic Example E2b.

TABLE VIIIA

EFFECTIVENESS WHEN TESTED WITH HOT OIL

| Oil-Size (Mole Ratio) $R_F$/polyamine/Epi | Oil- Sizing Results 70 C. Hot Oil- Test 2: Pet Food (% Stain, ave. of 3) Addition Level (% wt size/wt dry fiber) | | | | | Hot Oil- Test 1: 75 C. Oleic Acid Float (sec to 100% Stain) | | | | |
|---|---|---|---|---|---|---|---|---|---|---|
| | 0.175 | 0.200 | 0.225 | 0.250 | 0.275 | 0.175 | 0.200 | 0.225 | 0.250 | 0.275 |
| Paper B: (Pet food batch A) | | | | | | | | | | |
| Starch Only | | | | 100 | | | | | 0 | |
| Scotchban ® FC845 | 100 | 100 | 100 | 100 | 100 | 45 | 51 | 67 | 85 | 142 |
| Lodyne ® P208E | 100 | 90 | 87 | 70 | 36 | 600+ | 600+ | 600+ | 600+ | 600+ |
| 1.75/1.0/2.25 | 94 | 78 | 28 | 13 | 2 | 600+ | 600+ | 600+ | 600+ | 600+ |
| Paper: A (Pet food batch A0 | | | | | | | | | | |
| Starch Only | | | | 100 | | | | | 0 | |
| Scotchban ® FC845 | 100 | 100 | 100 | 100 | 100 | 5 | 13 | 25 | 32 | 41 |

TABLE VIIIA-continued

EFFECTIVENESS WHEN TESTED WITH HOT OIL

| Oil-Size (Mole Ratio) | Oil- Sizing Results | | | | | | | | | |
|---|---|---|---|---|---|---|---|---|---|---|
| | 70 C. Hot Oil- Test 2: Pet Food (% Stain, ave. of 3) | | | | | Hot Oil- Test 1: 75 C. Oleic Acid Float (sec to 100% Stain) | | | | |
| | Addition Level (% wt size/wt dry fiber) | | | | | | | | | |
| $R_F$/polyamine/Epi | 0.175 | 0.200 | 0.225 | 0.250 | 0.275 | 0.175 | 0.200 | 0.225 | 0.250 | 0.275 |
| Lodyne ® P208E | 100 | 100 | 100 | 79 | 63 | 600+ | 600+ | 600+ | 600+ | 600+ |
| 1.75/1.0/2.25 | 100 | 24 | 6 | 1 | 0 | 600+ | 600+ | 600+ | 600+ | 600+ |

TABLE VIIIB

EFFECTIVENESS WHEN TESTED WITH AMBIENT WATER, HOT WATER AND FLOURIDE INCORPORATION

| Oil-Size (Mole Ratio) | Water Sizing Results | | | | | | | | | | | | |
|---|---|---|---|---|---|---|---|---|---|---|---|---|---|
| | HST (sec) | | | | | Boiling-Boat (sec to 100% stain) | | | | | | | |
| | Addition Level (% wt size/wt dry fiber) | | | | | | | | | | | | |
| $R_F$/polyamine/Epi | 0.175 | 0.200 | 0.225 | 0.250 | 0.275 | 0.175 | 0.200 | 0.225 | 0.250 | 0.275 | 0.175 | 0.250 | 0.300 |
| | Paper: B (Pet food batch A) | | | | | | | | | | Measured wt % F in paper | | |
| Starch Only | | | 0 | | | | | 0 | | | | 0.00 | |
| Scotchban ® FC845 | 101 | 123 | 154 | 201 | 292 | 2 | 4 | 5 | 6 | 7 | 0.08 | 0.12 | 0.12 |
| Lodyne ® P208E | 2 | 3 | 4 | 4 | 7 | — | — | — | — | — | 0.10 | 0.13 | 0.15 |
| 1.75/1.0/2.25 | 282 | 307 | | 398 | | 125 | 142 | 160 | 300+ | 300+ | 0.07 | 0.10 | 0.12 |
| | Paper: A (Pet food batch A) | | | | | | | | | | | | |
| Starch Only | | | 0 | | | | | 0 | | | | 0.00 | |
| Scotchban ® FC845 | 44 | 47 | 106 | 147 | 247 | 0 | 0 | 1 | 2 | 2 | 0.07 | 0.09 | 0.11 |
| Lodyne ® P208E | 1 | 2 | 2 | 3 | 3 | 0 | 0 | 2 | 3 | 4 | 0.09 | 0.11 | 0.15 |
| 1.75/1.0/2.25 | 453 | 583 | 535 | 656 | 695 | 55 | 78 | 104 | 149 | 215 | 0.07 | 0.09 | 0.11 |

For both Hot Oil-Test 2 and Hot Oil-Test 1, with pet food and oleic acid, respectively, the water dispersible oil/grease-sizing and water-sizing agent performance was very good. The studies reported in Table VIII reinforce the need to match the final use performance requirements of the treated paper. Based on the Hot Oil-Test 1, Lodyne® P208E and the agent of the invention behave similarly, however, under the Hot Oil-Test 2 conditions the agent described by this invention is superior. The Scotchban® FC845-treated paper performs poorly in both oil-sizing tests.

The water dispersible oil/grease-sizing and water-sizing agent demonstrated excellent oil sizing at 70° C. and 75° C. by the Hot Oil Test 2 and Test 1 respectively. The agent also had excellent hot water and ambient water sizing as measured by the Boiling—Boat Test and by the Hercules Sizing Test, respectively. The Lodyne® 208E failed both the Hercules Size Test and the Boiling—boat test, while Scotchban® FC845 has some water sizing based on the Hercules Size Test, but it did not pass the boiling—boat test. Thus, in contrast to readily available commercial oil/grease-size agents, the agent of this invention is capable of both oil/grease- and water sizing, especially when hot oil and hot water conditions are tested. The agent of this invention has excellent breadth of performance.

The incorporation of the agent as measured by its fluoride content is similar to the incorporation, Scotchban® FC845 and lower than the Lodyne® 208E, indicating that the performance of the invention agent is even better relative to Lodyne 208E when compared on a weight % fluoride basis.

Oil-sizing Test of Treated Paper at Two Different Temperatures.

The water dispersible oil/grease-sizing and water-sizing agent was tested at 60° and 70° C. The 1.75/1.0/2.25 compound had TELA N as the fluorocarbon source, TETA as the polyamine and its synthesis is described in Synthetic Example E2b. The agent was compared to commercially available oil-size agents.

TABLE IX

TEST OF AGENT AT TWO DIFFERENT TEMPERATURES

Oil- Sizing Results

| | Hot Oil- Test 2: Pet Food (% Stain, ave. of 3) | | | | | | Kit Test (ave. of 5) | | |
|---|---|---|---|---|---|---|---|---|---|
| | 60 C. | | | 70 C. | | | | | |
| Oil- Size (Mole Ratio | Addition Level (% wt size/wt dry fiber) | | | | | | | | |
| TELA-N/TETA/Epi) | 0.200 | 0.250 | 0.325 | 0.200 | 0.250 | 0.325 | 0.200 | 0.250 | 0.325 |
| Paper: B (Pet food batch A) | | | | | | | | | |
| Starch Only | | 100 | | | 100 | | | 0 | |
| Scotchban ® FC845 | 3 | 0 | 0 | — | 100 | 100 | 8 | 9– | 11 |
| Lodyne ® P208E | 8 | 2 | — | 95 | 39 | 7 | 10 | 11+ | 13 |
| 1.75/1.0/2.25 | 2 | 0 | — | 36 | 2 | 0 | 10 | 12– | 12+ |
| Paper: A (Pet food batch A) | | | | | | | | | |
| Starch Only | | 100 | | | 100 | | | 0 | |
| Scotchban ® FC845 | 99 | 0 | — | — | 100 | 100 | 5 | 6 | 10 |
| Lodyne ® P208E | 34 | 31 | 14 | — | 100 | — | 7 | 10 | 13 |
| 1.75/1.0/2.25 | 0 | 0 | 0 | — | 11 | 0 | 10 | 11– | 13– |

Tests at higher temperature show that more oil-sizing functionality is needed at higher temperature to achieve the same level of sizing achieved at lower temperatures. In all tests, the agent performs better than commercially available products. The difference in the efficiency of the invention versus commercial materials becomes even greater when the test temperature increases.

The Agent is Tested in a Creased Paper Application Test.

The water dispersible oil/grease-sizing and water-sizing agent is tested in a hot oil-, creased-paper-type applications, industry-standard RP2 Test, and by the Kit Test. The retention of the agent is tested by measuring amount of fluorine retained in the paper by ion chromatography. The 1.75/1.0/2.25 compound had TELA N as the fluorocarbon source, TETA as the polyamine and its synthesis is described in Synthetic Example E2b. The agent was 49% (wt/wt) fluorine. The commercial Scotchban® FC845 was 40% (wt/wt) fluorine.

The sizing agent of this invention performs well in the creased paper test, especially when compared to a commercial product, Scotchban® FC 845. The retention of fluorine shows that the sizing agent is retained on the paper. While the Scotchban® FC 845's retention on the paper is nearly equal to the theoretical weight percent, the sizing agent of this invention retention on paper is somewhat less than theoretical.

The Agent Can be Prepared From Different $R_f$ Sources, and Spacer Groups.

Water dispersible oil/grease-sizing and water-sizing agents derived from different fluorocarbon and spacer groups were tested. The fluorocarbons used in the preparation were derived from relatively pure isomeric compositions and a mixture. Also, the temperature of the polyamine with fluoroalkyl-epoxide reaction is 130° C. instead of the standard 80° C. for entries 1 and 2, Table XI. For entry XI-8 the spacer group is $CH_2CH_2OCH_2CH(OH)CH_2$ not the standard $CH_2CH(OH)CH_2$. The 1.75/1.0/2.25 mole ratio was maintained throughout the set and TETA was the polyamine used.

TABLE X

TESTS USING THE CREASED PAPER TEST AND FLUORIDE INCORPORATION

| Oil- Size (Mole Ratio TELA- N/TETA/Epi) | Addition Level (% wt size/wt dry fiber) | | | | | | | | | | | |
|---|---|---|---|---|---|---|---|---|---|---|---|---|
| | 0.175 | 0.200 | 0.225 | 0.250 | 0.175 | 0.200 | 0.225 | 0.250 | 0.175 | 0.200 | 0.225 | 0.250 |
| | 24 hr, 60° C., Creased RP2 Test (% Stain, ave. of 2) | | | | Kit test (ave. of 5) | | | | Measured Wt % F in paper | | | |
| Starch Only | | 100 | | | | 0 | | | | 0.000 | | |
| Scotchban ® FC845 | 100 | 99 | 1 | 0 | 4 | 5– | 6– | 6 | 0.074 | 0.080 | 0.091 | 0.101 |
| 1.75/1.0/2.25 | 0 | 0 | 0 | 0 | 6– | 6+ | 6+ | 7 | 0.069 | 0.080 | 0.092 | 0.100 |
| | | | | | Measured Wt % F | | | | Theoretical Wt % F | | | |
| FC845 | | | | | | 40 | | | 0.070 | 0.080 | 0.090 | 0.100 |
| 1.75/1.0/25 | | | | | | 49 | | | 0.086 | 0.098 | 0.110 | 0.123 |

TABLE XI

VARIATION OF $R_F$ GROUP AND THE SPACER GROUP

| Oil-Size (Mole Ratio) $R_F$/polyamine/ Epi | Synthetic Ex. No. | $R_f$ Tail Structure | Spacer Group; Group between $R_f$ and Polyamine | Oil-Sizing Results | | | | | | | |
|---|---|---|---|---|---|---|---|---|---|---|---|
| | | | | Hot Oil- Test 2: Pet Food (% Stain, ave. of 3) Addition Level (% wt size/wt dry fiber) | | | | Kit Test (ave. of 5) Addition Level (% wt size/wt dry fiber) | | | |
| | | | | 0.175 | 0.200 | 0.250 | 0.325 | 0.175 | 0.200 | 0.250 | 0.325 |
| | | | Paper: A (Pet food batch A) | | | | | | | | |
| Starch Only | | | | | 100 | | | | 0 | | |
| 1.75/1.0/2.25 | E2b SS | TELA-N | $CH_2CH(OH)CH_2$ | 0 | 0 | | | 8– | 9 | | |
| 1.75/1.0/2.25 | A1a SS | C6 | $CH_2CH(OH)CH_2$ | | 96 | 92 | | 9– | 10 | | |
| 1.75/1.0/2.25 | A1a SS | C7 | $CH_2CH(OH)CH_2$ | | 93 | 57 | | | 7 | 8 | |
| 1.75/1.0/2.25 | B1a | C8 | $CH_2CH(OH)CH_2$ | | 73 | 23 | 7 | | 9 | 10 | 12 |
| 1.75/1.0/2.25 | C1a SS | C10 | $CH_2CH(OH)CH_2$ | | 44 | 0 | 0 | | 6 | 6 | 8 |
| 1.75/1.0/2.25 | C1a SS | $CF_3CF(CF_3)(CF_2)_6$ Branched | $CH_2CH(OH)CH_2$ | | 19 | 12 | | | 10– | 11– | |
| 1.75/1.0/2.25 | C1a SS | C6 | $CH_2CH_2OCH_2CH(OH)CH_2$ | | 91 | 95 | | | 9– | 10– | |

Based on these Hot Oil-Test 2: Pet Food Test results the performance of the invention increases as the length of the $R_f$ increases. The preferred formulations are based on the mixed isomer fluorocarbon, TELA N. The different spacer group has no effect on performance. The branched isomer fluorocarbon gave adequate performance.

The data in Table XI also serve to demonstrate that the relative performance as measured by the Kit Test does not necessarily correspond to hot oil sizing performance. Additionally, the Kit Test results show improvement as more agent is added.

The Agent can be Prepared with Different $R_F$ and Halohydrin to Nitrogen Mole Ratios.

The water dispersible oil/grease-sizing and water-sizing agent can have a wide range of the combined $R_F$ and spacer group-to-polyamine rations. Additionally, the agents of this invention can have wide ranges of epihalohydrin or epiorganosulfonate to polyamine ratios. The combined $R_F$ spacer group while normally is $CH_2CH(OH)CH_2$ is $CH_2CH(OH)$ $CHOCH_2CHICH_2$ in example listed in Table XII, Part F.

The cellulose reactive component is necessary for an effective agent described in this invention. Tests of the agent precursor, fluoroalkyl-hydroxyl-alkylpolyamine were done for comparison and these are listed in Table XII part A2, B, C, D1, D2, and F. See Structure VI and Analogues, Reaction 2 for the conversion of the fluoroalkyl-hydroxyl-alkylpolyamine to the agents of this invention.

TABLE XII

PERFORMANCE WITH VARYING POLYAMINE AND EPIHALOHYDRIN RATIOS - Part A1

| | | Oil-Sizing Results | | | | | | | |
|---|---|---|---|---|---|---|---|---|---|
| | Paper: C (Pet food batch B) | Hot Oil - Test 2: Pet Food | | | | Kit Test | | | |
| Oil-Size (Mole Ratio) $R_F$/polyamine/ Epi | Synthetic Ex. No. | (% Stain, ave. of 3) Addition Level (% wt size/wt dry fiber) | | | | (ave. of 5) Addition Level (% wt size/wt dry fiber) | | | |
| | | 0.06 | 0.075 | 0..09 | 0.105 | 0.06 | 0.075 | 0.09 | 0.105 |
| Starch Only | | 99 | | | | 0 | | | |
| Ciba Lodyne ® P208E | | – | 55 | 42 | 24 | – | 5 | 6 | 6 |
| 1.5/1.0/1.62 | E1a SS | 10 | 3 | – | – | 6– | 6 | – | – |
| 1.5/1.0/1.74 | E1a SS | 39 | 7 | – | – | | | – | – |
| 1.5/1.0/1.88 | E1a SS | 6 | 1 | – | – | 6– | 6 | – | – |
| 1.5/1.0/2.0 | E1b SS | 5 | 6 | – | – | 5– | 6– | – | – |
| 1.5/1.0/2.15 | E1b SS | 14 | 4 | – | – | 5 | 5 | – | – |

Part A compounds have TELA N as the fluorocarbon source, TETA as the polyamine and the ratios are the Rf:polyamine:epi ratio and the temperature of the $R_F$ epoxide/TETA reaction was 130° C..

PERFORMANCE WITH VARYING POLYAMINE AND EPIHALOHYDRIN RATIOS - Part A2

| | Oil-Sizing Results | | |
|---|---|---|---|
| | Paper: A (Pet food batch B) | Hot Oil- Test 2: Pet Food | Kit Test (ave. of 5) |
| Oil-Size (Mole | | (% Stain, ave. of 3) | Addition |

TABLE XII-continued

| Ratio) $R_F$/polyamine/ Epi | Synthetic Example No. | Addition Level (% wt size/wt dry fiber) | | | | Level (% wt size/wt dry fiber) | |
|---|---|---|---|---|---|---|---|
| | | 0.125 | 0.15 | 0.175 | 0.2 | 0.175 | 0.2 |
| 1.75/1.0/0.0 | E2 | 100 for 0.4 add'n | | | | | |
| 1.75/1.0/1.75 | E2a | 47 | 20 | 0 | 1 | 10− | 10 |
| 1.75/1.0/1.95 | E2a SS | 66 | 33 | 0 | 0 | 10− | 11− |
| 1.75/1.0./2.05 | E2a SS | 64 | 1 | 0 | 0 | 10− | 10 |
| 1.75/1.0./2.15 | E2a SS | 78 | 24 | 0 | 0 | 9− | 10 |
| 1.75/1.0/2.25 | E2b | 81 | 21 | 1 | 0 | 9 | 10− |
| 1.75/1.0/4.0 | E2c SS | | | | 96 | | 6 |
| 2.0/1.0/1.85 | E2b SS | | | 0 | 0 | 9− | 10 |

Part A2 The compounds have TELA N as the fluorocarbon source, TETA as the polyamine and the ratios are the Rf:polyamine:epi ratio and the temperature of the $R_F$ epoxide/TETA reaction was 130° C..

PERFORMANCE WITH VARYING POLYAMINE AND EPIHALOHYDRIN RATIOS - Part A3

| | | Oil-Sizing Results | | | |
|---|---|---|---|---|---|
| Paper: A (Pet food batch B) | | Hot Oil- Test 2: Pet Food (% Stain, ave. of 3) | | Kit Test (ave. of 5) | |
| Oil-Size (Mole Ratio) $R_F$/polyamine/Epi | Synthetic Example No. | Addition Level (% wt size/wt dry fiber) | | Addition Level (% wt size/wt dry fiber) | |
| | | 0.325 | 0.4 | 0.325 | 0.4 |
| 1.75/1/2.25 | E2b | 0 | 0 | 12− | 13 |
| 1.75/1/3.25 | E2c | 1 | 1 | 11− | 12 |
| 1.75/1/4.25 | E2d | 94 | 85 | 10 | 11 |
| 2.5/1/2.5 | E3a | 0 | 0 | 12− | 13 |
| 2.5/1/3.6 | E3b | 1 | 1 | 11 | 13 |
| 3/1/2.25 | E4a | 1 | 0 | 11+ | 12 |
| 3/1/4 | E4c | 2 | 1 | 10+ | 13− |

Part A3 The compounds have TELA N as the fluorocarbon source, TETA as the polyamine and the ratios are the $R_F$:polyamine:epi ratio and the temperature of the epi addition was 80° C..

PERFORMANCE WITH VARYING POLYAMINE AND EPIHALOHYDRIN RATIOS - Part B

| Oil-Size (Mole Ratio) $R_F$/polyamine/Epi | Synthetic Ex. No. | Addition Level (% wt size/wt dry fiber) | Addition Level (% wt size/wt dry fiber) |
|---|---|---|---|
| | | 0.2 | 0.2 |
| 2.0/1.0/0.0 | H3 | 100 | |
| 2.0/1.0/0.5 | H3a SS | 0 | 10 |

| | | Addition Level (% wt size/wt dry fiber) | | Addition Level (% wt size/wt dry fiber) | | |
|---|---|---|---|---|---|---|
| Paper: A (Pet food batch B) | | 0.325 | 0.4 | 0.25 | 0.325 | 0.4 |
| 1.75/1/3.1 | H1d | 11 | 22 | | 9 | 10 |
| 1.85/1/3.1 | H1d SS | 4 | 0 | | 11− | 11 |
| 1.85/1/3.4 | H2c | 1 | 4 | | 10 | 11− |
| 2/1/3.1 | H3c | 25 | 9 | | 9 | 10− |
| 2/1/3.4 | H3e | 16 | 12 | | 9 | 10 |
| 1.75/1/1 | H1a | | | 9 | 10 | 11+ |
| 1.75/1/1.99 | H1b | | | 10 | 12 | 14− |
| 1.75/1/3.25 | H1e | | | 10 | 11 | 12 |
| 1.75/1/3.75 | H1g | | | 7+ | 10− | 10 |
| 1.75/1/5 | H1h | | | 7− | 9− | 10 |
| 2/1/1 | H3a | | | 8 | 12+ | 13+ |
| 2/1/2.85 | H3b | | | 9 | 11− | 13− |
| 2/1/3.25 | H3d | | | 10− | 11 | 12 |
| 2/1/3.75 | H3f | | | 11− | 12− | 13 |
| 2/1/5 | H3g | | | 8− | 10 | 10− |
| 2/1/6.32 | H3h | | | 8 | 10 | 12− |
| 2.25/1/3.25 | H4b | | | 8 | 10 | 12 |

TABLE XII-continued

| | | | | |
|---|---|---|---|---|
| 2.25/1/3.75 | H4c | 9 | 10− | 12 |
| 2.25/1/5 | H4d | 7− | 9− | 11 |
| 2.25/1/7.93 | H4e | 7+ | 10− | 11− |
| 2.5/1/1 | H5b SS | 5− | 6 | 7 |
| 2.5/1/3.25 | H5b | 7+ | 10− | 12− |
| 2.5/1/3.75 | H5c | 7− | 10− | 11− |
| 2.5/1/5 | H5c SS | 6− | 7+ | 8− |
| 2.5/1/6.16 | H5d | 7 | 10 | 12− |

Part B The compounds have TELA N as the fluorocarbon source, DETA as the polyamine and the ratios are the Rf:polyamine:epi ratio and the temperature of the $R_F$ epoxide/DETA reaction was 80° C..

PERFORMANCE WITH VARYING POLYAMINE AND EPIHALOHYDRIN RATIOS - PART C

Paper: A (Petfood batch A)

| Oil-Size (Mole Ratio) $R_F$/polyamine/Epi | Synthetic Ex. No. | Hot Oil-Test 1: 75° C. Oleic Boat (sec to Stain, ave. of 3) 0.25 Addition Level (% wt size/wt dry fiber) | Oleic Acid Drop Test 100% (0 = no stain, 5 = total stain) | Kit Test (ave. of 5) | HST (Ave. of 3) |
|---|---|---|---|---|---|
| Starch Only | | 0 | 5 | 0 | 0 |
| Scotchban ® FC845 | | 18 | 0 | 7+ | 248 |
| Lodyne ® P514 | | 12 | 1 | 10 | 402 |
| 1.5/1/1.5 | I1a | 6 | 2 | 9 | 341 |
| 1.5/1/5 | I1c | 300+ | 1 | | 461 |
| 2/1/0 | I2 | 8 | 4 | 8 | 78 |
| 2/1/1.5 | I2f | 10 | 0 | 10− | 429 |
| 2/1/5 | I2j | 300+ | 0 | 8+ | 467 |
| 2.5/1/1.5 | I3a | 25 | 1 | 9 | 407 |
| 2.5/1/3 | I3g | 300+ | 0 | 9− | 500 |
| 2.5/1/5 | I3l | 300+ | 0 | 10− | 475 |
| 2/1/0.25 | I2b SS | | | 10 | 166 |
| 2/1/0.5 | I2b | | | 9+ | 208 |
| 2/1/0.75 | I2c | | | 10 | 243 |
| 2/1/0.91 | I2d | | | 10 | 174 |
| 2/1/1.37 | I2E | | | 10− | 312 |

Part C The compounds have TELA as the fluorocarbon source, DETA as the polyamine and the ratios are the Rf:polyamine:epi ratio and the temperature of the $R_F$ epoxide/DETA reaction was 80° C..

PERFORMANCE WITH VARYING POLYAMINE AND EPIHALOHYDRIN RATIOS - PART D1

Paper: A (Pet food batch A)

| Oil-Size (Mole Ratio) $R_F$/polyamine/Epi | Synthetic Ex. No. | Hot Oil- Test 1: 75 C. Oleic Boat (sec to 100% Stain, ave. of 3) 0.25 Addition Level (% wt size/wt dry fiber) | Kit Test (ave. of 5) | HST (ave of 3) |
|---|---|---|---|---|
| 2/1/0 | J1 | | 9− | 72 |
| 2/1/0.5 | J1a | | 10− | 195 |
| 2/1/0.91 | J1b | | 10+ | 231 |
| 2/1/1.36 | J1c | | 10 | 293 |

Part D1 The compounds have TELA L as the fluorocarbon source, DETA as the polyamine and the ratios are the Rf:polyamine:epi ratio and the temperature of the $R_F$ epoxide/DETA reaction was 80° C..

PERFORMANCE WITH VARYING POLYAMINE AND EPIHALOHYDRIN RATIOS - PART D2

| Oil-Size (Mole Ratio) $R_F$/polyamine/Epi | Synthetic Ex. No. | Hot Oil- Test 1: 75 C Oleic Boat (sec to 100% Stain, ave. of 3) | Kit Test (ave. of 5) | HST (ave of 3) |
|---|---|---|---|---|
| 2/1/0 | H3 SS | 4 | 8− | 13 |

TABLE XII-continued

| 2/1/0.5 | H3a SS | | 10 | 140 |
|---|---|---|---|---|

Part D2 The compounds have TELA N as the fluorocarbon source, DETA as the polyamine and the ratios are the Rf:polyamine:epi ratio and the temperature of the $R_F$ epoxide/DETA reaction was 80° C.

PERFORMANCE WITH VARYING POLYAMINE AND EPIHALOHYDRIN RATIOS - PART E

Paper: A (Pet food batch A)

| Oil-Size (Mole Ratio) $R_F$/poly-amine/Epi | Synthetic Ex. No. | $R_f$ Source | Oil - Test 1: 75 C Oleic Boat (sec to 100% Stain, ave. of 3) 0.15 Addition Level(% wt size/wt dry fiber) | Hot Oleic Acid Drop Test (0 = no stain, 5 = total stain) | Kit Test (ave. of 5) | HST (ave of 3) |
|---|---|---|---|---|---|---|
| 2/1/5 | J1c SS | TELA-L | 32 | 3 | 5– | 224 |
| 2/1/5 | I2j SS | TELA | 40 | 3 | 5+ | 187 |
| 2/1/5 | H3g SS | TELA-N | 300+ | 2 | 5+ | 218 |

Part E The compounds have different fluorocarbon sources, DETA as the polyamine and the ratios are the $R_f$:polyamine:epi ratio and the temperature of the $R_F$ epoxide/DETA reaction was 80° C.

PERFORMANCE WITH VARYING POLYAMINE AND EPIHALOHYDRIN RATIOS - PART F

Paper: A (Pet food batch A)

| Oil-Size (Mole Ratio) $R_F$/polyamine/Epi | Synthetic Ex. No. | Oleic Acid Drop Test (0 = no stain, 5 = total stain) 0.25 Addition Level (% wt size/wt dry fiber) | Kit Test (ave. of 5) | HST (ave of 3) |
|---|---|---|---|---|
| 2/1/0 | I2 | | 7– | 8 |
| 2/1/0.75 | I2c | 0 | 8 | 7 |

Part F The compounds have TELA for the fluorocarbon sources, DETA as the polyamine and the ratios are the Rf:polyamine:epi ratio and the temperature of the $R_F$ epoxide/DETA reaction was 80° C. and the spacer group is $CH_2CH(OH)CHOCH_2CHICH_2$ Pet Food batch "A" contained higher levels of aggressive fat than pet food "B".

Examples from Table XII show a wide range of flurocarbon sources, polyamines, $R_F$ epoxide/polyamine, ratios of $R_F$/polyamine and ratios of epi/polyamine reaction conditions can lead to high performance water dispersible oil/grease-sizing and water-sizing agent. Higher carbon chain lengths of fluorocarbon, are preferred based on the hot oil-test based on the hot/oil boat test. More epihalohydrin or epiorganosulfonates are preferred for hot oil/grease-sizing. In contrast using the hot oil Test @ pet Food, there is an optimum epi to polyamine ratio. For instance, Table XII A2, Synthetic examples it appears that the optimum is 1.95 or 2.05 moles epi/mole of polyamine for this set of conditions.

More epihalohydrin or epiorganosulfonates are preferred for water sizing

In addition, the intermediate fluoroalkyl-hydroxyl-polyamine which has not been reacted with epihalohydrin or epiorganosulfonates performs poorly in both the Hot Oil-Boat Test and the Hercules Size Test. These are shown in examples in Table XII parts A2, B, C, D1, D2, and F. The cellulose reactive component is an essential part of the performance of the water dispersible oil/grease-sizing and water-sizing agent. Based on the Kit Test compounds that do not have the cellulose reactive component, specifically in the examples described here, epi, do have Kit Test performance, but little hot oil nor water-sizing performance. Without the cellulose reactive component these fluoroalkyl-hydroxyl-polyamine lack the balance of performance that the agents of this invention provide.

The Addition of Epihalohydrin or Epiorganosulfonate is Preferably Done in a Two Step Process.

The water dispersible oil/grease-sizing and water-sizing agent can be produced with a breadth of reaction conditions during the reaction of epihalohydrin or epiorganosulfonates with fluoroalkyl-hydroxyl-polyamine. The normal reaction conditions for the addition of the epihalohydrin to the fluoroalkyl-hydroxyl-polyamine is the two step addition of ~2 hours at 50° C. followed by ~2 hours at 80° C. In this series of test one of the key variables tested is whether this two step, two temperature strategy leads to an agent with better performance. A key property of the agent is the molecular weight that is measured by SEC with a refractive index detector or a UV photo diode array detector, and by SEC with a light scattering detector. Also determined is the viscosity which is an indirect measure of molecular weight.

TABLE XIII

VARY EPI RXN TIME & TEMP., MW Part A1

| Oil-Size (Mole Ratio) $R_F$/polyamine/Epi | Synthetic Ex. No. | Epi Reaction/ Conditions Step One | Step Two | Total Epi by products (ppm dry basis) | Oil- Sizing Results Hot Oil- Test 2: Pet Food (% Stain, ave. of 3) Paper treated 1 day after mfg of agent Addition Level (% wt size/wt dry fiber) | | Paper treated 3 weeks after mfg of the agent | Product Viscosity (15% Solids, 22° C., cps) Inital | 3 wk | Molecular Weight by SEC (Daltons × 10³) vs PMMA Std $M_n$ | $M_w$ | Molecular Weight by SEC (Daltons × 10³) Light Scattering $M_n$ | $M_w$ |
|---|---|---|---|---|---|---|---|---|---|---|---|---|---|
| | | | | | Paper: A (Petfood batch A) 0.200 | 0.250 | 0.200 | | | | | | |
| 1/75/1.0/2.25 | E2b SS | 50 C, 2 h | No | 9754 | 75 | 34 | 10 | 167 | 140 | 82 | 6993 | 915 | 1599 |
| 1/75/1.0/2.25 | E2b SS | 50 C, 6 h | No | 9460 | 39 | 5 | 2 | 78 | 60 | 99 | 14902 | 1155 | 2147 |
| 1/75/1.0/2.25 | E2b SS | 50 C, 2 h | 80 C, 2 h | 7680 | 2 | 0 | 1 | 233 | 275 | 82 | 7454 | 454 | 1077 |
| 1/75/1.0/2.25 | E2b SS | No | 80 C, 2 h | 19840 | 56 | 1 | 29 | 408 | 370 | 92 | 20667 | 1661 | 7091 |
| 1/75/1.0/2.25 | E2b SS | No | 80 C, 4 h | 17326 | 43 | 0 | 57 | 1760 | 1800 | 52 | 6767 | 5271 | 6641 |

Part A The compounds have TELA-N for a fluorocarbon source, TETA as the polyamine and the ratios are the $R_F$:polyamine:epi ratio listed and the temperature of the $R_F$ epoxide/TETA reaction was 80° C. The temperature conditions for Reaction 2 are shown in the table.

VARY EPI RXN TIME & TEMP., MW - PART B

Paper: A (Petfood batch B)

| Oil-Size (mole Ratio) $R_F$/polyamine/Epi | Synthetic Ex. No. | Hot Oil- Test 1: 75 C, % Stain, ave. of 3 0.175 | 0.200 | Hot Oil- Test 2; Pet Food (% Stain, ave. of 3) Addition Level (% wt siz/wt dry fiber) 0.175 | 0.200 | Kit Test (ave. of 5) 0.175 | 0.200 | Molecular Weight by SEC (Daltons × 10³) vs. PMMA Std (UV-PDA detector) $M_n$ | $M_w$ |
|---|---|---|---|---|---|---|---|---|---|
| Starch Only | | 0 | | | | 100 | | | |
| 2.0/1.0/1.85, C6 | A1a SS | 600+ | 600+ | – | – | – | – | 10 | 55 |
| 1.75/1.0/1/75 TELA N | E2a SS | 600+ | 600+ | 3 | 0 | 9 | 10 | 18 | 203 |
| 2.25/1.0/2.25 C6 | A1a SS | 360 | 600+ | – | – | – | 9– | 21 | 721 |
| 1.75/1.0/2.20 TELA N | E2b SS | 600+ | 600+ | 0 | 0 | 9– | 9 | 27 | 1087 |
| 1.75/1.0/2.20 TELA N | E2b SS | 600+ | 600+ | – | 0 | – | 8 | 109 | 8211 |

Part B The compounds have various fluorocarbon sources, TETA as the polyamine and the ratios are the Rf:polyamine:epi ratio listed and the temperature of the $R_f$ addition to the DETA polyamine was 130 C, except for the 2.25/1.0/2.25 entry which was at 80 C.

VARY EPI RXN TIME & TEMP., MW - PART C

Paper: D (Petfood batch B)

| Oil-Size (Mole Ratio) $R_F$/ polyamine/ Epi | Synthetic Ex. No. | Hot Oil- Test 2: Pet Food Addition Level (% wt size/wt dry fiber) 0.125 | 0.150 | Kit Test (ave. of 5) 0.125 | 0.150 | Product Viscosity (17.5% Solids 22 C, cps) |
|---|---|---|---|---|---|---|
| 1.5/1.0/2.00 | E2b SS | 62 | 14 | 6– | 8 | 600 |
| 1.5/1.0/2.00 | E2b SS | 33 | 4 | 7 | 8– | 900 |
| 1.5/1.0/1.88 | E2b SS | 33 | 6 | 6 | 7 | 2600 |
| 1.5/1.0/2.00 | E2b SS | 26 | 16 | 7 | 7 | 4100 |
| 1.5/1.0/2.15 | E2b SS | 51 | 1 | 7 | 8– | 6000 |

Part C The compounds have TELA N for the fluorocarbon sources. TETA as the polyamine and the ratios are the Rf:polyamine:epi ratio listed and the temperature of the $R_f$ epoxide/TETA reaction was 80° C.

The results listed in Table XIII shows that (1) invention is effective when produced over a range of epi reaction times and temperatures. The two-step process where the epi reaction is conducted at 50° C. for 2 hours followed by 2 hours at 80° C. is preferred to minimize epi by-products and time required to cure.

These results demonstrate that the invention is effective over preparation conditions that lead to a wide range of MW, as shown by the range of viscosities and the SEC MW measurements. Long reaction time at lower temperature will give satisfactory results. The oil-sizing performance by the Hot Oil Test 2, was tested initially and after 3 weeks of storage.

The results listed in Table XIII, demonstrate that in general the oil-size efficiency improves as the agent of the invention ages. It reaches its maximum effect on treated paper in about 3 weeks. A test 3 weeks after manufacture shows this marked improvement. The material that was made with a one-step epi addition at 80° C. did not show improvement as the product aged.

Note the last two entries in Table XIII part B had the same approximate composition and reaction conditions. The conditions were apparently different enough to lead to differences in molecular weight, but little difference in the kit test performance.

Under batch-conditions addition of polyamine to $R_f$ leads to an unstable product and under batch conditions a solvent is needed for the reaction of the epi group with the polyamine Reaction conditions for formation of fluoroalkyl-hydroxyl-amine and the subsequent reaction with epihalohydrin or epiorganosulfonates can produce a poor sizing agent. The reaction conditions that produced poor products were tested under batch conditions. The two strategies tested were 1) addition of the polyamine to the fluorochemical and 2) adding epi to TETA without a solvent.

In a batch-processing mode there are reaction strategies that lead to unusable final products. When the TETA is added to fluorocarbon epoxide obvious sediment developed, and led to an unusable product.

Under batch processing conditions when no solvent was used in the epihalohydrin reaction with the fluoroalkyl-hydroxyl-amine it appeared that the material was totally cross-linked and resulted in a product that could not be dispersed in the water.

The $R_f$ Spacer Group can React With Polyamine Over a Range of Temperatures.

The reaction of fluorinated epoxides with the polyamine to make perfluoro(hydroxyl)alkyl, alkyl polyamino halohydrin or organo sulfonate polymeric composition the can be done over a range of temperatures. Under batch conditions the preferred sequence is the addition of the $R_f$ epoxide to the polyamine.

TABLE XIV

STABILITY

| Oil-Size (Mole Ratio) $R_F$/polyamine/Epi | Synthetic Ex. No. | | Comments | Stability |
|---|---|---|---|---|
| 1.75/1.0/2.25 | E2b SS | Addition of TETA to Rf | Portion of TETA expected to be totally substituted with Rf | Obvious heavy Sediment; unusable product |
| 1.75/1.0/2.25 | E2b SS | Epi rxn with TETA neat | Expect heavy cross-linking | Totally cross-linked, Will not disperse; unusable product |

The reactions tested used have TELA N for the fluorocarbon sources, TETA as the polyamine and the ratios are the Rf:polyamine:epi ratio listed and the temperature of the $R_F$ epoxide/TETA reaction was 80° C.

TABLE XV

REACTION CONDITIONS FOR ADDITION OF $R_f$ EPOXIDE TO POLYAMINE

| Oil-Size (Mole Ratio) $R_F$/polyamine/ Epi | Synthetic Example No. | Reaction Temperature, ° C. | Oil- Sizing Results Hot Oil- Test 2: Pet Food (% Stain, ave. of 3) Addition Level (% wt size/wt dry fiber) | | | | Kit Test (ave. of 5) | |
|---|---|---|---|---|---|---|---|---|
| | | | 0.150 | 0.175 | 0.200 | 0.300 | 0.175 | 0.200 |
| Lodyne ® P208E | | | | 41 | 18 | 1 | | |
| 1.75/1.0/2.25 | T1 a | 80 | 1 | 0 | 0 | | | |
| 1.75/1.0/2.25 | T1 a | 130 | 8 | 1 | 0 | | 9 | 10− |
| 1.75/1.0/2.25 | T1 a | 147 | 25 | 8 | 1 | | | |
| 1.75/1.0/2.25 | T1 a | 130; TETA added to the epoxide | 100 | 100 | | | 1− | 2− |

The compounds have TELA N for the fluorocarbon sources, and the TETA as the polyamine.

The product produced from the fluoroalkyl-hydroxyl-polyamine which was made from an 80 C reaction of fluorinated epoxides with the polyamine produced the best result of this set of tests. As in the example listed in Table XIII, the order of addition in batch processing is important— the $R_F$ epoxide must be added to the polyamine.

The Polyamine can Vary from 3 to 1000 or More Nitrogen Atoms.

The polyamine building block for the water dispersible oil/grease-sizing and water-sizing agent can vary between 3 nitrogen atoms and 1000 nitrogen atoms. To demonstrate the range of polyamines TETA and polyalkyleneimines were used to prepare agents. The specific example of the polyalkyleneimine used has a number average molecular weight of 423 and was predominately in the linear form. This means there are 423 —NHCH$_2$CH$_2$— units and the molecular weight would be ~18000 Daltons. The total amine in the polyalkleneimine was determined by titration, a certificate of analysis of the amine content, or other vendor certification.

Also, a broad range of ratios of epihalohydrin to polyamine is demonstrated in the examples shown in Table XVI.

TABLE XVI

DIFFERENT POLYAMINE STRUCTURES USED

| Oil-Size (Mole Ratio) $R_F$/polyamine/Epi | Synthetic Example No. | Oil- Sizing Results Hot Oil- Test 2: Pet Food (% Stain, ave. of 3) Addition Level (% wt size/wt dry fiber) Paper: A (Petfood batch A) | | | Kit Test (ave. of 5) | | | $R_F$ Tail Mole Ratio | Amine Structure | Rf/Mole Ratio | Epi/N Mole Ratio | N Mole Ratio | ($_{RF}$ + Epi)/ Epi Mole Ratio |
|---|---|---|---|---|---|---|---|---|---|---|---|---|---|
| | | 0.200 | 0.250 | 0.325 | 0.200 | 0.250 | 0.325 | | | | | | |
| Starch Only | | | 100 | | | 0 | | | | | | | |
| 3.00/1.0/3.25 | E4b | 83 | 5 | 1 | 9– | 10– | 10 | 3.00 | TETA | 0.75 | 0.81 | 1.56 | 3.25 |
| 1.75/1.0/2.25 | E2b | 1 | 0 | 0 | 10– | 12 | 12 | 1.75 | TETA | 0.44 | 0.56 | 1.00 | 2.25 |
| 4.7/1.0/5.9 | S1a SS | 100 | 13 | 0 | 6 | 7 | 8 | 4.70 | 423 MW Linear PEI | 0.48 | 0.60 | 1.08 | 5.90 |
| 7.46/1/8.08 | S3a | 100 | 100 | 86 | 5 | 6 | 9 | 7.46 | 423 MW Linear PEI | 0.76 | 0.82 | 1.58 | 8.08 |
| 7.46/1/9.59 | S3b | 100 | 96 | 80 | 5 | 6 | 7 | 7.46 | 423 MW Linear PEI | 0.76 | 0.97 | 1.73 | 9.59 |
| 7.46/1/13.87 | S3b | 100 | 99 | 91 | 5 | 6– | 7– | 7.46 | 423 MW Linear PEI | 0.76 | 1.41 | 2.17 | 13.87 |
| 5.5/1/10.22 | S2a | 100 | 1 | 0 | 7+ | 9 | 10+ | 5.50 | 423 MW Linear PEI | 0.56 | 1.04 | 1.60 | 10.22 |
| 5.5/1/7.07 | S2c | 73 | 5 | 0 | 7+ | 9 | 11– | 5.50 | 423 MW Linear PEI | 0.56 | 0.72 | 1.28 | 7.07 |
| 5.5/1/5.96 | S3d | 3 | 0 | 0 | 8– | 9 | 11 | 5.50 | 423 MW Linear PEI | 0.56 | 0.61 | 1.16 | 5.96 |
| 5.5/1/4.75 | S2e | 89 | 3 | 0 | 7 | 10– | 10 | 5.50 | 423 MW Linear PEI | 0.56 | 0.48 | 1.04 | 4.75 |
| 4.7/1/5.96 | S1a | 99 | 51 | 1 | 6 | 7 | 10 | 4.70 | 423 MW Linear PEI | 0.48 | 0.61 | 1.08 | 5.96 |
| 4.7/1/4.75 | | 99 | 57 | 1 | 6– | 7+ | 10– | 4.70 | 423 MW Linear PEI | 0.48 | 0.48 | 0.96 | 4.75 |

The compounds have TELA N for the fluorocarbon sources, and TETA as the polyamine and the amine $R_F$ epoxide was done at 80 C.

The examples shown in Table XVI demonstrate the breadth of polyamine that can be used in the preparation of the oil/grease-sizing and water-sizing agent.

The Preferred Cellulose Reactive and Cross-linking Group is 3-hydroxyazetidinium or Other Highly Reactive, Undetected, Intermediate Purpose: Demonstrates that presence of azetidinium functionality improves hot oil sizing performance. Conditions that are epected to destroy azetidinium functionality are detrimental to the hot oil sizing performance of the invention. The specific reaction conditions are shown in column one of Table XVII.

TABLE XVII

PREFERRED INVENTION HAS AZETIDINIUM PRESENT

| Oil Size (Mole Ratio TELA-N/ TETA/Epi) Reaction conditons | Oil Sizing Results Hot Oil Test 2: Pet Food (% Stain, ave. of 3) Addition Level (% Wt) Paper A (Petfood batch A) | | | Amine 2-hr Amine/ Epoxide Reaction #1 Temp. (C.) | Epi Mole Ratio | Epi Reaction #2 Conditions (2 h temp/2 hr temp/solids) | Comments | Azetidinium Content by by NMR relative to moles Rf | Azetidinium Content by NMR (Mol % Azet relative to moles TETA) | Performance Comments |
|---|---|---|---|---|---|---|---|---|---|---|
| | 0.200 | 0.250 | 0.325 | | | | | | | |
| Starch Only 1.75/1.0/2.25, heated at 40 C. | | 96 | 92 | 80.0 | 2.25 | 50/80/30 | Destroyed azetidinium by | 0–7** | 0–12** | Extremely bad. Conditions designed |

TABLE XVII-continued

PREFERRED INVENTION HAS AZETIDINIUM PRESENT

| Oil Size (Mole Ratio TELA-N/ TETA/Epi) Reaction conditons | Oil Sizing Results Hot Oil Test 2: Pet Food (% Stain, ave. of 3) Addition Level (% Wt) Paper A (Petfood batch A) | | | Amine 2-hr Amine/ Epoxide Reaction #1 Temp. (C.) | Epi Mole Ratio | Epi Reaction #2 Conditions (2 h temp/2 hr temp/solids) | Comments | Azetidinium Content by by NMR (Mol % Azet relative to moles Rf) | Azetidinium Content by NMR (Mol % Azet relative to moles TETA) | Performance Comments |
|---|---|---|---|---|---|---|---|---|---|---|
| | 0.200 | 0.250 | 0.325 | | | | | | | |
| overnight at pH 10, adj. PH back to 3.5 (dispersed well) | | | | | | | NMR, physically well dispersed | | | to destroy all azetidinium |
| 1.75/1.0/2.25 epi rxn at rt & 5% concentration | 72 | 45 | | 130.0 | 2.25 | 22 C., 5 d, at 5% | Epi reacted by GC but conditions do not favor azetidinium | 0–10** | 0–17.5** | Very poor Hot Oil. Rxn designed for low level azetidinium formation |
| 1.75/1.0/1.75 material | 3 | 0 | | 130.0 | 1.75 | 50/80/30 | | 7–11 | 12–19 | Good |
| 1.75/1.0/2.25 | 0 | 0 | | 80.0 | 2.25 | 50/80/30 | | 13–18 | 23–32 | Excellent |
| 1.75/1.0/2.25, heated at 40 C. overnight at pH 4.5 | 0 | 0 | | 80.0 | 2.25 | 50/80/30 | Control to show pH was what was impacting the product. Azetidinium intact by NMR. | 13–18 | 23–32 | Excellent |
| 1.75/1.0/1.95 material | 0 | 0 | | 130.0 | 1.95 | 50/80/30 | | 15–23 | 26–40 | Excellent |
| D1085; 1.75/1.0/2.25 by std procedure | 0 | 0 | | 130.0 | 2.25 | 50/80/30 | | 22–28 | 39–49 | Excellent |
| 1.75/1.0/2.25 treated with 0.25 wt eq. Caustic (d.b.) 20 min | 51 | 4 | | 80.0 | 2.25 | 50/80/30 | Treated with 0.25 wt equivalent of caustic (dry basis) 20 min before use. Caustic degrade-sazetidinium groups | Not Determined | Not worse as Determined | Performance got caustic treatment level increased consistent with poorer performance as azetidinium content decreased |
| 1.75/1.0/2.25 reated with 0.5 wt eq. Caustic (d.b.) 20 min | 43 | 13 | | 80.0 | 2.25 | 50/80/30 | Treated with 0.5 wt equivalent of caustic (dry basis) 20 min before use. Caustic degrades azetidinium groups | Not Determined | Not Determined | |
| 1.75/1.0/2.25 treated with 1.0 wt eq. Caustic (d.b.) 20 min | 85 | 44 | | 80.0 | 2.25 | 50/80/30 | Treated with 1.0 wt equivalent of caustic (dry basis) 20 min before use. Caustic degrades azetidinium groups | Not Determined | Not Determined | |

**baseline noise gyration/no distinct signal

The Agent can Also be Used to Size Textile Fibers.

The water dispersible oil/grease-sizing and water-sizing agent can also be used to treat textiles to impart improved stain release properties.

TABLE XVIII

TEST OF TEXTILES

| Oil-Size (Mole Ratio TELA-N/TETA/Epi) | Oil-Sizing Results Textile Soil-Release Test (AATCC Test Method 130) Addition Level (% wt size/wt dry fiber) | | |
|---|---|---|---|
| | 0.025 | 0.075 | 0.200 |
| #400 Bleached Cotton Print Cloth | | | |
| Water Only | 2.5 | | |
| 1.75/1.0/2.25 | 4.0 | 5.0 | 5.0 |

Ratings: 5 - negligible or no stain, 4 - slight stain, 3 - noticeable stain, 2 - considerable stain, 1 - severe stain. The compound tested had TELA N for the fluorocarbon sources, and TETA as the polyamine.

The example shown in Table XVIII demonstrates that the agent can size cellulose based textiles.

Contact Angle is an Indirect Measurement of Oil/Grease-sizing

The contact angle of the water dispersible oil/grease-sizing and water-sizing agent shows a higher contact angle than commercial formulations, thus indicating superior performance in oil-sizing of treated paper.

TABLE XX

| Oil- Size (Mole Ratio TELA-N/TETA/Epi) | Synthetic Example No. | Oil- Sizing Results Contact Angle measured after 20 s (deg., ave. of 3) Addition Level (% wt size/wt dry fiber) | | | | | | |
|---|---|---|---|---|---|---|---|---|
| | | 0.020 | 0.030 | 0.040 | 0.050 | 0.10 | 0.15 | 0.25 |
| | | Paper: T | | | | | | |
| Water Only | | 36 | | | | | | |
| Lodyne ® P514 | | 44 | | | | 47 | | |
| Scotchban ® FC807 | | 44 | | 52 | | | | |
| Ciba Lodyne ® P208E | | 70 | 66 | 83 | 83 | | | |
| Scotchban ® FC845 | | 83 | 84 | 92 | 94 | | | |
| Hercon 70 (AKD) | | | | | | 64 | 70 | 78 |
| 1.75/1.0/2.25 | | 95 | 96 | 98 | 106 | 114 | | |

The compound of the invention have TELA N for the fluorocarbon sources and TETA as the polyamine.

The higher the contact angle the better the better oil-sizing performance.

The agent has the highest contact angle as measured in this test.

What is claimed:

1. A water-dispersible oil/grease-sizing and water-sizing agent for cellulosic materials comprising repeating units that are comprised of a polyamine with at least 3 nitrogen atoms in each recurring monomer unit wherein the amino groups are partially or completely substituted by:
   a. a cellulose-reactive group which is formed by reaction of the polyamine and at least one reactive chemical which is selected from the group consisting of epi halohydrin, epi organosulfonates, and oxiranes, where the cellulose reactivity is present after reaction with the polyamine or is formed by subsequent reactivation;
   b. an oleophobic and hydrophobic fluorochemical group, which is substituted with an alkyl chain which has a hydrophillic group;

wherein additionally, the cellulose-reactive group cross-links the polyamino groups and the $M_w$ molecular weight of the agent is 10,000 to 35,000,000 Daltons as measured by Size Exclusion Chromatography relative to a poly(methylmethacrylate) standard.

2. The agent of claim 1 where the polyamine has the structure:

Structure I n=1–6,
m=2–1,000,
$R^2$, $R^3$, $R^5$=H, —$(CH_2)_{1-4}$H, —$(CH_2CH_2O)_{1-10}$H, —$CH_2CH(OH)CH_3$, —$CH(CH_3)CH_2OH$, —$CH_2CO_2^-$ $Met^+$ (Met=group 1 or 2 metal),
$R^4$=H, —$(CH_2)_{1-4}$H, —$(CH_2CH_2O)_{1-10}$H, —$CH_2CH(OH)CH_3$, —$CH(CH_3)CH_2OH$, —$CH_2CO_2^-$ $Met^+$ (Met=group 1 or 2 metal), —$(CH_2)_{1-6}NH_{2,1,0}(R^2)_{0,1,2}$,
where at least two of the $R^2$, $R^3$, $R^4$, or $R^5$ are H, and
where any two of $R^2$, $R^4$, and $R^5$ could be the same carbon chain.

3. The agent of claim 1 where the polyamine is a straight chain, branched or alkylated polyalkyleneimine with primary, secondary, and tertiary amine groups and the molecular weight of the polyamine is from 75 to 32,000 Daltons.

4. The agent of claim 3 where the polyalkyleneimine is selected from a group consisting of diethylenetriamine, triethylenetetraamine, tetraethylenepentamine, dihexamethylenetriamine, and their branched and/or alkylated derivatives.

5. The agent of claim 1 where the reactive chemical is an epihalohydrin or epiorganosulfonate, having the structure:

Structure II

Q = Cl, Br, I, $CH_3C_6H_4SO_2$, $CH_3SO_2$.

6. The agent of claim 5 having a ratio of epihalohydrins or epiorganosulfonates to nitrogen atoms on the polyamine of 0.05 to 2.0.

7. The agent of claim 1 where the cellulose-reactive group is a 3-hydroxyazetidinium group.

8. The agent of claim 7 where the 3-hydroxyazetidinium is present in at least 10 mole % relative to the moles of the polyamine as measured by nuclear magnetic resonance spectroscopy.

9. The agent of claim 1 where at least one of the cellulose reactive groups is bound to the polyamine at a nitrogen which was secondary prior to reaction with the reactive chemical.

10. The agent of claim 1 where the fluorochemical portion of the fluorochemical group is further characterized as a monovalent, perfluorinated, alkyl or alkenyl, straight, branched or cyclic organic radical having three to twenty fluorinated carbon atoms, which can be interrupted by divalent oxygen or sulfur atoms.

11. The agent of claim 1 which comprises a polymeric composition having a $M_w$ molecular weight of the agent is 10,000 to 35,000,000 Daltons as measured by Size Exclusion Chromatography relative to a poly(methylmethacrylate) standard and having the structure III:

Structure III

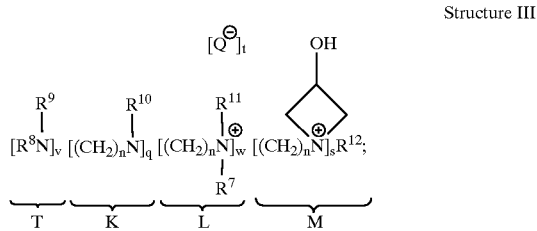

wherein wherein $R^8$, $R^9$, $R^{10}$, $R^{11}$, $R^{12}$ = J, H, —$(CH_2)_{1-6}H$,
—$(CH_2CH_2O)_{1-10}H$, —$CH_2CH(OH)CH_3$,
—$CH(CH_3)CH_2OH$, —$CH_2CH(OH)CH_2Cl$,

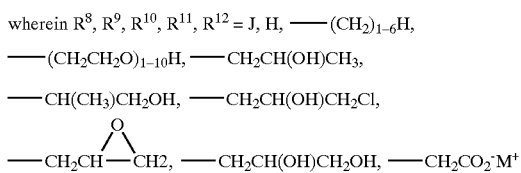

—$CH_2CH$—$CH_2$, —$CH_2CH(OH)CH_2OH$, —$CH_2CO_2^-M^+$ (M=group 1 or 2 metal), —$(CH_2)_{1-6}NH_{2,1,0}(R^8)_{0,1,2}$, where any two of $R^8$, $R^{10}$, $R^{11}$, or $R^{12}$ could be the same carbon chain, $R^7$=H, —$CH_2CH(OH)CH_2$, which can be cross-linked to nitrogen on K or L or M on a different fluro(hydroxyl) alkyl, polyalkyl amino halohydrin or organo sulfonate, where at least one of $R^8$, $R^9$, $R^{10}$, $R^{10}$, $R^{12}$ must be a fluorochemical as denoted by J, and J is selected from

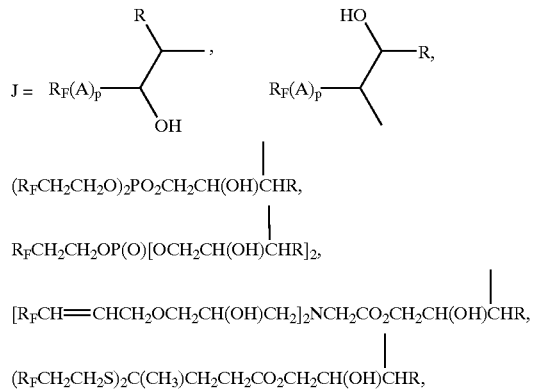

$(R_FCH_2CH_2O)_2PO_2CH_2CH(OH)CHR$, $R_FCH_2CH_2OP(O)[OCH_2CH(OH)CHR]_2$, $[R_FCH\!=\!CHCH_2OCH_2CH(OH)CH_2]_2NCH_2CO_2CH_2CH(OH)CHR$, $(R_FCH_2CH_2S)_2C(CH_3)CH_2CH_2CO_2CH_2CH(OH)CHR$,

-continued $R_FCH_2CH(OH)CH_2N[CH_2CH(OH)CHR]CH_2CO_2^-Met^+$, $[R_FCH2CH(OH)CH2]2NCH2CO2CH2CH(OH)CHR$, $R_FCH\!=\!CHCH2OCH2CH(OH)CH2N[CH2CH(OH)CHR]CH2CO2^-Met^+$

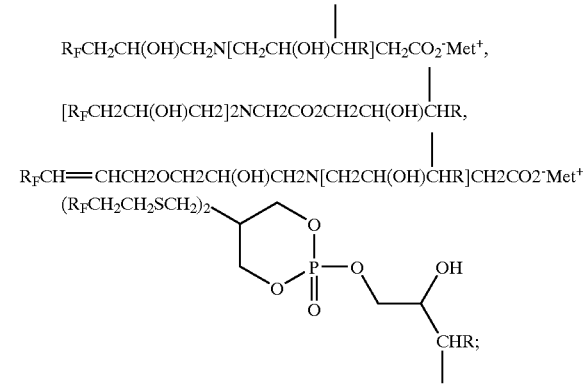

wherein

A=—$(CH_2)_{1-9}$—, —$CH_2CHI(CH_2)_{1-9}BCH_2$—,
—$CH\!=\!CH(CH_2)_{1-9}BCH_2$—, —$(CH_2)_{1-11}BCH_2$—,—
$(CH_2)_{1-2}B(CH_2)_{1-10}BCH_2$—, where B=O, $CO_2$, $CO_2$
$[(CH_2)_{1-2}O]_{1-10}$, $OCH_2CO_2$, $OCH_2CO_2CO_2[(CH_2)_{1-2}$
$O]_{1-10}$, S, $SO_2$, $SCH_2CO_2$, C(O)S, $SCH_2C_2O[(CH_2)_{1-2}$
$O]_{1-10}$, $S[(CH_2)_{1-2}O]_{1-10}$, S(O)NR', C(S)NR', S(O)
$NR'CH_2CH_2O$, C(O)NR', $OCH_2C(O)NR'$, $OPO_3$, NR',
$SCH_2C(O)NR'$, —$N(R)CH_2CO_2$, where R'=H,
$(CH_2)_{1-6}$;

R=H, —$(CH_2)_{1-6}H$:

$R_F$=$F(CF_2)_{4-18}$, $CF_3CF(CF_3)(CF_2)_{3-5}$, $CF_3CF_2CF(CF_3)$
$(CF_2)_{3-5}$, $H(CF_2)_{4-18}$, $HCF_2CF(CF_3)(CF_2)_{3-5}$,
$HCF_2CF_2CF(CF_3)(CF_2)_{3-5}$, cycloperfluoroalkyl radicals of the formula $C_zF_{(2z-1)}$ where z is an integer having a value of from 4-6 inclusive;

n, p, q, s, t, v, and w are integers, p=0, 1, n=1–6 v+q+w+s=3–1000, q, w, s each may be zero, t=w+s,

Q=$Cl^-$, $Br^-$, $I^-$, $CH_3C_6H_4SO_2$—, $CH_3SO_2^-$, and K, L and M are randomly distributed along the polyamine and T is a amine on the end of the polyamine chain.

12. The agent of claim 11 wherein the polymeric composition comprises the reaction product of a fluorocarbon substituted polyamine of Structure IV, and the epihalohydrin or epiorganosulfonate:

Structure IV

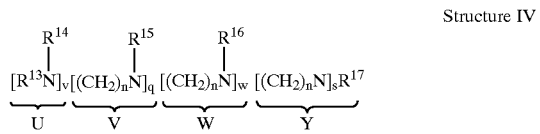

$R^{13}$, $R^{14}$, $R^{15}$, $R^{16}$, $R^{17}$=J, H,—$(CH_2)_{1-6}H$, —$(CH_2CH_2O)_{1-10}H$, —$CH_2CH(OH)CH_3$, —$CH(CH_3)CH_2OH$, —$CH_2CO_2$— $M^+$ (M=group 1 or 2 metal), —$(CH_2)_{1-6}NH_{2,1,0}(R^{13})_{0,1,2}$, where any two of $R^{13}$, $R^{15}$, $R^{16}$, or $R^{17}$ could be the same carbon chain, and J is selected from

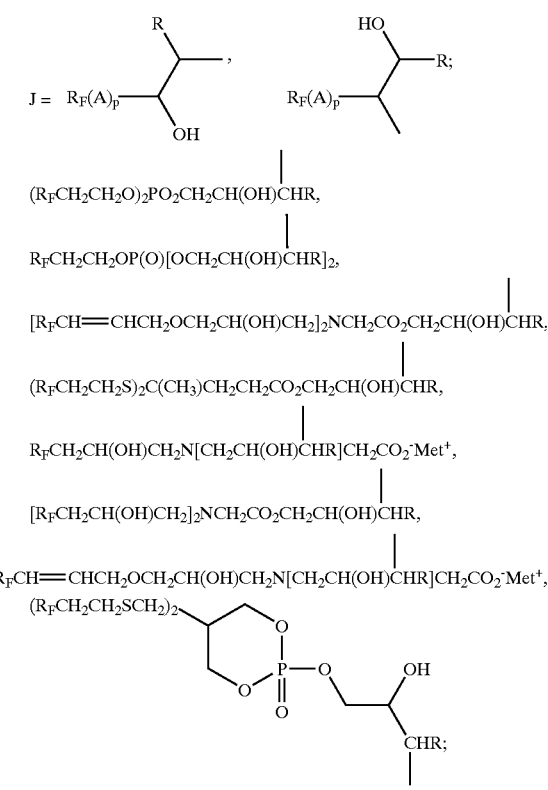

Wherein $R_F$=F(CF$_2$)$_{4-18}$, CF$_3$CF(CF$_3$)(CF$_2$)$_{3-5}$, CF$_3$CF$_2$CF(CF$_3$)(CF$_2$)$_{3-5}$, H(CF$_2$)$_{4-18}$, HCF$_2$CF(CF$_3$)(CF$_2$)$_{3-5}$, HCF$_2$CF$_2$CF(CF$_3$)(CF$_2$)$_{3-5}$, Cycloperfluoroalky radicals of the formula C$_z$F$_{(2z-1)}$ wherein z is an Integer having a value of from 4–6 inclusive;

R=H, —(CH$_2$)$_{1-6}$H;

n, q, s, v, and w are integers, n=1–6, v+q+w +s=3–1000 q, w, s each may be zero, and V, W and Y are randomly distributed along the fluorcheicals-substituted polyamine and U is an amine on the end of the polyamine chain.

where v, n, q, w, and s have the same meaning as in claim 11.

13. The agent of claim 12 wherein the fluorocarbon substituted polyamine is a fluoroalkyl-hydroxyl-alkylpolyamine.

14. The agent of claim 11 wherein a cellulose reactive group is chemically bound to the fluorocarbon substituted polyamine.

15. The agent of claim 14 wherein the cellulose reactive group is a 3-hydroxyazetidnium and is a chemical reaction product of epihalohydrin or epiorganosulfonate and the fluorocarbon substituted polyamine.

16. The agent of claim 15 where the 3-hydroxyazetidinium is present in at least 10 mole % relative to the moles of the polyamine as measured by nuclear magnetic resonance spectroscopy.

17. The agent of claim 11 where the epihalohydrin is epichlorohydrin.

18. The agent of claim 11 where the M$_w$ molecular weight of the agent is from 20,000 to 25,000,000 Daltons as measured by Size Exclusion Chromatography relative to a poly(methylmethacrylate) standard.

19. The agent of claim 11, wherein A=—CH$_2$—,—CH$_2$CHI(CH$_2$)$_{1-9}$OCH$_2$—, —CH=CH(CH$_2$)$_{1-9}$OCH$_2$—, —CH$_2$CHI(CH$_2$)$_{1-8}$CO$_2$CH$_2$—, —CH=CH(CH$_2$)$_{1-8}$CO$_2$CH$_2$—, —(CH$_2$)$_{1-11}$OCH$_2$—, —(CH$_2$)$_{1-11}$SCH$_2$—, p=0 or 1, R$_F$=a mixture predominantly consisting of —(CF$_2$)$_{4-18}$F, the number of J groups on a repeating unit-to-nitrogen-atoms on the polyamine has a molar ratio=0.05–0.75, R=CH$_3$, H, n=2, 3, 4, or 6, the sum of v, q, w, and s is 3 to 100, R$^{8-12}$=H or a mix of H and CH$_3$, and the ratio of epihalohydrins or epiorganosulfonates to nitrogen atoms on the polyamine of 0.05–2.0.

20. The agent of claim 11 wherein A=—CH$_2$-p=1, R$_F$=mixture of consisting predominantly of (CF$_2$)$_{6-12}$F, the number of J groups on a repeating unit-to-nitrogen-atoms on the polyamine has a molar ratio=0.3–0.55, R=H, n=2, the sum of v, q, w, and s is 3 to 6, R$^{8-12}$=H, with the ratio of epihalohydrins or epiorganosulfonates-nitrogen atoms on the polyamine of 0.33–0.75.

21. A method of preparing the agent of claim 11 comprising reacting a polyamine with one or more fluorinated epoxides or fluorinated halohydrins and one or more epihalohydrins or epiorganosulfonates.

22. The method of claim 21 which comprises reacting sequentially the polyamine with one or more fluorinated epoxides or fluorinated halohydrins resulting in an intermediate product, the fluoroalkyl-hydroxyl alkylpolyamine compound, followed by reacting in a solvent the intermediate product with one or more of epihalohydrin or epiorganosuifonate.

23. The method of claim 22 where the solvent is selected from the group C$_{1-6}$ alcohols and diols, acetonitrile, C$_{3-6}$ ketones, water and mixtures thereof.

24. The method of claim 22 wherein the solvent has a concentration of solids of from 2 to 75% by weight.

25. The method of claim 22 where the fluoroalkyl-hydroxyl alkylpolyamine compound is dispersed in the solvent prior to reaction.

26. The method of claim 22 where the fluoroalkyl-hydroxyl alkylpolyamine compound is dispersed in the solvent at 40 to 110° C.

27. The method of claim 22 comprising reacting the fluoroalkyl-hydroxyl-alkylpolyamine with the epihalohydrins or epioroanosulfonates in a two stage process, where stage one is at less than 70 C for greater than 30 minutes and stage two is greater than 70 C for more than 30 minutes.

28. The method of claim 22 comprising reacting the fluoroalkyl-hydroxyl-alkylpolyamine with the epihalohydrins or epiorganosulfonates at a pH of 2.5 to 10.5.

29. An oil/grease- and water-sized paper containing agent of claim 1.

30. An oil/grease- and water-sized paper containing agent of claim 11.

31. A method of making paper which comprises treating paper with the agent of claim 1.

32. A method of making paper which comprises treating paper with the agent of claim 11.

33. A method of making paper which comprises treating paper furnish with the agent of claim 1.

34. A method of making paper which comprises treating paper furnish with the agent of claim 11.

35. A aqueous dispersion comprising the agent of claim 1 in water.

36. A aqueous dispersion comprising the agent of claim 11 in water.

* * * * *